(12) United States Patent
Trere

(10) Patent No.: US 12,556,611 B2
(45) Date of Patent: Feb. 17, 2026

(54) ADDRESSING AND ROUTING FOR DEVICES USING CONNECTIVITY FRAMEWORK FOR EMBEDDED CONNECTIVITY

(71) Applicant: Microchip Technology Incorporated, Chandler, AZ (US)

(72) Inventor: Paolo Trere, Santa Clara, CA (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 18/603,988

(22) Filed: Mar. 13, 2024

(65) Prior Publication Data
US 2024/0314209 A1  Sep. 19, 2024

Related U.S. Application Data

(60) Provisional application No. 63/489,828, filed on Mar. 13, 2023.

(51) Int. Cl.
*H04L 67/141* (2022.01)
*H04L 5/00* (2006.01)
(Continued)

(52) U.S. Cl.
CPC .......... *H04L 67/141* (2013.01); *H04L 5/0044* (2013.01); *H04L 45/745* (2013.01);
(Continued)

(58) Field of Classification Search
CPC ..... H04L 67/12; H04L 67/141; H04L 45/745; H04L 69/08; H04L 69/18; H04L 69/22; H04L 69/26
See application file for complete search history.

(56) References Cited

U.S. PATENT DOCUMENTS

| | | |
|---|---|---|
| 4,677,611 A | 6/1987 | Yanosy et al. |
| 6,279,041 B1 | 8/2001 | Baber et al. |
| | (Continued) | |

FOREIGN PATENT DOCUMENTS

| | | |
|---|---|---|
| CN | 101516090 A | 8/2009 |
| CN | 101523801 A | 9/2009 |
| | (Continued) | |

OTHER PUBLICATIONS

Chinese First Office Action and Search Report for Chinese Patent Application No. 202080086694.9, dated Oct. 27, 2023, 28 pages with English translation.

(Continued)

*Primary Examiner* — Kostas J Katsikis
(74) *Attorney, Agent, or Firm* — TraskBritt

(57) ABSTRACT

An apparatus comprising a computing device including one or more processors, multiple peripheral communication devices, and a memory to store processor-executable instructions. The one or more processors are to perform operations of a gateway node comprising receiving a message from a first end node via a first one of the peripheral devices, the message including a source identifier comprising a first end node identifier assigned to the first end node and a destination identifier comprising a second end node identifier assigned to a second end node; consulting a routing table at least partially responsive to receiving the message; and forwarding the message to the second end node via a second one of the peripheral devices based on an entry in the routing table, the entry including an interface identifier stored in association with the second end node identifier, the interface identifier corresponding to the second one of the peripheral devices.

18 Claims, 58 Drawing Sheets

(51) Int. Cl.
 *H04L 9/40* (2022.01)
 *H04L 45/745* (2022.01)
 *H04L 67/12* (2022.01)
 *H04L 69/08* (2022.01)
 *H04L 69/18* (2022.01)
 *H04L 69/22* (2022.01)

(52) U.S. Cl.
 CPC ........ *H04L 63/061* (2013.01); *H04L 63/0869* (2013.01); *H04L 67/12* (2013.01); *H04L 69/08* (2013.01); *H04L 69/18* (2013.01); *H04L 69/22* (2013.01)

(56) References Cited

U.S. PATENT DOCUMENTS

| | | | |
|---|---|---|---|
| 6,757,825 | B1 | 6/2004 | MacKenzie et al. |
| 8,918,631 | B1 * | 12/2014 | Kumar .................... H04L 63/00 370/254 |
| 9,031,064 | B2 | 5/2015 | Ranganathan et al. |
| 9,258,117 | B1 | 2/2016 | Roth et al. |
| 9,294,983 | B2 | 3/2016 | Kidron et al. |
| 9,794,249 | B1 | 10/2017 | Truskovsky et al. |
| 10,243,741 | B2 | 3/2019 | Cohen et al. |
| 10,878,323 | B2 | 12/2020 | Trivelpiece |
| 10,887,310 | B2 | 1/2021 | Bernsen |
| 11,146,665 | B2 | 10/2021 | Masputra et al. |
| 11,277,369 | B1 | 3/2022 | Motamedi et al. |
| 11,902,239 | B2 | 2/2024 | Andolina |
| 2003/0101283 | A1 | 5/2003 | Lewis et al. |
| 2005/0188193 | A1 | 8/2005 | Kuehnel et al. |
| 2005/0216736 | A1 | 9/2005 | Smith |
| 2005/0262205 | A1 | 11/2005 | Nikolov et al. |
| 2006/0026317 | A1 | 2/2006 | Niikura |
| 2006/0104308 | A1 | 5/2006 | Pinkerton et al. |
| 2007/0162751 | A1 | 7/2007 | Braskich et al. |
| 2007/0283153 | A1 | 12/2007 | Metke et al. |
| 2008/0092211 | A1 | 4/2008 | Klemets et al. |
| 2009/0158414 | A1 | 6/2009 | Chaudhry |
| 2009/0198994 | A1 | 8/2009 | Tan |
| 2009/0217043 | A1 | 8/2009 | Metke et al. |
| 2009/0249074 | A1 | 10/2009 | Madhavan et al. |
| 2010/0281154 | A1 | 11/2010 | Bedi et al. |
| 2011/0087883 | A1 | 4/2011 | Campagna et al. |
| 2011/0202755 | A1 | 8/2011 | Orsini et al. |
| 2012/0018506 | A1 | 1/2012 | Hammad et al. |
| 2012/0131115 | A1 | 5/2012 | Levell et al. |
| 2014/0143404 | A1 | 5/2014 | Kennedy et al. |
| 2014/0173287 | A1 | 6/2014 | Mizunuma |
| 2016/0373418 | A1 | 12/2016 | Per |
| 2017/0041262 | A1 | 2/2017 | Guo et al. |
| 2018/0167476 | A1 | 6/2018 | Hoffner et al. |
| 2018/0288503 | A1 | 10/2018 | Chayat et al. |
| 2019/0045034 | A1 | 2/2019 | Alam |
| 2019/0074977 | A1 | 3/2019 | Fries et al. |
| 2019/0149449 | A1 | 5/2019 | Morris |
| 2019/0286598 | A1 | 9/2019 | Chivetta et al. |
| 2019/0303915 | A1 | 10/2019 | Hammad |
| 2020/0177461 | A1 | 6/2020 | Zhu et al. |
| 2021/0184869 | A1 | 6/2021 | Trere |
| 2021/0209046 | A1 | 7/2021 | Lefebvre et al. |
| 2022/0070557 | A1 * | 3/2022 | Vallejos Campos ........................ H04J 14/0257 |
| 2022/0116361 | A1 | 4/2022 | Lewin et al. |
| 2022/0224551 | A1 | 7/2022 | Le Saint |
| 2022/0345855 | A1 | 10/2022 | May |
| 2022/0382605 | A1 | 12/2022 | Griffin et al. |
| 2023/0014876 | A1 | 1/2023 | Shekhar et al. |
| 2023/0040980 | A1 | 2/2023 | Kamasaka et al. |
| 2023/0041490 | A1 | 2/2023 | Vangati et al. |
| 2023/0309163 | A1 | 9/2023 | Mitty et al. |
| 2024/0089337 | A1 | 3/2024 | Wakabayashi et al. |

FOREIGN PATENT DOCUMENTS

| | | |
|---|---|---|
| CN | 106452782 A | 2/2017 |
| CN | 107396350 A | 11/2017 |
| CN | 108366069 A | 8/2018 |
| CN | 110190955 A | 8/2019 |
| CN | 114978683 A | 8/2022 |
| DE | 102014204252 A1 | 9/2015 |
| FR | 3030821 A1 | 6/2016 |
| WO | 2009/103214 A1 | 8/2009 |
| WO | 2015/132403 A1 | 9/2015 |
| WO | 2016/102832 A1 | 6/2016 |
| WO | 2017/045552 A1 | 3/2017 |

OTHER PUBLICATIONS

Dolev et al.; "Vehicle authentication via monolithically certified public key and attributes", Springer, Jul. 2015, pp. 879-892 (Year: 2015).
International Search Report of International Application No. PCT/US2024/019476, issued Jun. 21, 2024, 3 pages.
International Search Report of International Application No. PCT/US2024/019744, mailed Sep. 30, 2024, 5 pages.
International Search Report of International Application No. PCT/US2024/019745, issued Jul. 12, 2024, 3 pages.
International Search Report of International Application No. PCT/US2024/019747, mailed Sep. 27, 2024, 5 pages.
Invitation to Pay Additional Fees in International Application No. PCT/US2024/019744, mailed Jul. 11, 2024, 10 pages.
Invitation to Pay Additional Fees of International Application No. PCT/US2024/019747, mailed Jul. 3, 2024, 9 pages.
Written Opinion of the International Searching Authority of International Application No. PCT/US2024/019476, issued Jun. 21, 2024, 7 pages.
Written Opinion of the International Searching Authority of International Application No. PCT/US2024/019744, mailed Sep. 30, 2024, 12 pages.
Written Opinion of the International Searching Authority of International Application No. PCT/US2024/019745, mailed Jul. 12, 2024, 8 pages.
Written Opinion of the International Searching Authority of International Application No. PCT/US2024/019747, mailed Sep. 27, 2024, 11 pages.

* cited by examiner

| | | |
|---|---|---|
| ID | 11B | Session ID (=Destination ID) |
| STATUS | 1B | Session Status (Open, Valid, etc.) |
| IFACE | 1B | Interface (Destination Interface) |
| CHANNEL | 1B | Channel (Socket, Others...) |
| ECDH PRIVATE | 32B | Key Agreement (Ephemeral Private Key) |
| MY NONCE | 32B | Nonce Sent |
| HIS NONCE | 32B | Nonce Received |
| HIS PUBLIC | 64B | Destination Device Public Key |
| HIS EPHEMERAL | 64B | Key Agreement (Ephemeral Public Key) |
| PREMASTER | 32B | Premaster Key |
| HMAC TX | 32B | Incremental HMAC For Transmissions |
| HMAC RX | 32B | Incremental HMAC For Reception |

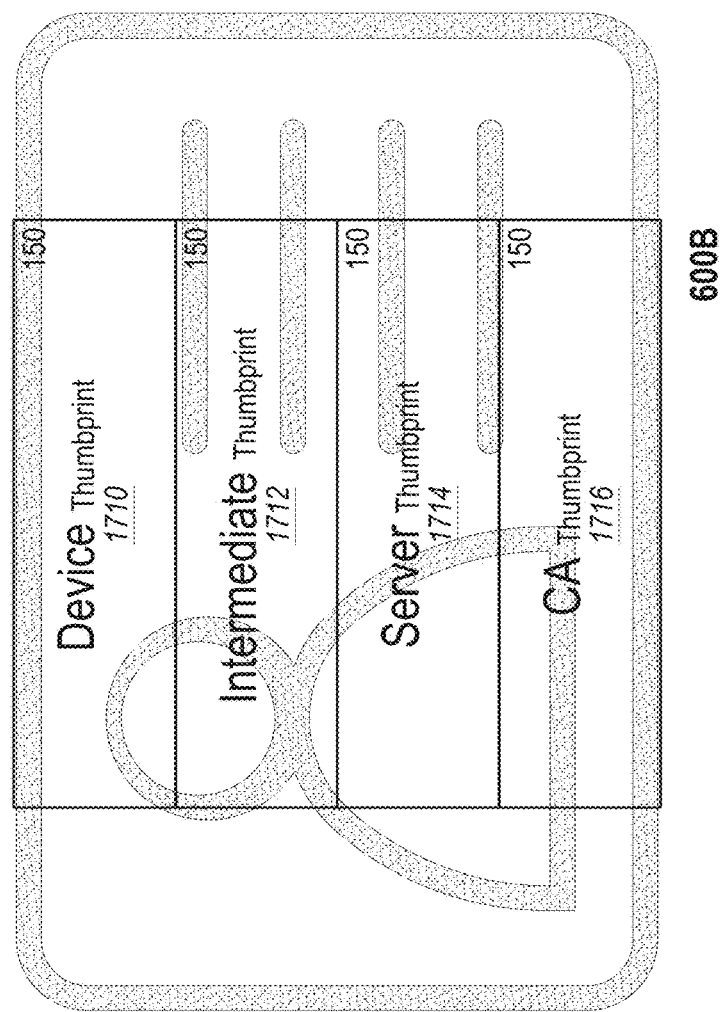
FIG. 17A
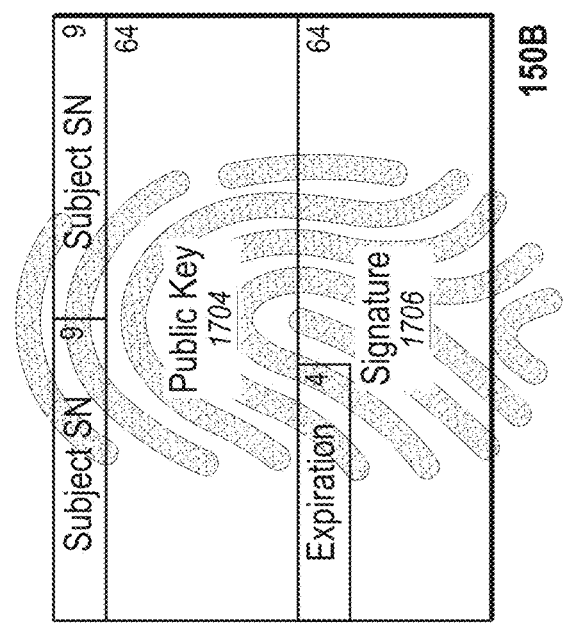

| Action | Gateway 1.0 Routing Table | Gateway 2.0 Routing Table | Gateway 3.0 Routing Table | Gateway 4.0 Routing Table | Gateway 5.0 Routing Table |
|---|---|---|---|---|---|
| None | 1.0 ME(itself) | 2.0 ME(itself) W | 3.0 ME(itself) | 4.0 ME(itself) | 5.0 ME(itself) |
| 1.0 Connects With 2.0 | 1.0 ME(itself) <br> 2.0 IF0 W | 2.0 ME(itself) W <br> 1.0 IF0 | 3.0 ME(itself) | 4.0 ME(itself) | 5.0 ME(itself) |
| 2.0 Connects With 3.0 | 1.0 ME(itself) <br> 2.0 IF0 W <br> 3.0 IF0 | 2.0 ME(itself) W <br> 1.0 IF0 <br> 3.0 IF1 | 3.0 ME(itself) <br> 2.0 IF0 W <br> 1.0 IF0 | 4.0 ME(itself) | 5.0 ME(itself) |
| 1.0 Connects With 3.0 | 1.0 ME(itself) <br> 2.0 IF0 W <br> 3.0 IF0 <br> 3.0 IF1 | 2.0 ME(itself) W <br> 1.0 IF0 <br> 3.0 IF1 <br> 3.0 IF0 | 3.0 ME(itself) <br> 2.0 IF0 W <br> 1.0 IF0 <br> 1.0 IF1 | 4.0 ME(itself) | 5.0 ME(itself) |
| 1.0 Connects With 4.0 | 1.0 ME(itself) <br> 2.0 IF0 W <br> 3.0 IF0 <br> 3.0 IF1 <br> 4.0 IF2 | 2.0 ME(itself) W <br> 1.0 IF0 <br> 3.0 IF1 <br> 3.0 IF0 <br> 4.0 IF0 | 3.0 ME(itself) <br> 2.0 IF0 W <br> 1.0 IF0 <br> 1.0 IF1 <br> 4.0 IF1 | 4.0 ME(itself) <br> 1.0 IF0 <br> 2.0 IF0 W <br> 3.0 IF0 <br> 3.0 IF0 | 5.0 ME(itself) |
| 2.0 Connects WAN | | Subscribe To 2.0 <br> Subscribe To 1.0 <br> Subscribe To 3.0 <br> Subscribe To 4.0 | | | |
| 5.0 Connects WAN | | | | | Subscribe To 5.0 |

CF Message 3012
- CF Header 3104
- CF Payload 3106

(referenced as 3100)

FIG. 32

(MQTT) Publish Message 3202
- Header 3204
- Publish Flag 3210
- Topic = Destination ID 3212
- Payload 3206
  - CF Message 3012
    - CF Header 3104
    - CF Payload 3106

Or Topic = Cluster ID Portion Of Destination ID + 0000

(referenced as 3200)

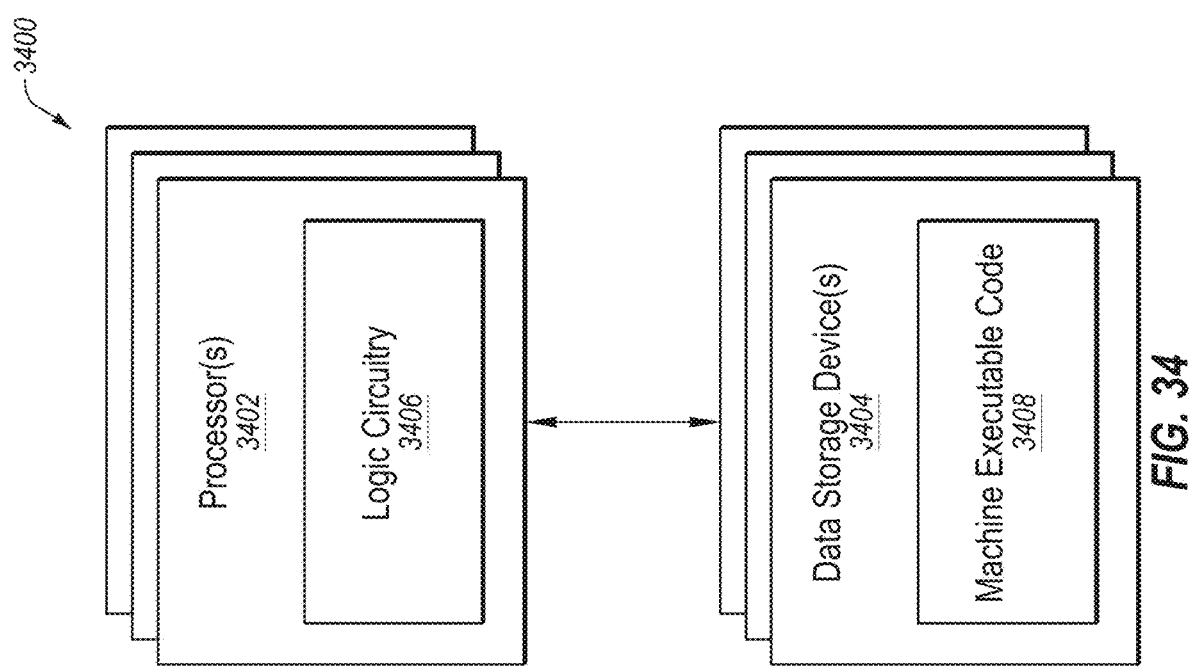

ADDRESSING AND ROUTING FOR DEVICES USING CONNECTIVITY FRAMEWORK FOR EMBEDDED CONNECTIVITY

CROSS-REFERENCE TO RELATED APPLICATIONS

This application claims the benefit under 35 U.S.C. § 119(e) of U.S. Provisional Patent Application No. 63/489,828, filed Mar. 13, 2023, and titled "Connectivity Framework Having Unified Stack And Messaging Protocol For Embedded Secure Connectivity," the entire disclosure of which is hereby incorporated herein by reference. The subject matter of this application is also related to U.S. Patent Application Ser. No. 18/603,984, filed Mar. 13, 2024; U.S. Patent Application Ser. No. 18/603,985, filed Mar. 13, 2024; and U.S. Patent Application Ser. No. 18/603,987, filed Mar. 13, 2024, the disclosure of each of which is hereby incorporated herein in its entirety by this reference.

TECHNICAL FIELD

Examples relate, generally, to a connectivity framework to provide connectivity between computing devices for communication. More specifically, some examples relate to a connectivity framework having a unified application layer stack and messaging protocol to facilitate connectivity for multiple connectivity technologies, including embedded peripheral technologies, for network communications, without limitation.

BACKGROUND

A number of different connectivity technologies are utilized by various types of computing devices. The number of different connectivity technologies utilized by the various types of computing devices is growing, and the number of types of those devices is also growing. Each connectivity technology has its own communication protocol and security. Given the differences in connectivity technologies, it is quite challenging to provide an appropriate connectivity framework solution for connecting computing devices in a common network to "talk" or communicate with each other.

BRIEF DESCRIPTION OF THE DRAWINGS

While this disclosure concludes with claims particularly pointing out and distinctly claiming specific examples, various features and advantages of examples within the scope of this disclosure may be more readily ascertained from the following description when read in conjunction with the accompanying drawings, in which:

FIG. 7D is a diagram depicting fields of a record of an open session (e.g., a buffered structure), according to one or more examples;

FIG. 17A is a block diagram depicting a thumbprint and credentials for connectivity framework security, according to one or more examples;

FIG. 23E is a table indicating actions associated with formation of the mesh network of FIG. 23D, according to one or more examples;

FIG. 31 depicts a message format of a message including a header and a payload, according to one or more examples;

FIG. 32 depicts a message format of a publish message based on the message of FIG. 31, according to one or more examples;

FIG. 34 is a block diagram of circuitry that, in some examples, may be used to implement various functions, operations, acts, processes, and/or methods disclosed herein.

DETAILED DESCRIPTION

Figure 1:
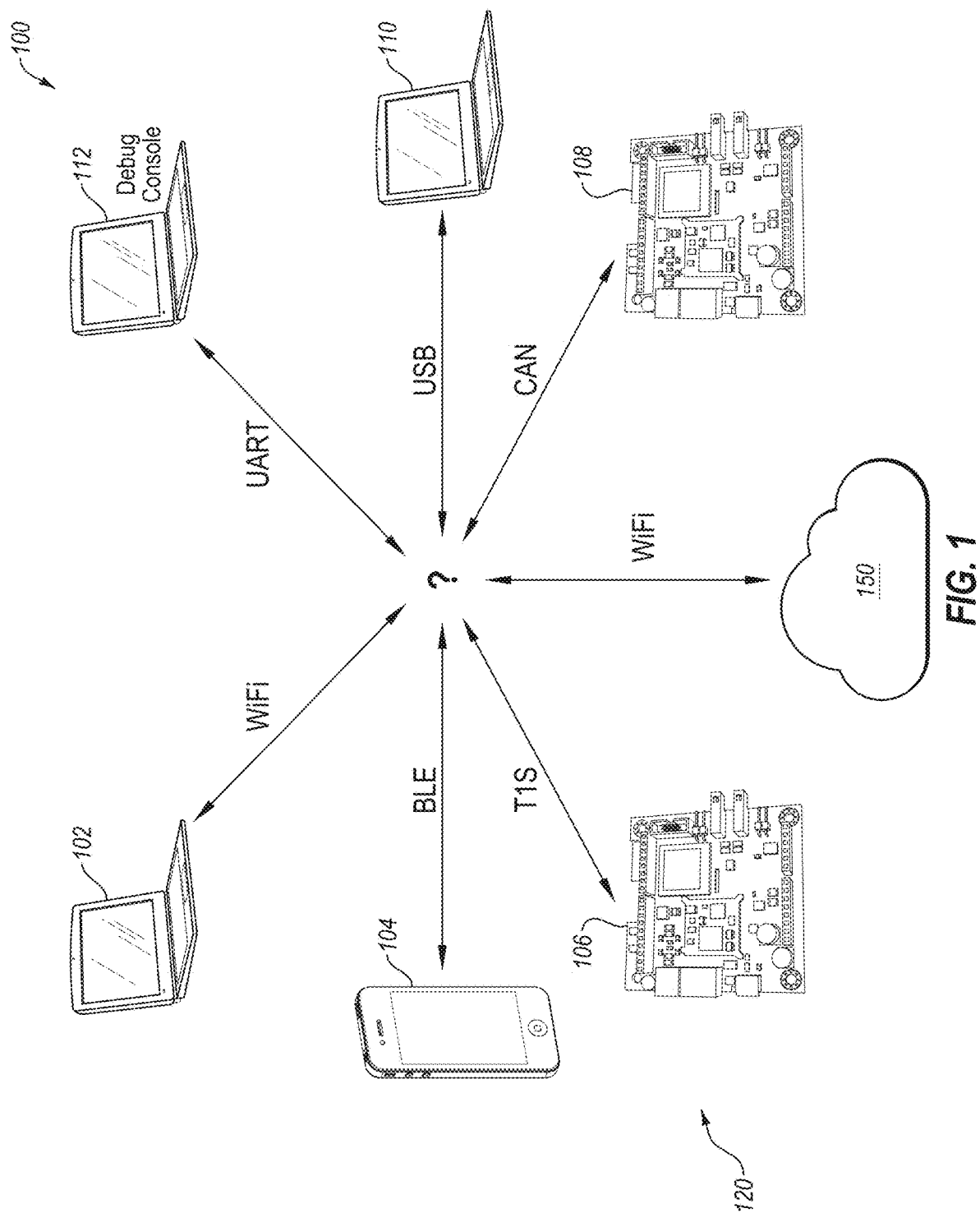
FIG. 1 is an illustrative representation of a system of computing devices having different communication protocols for communication, according to conventional practice.

In the following detailed description, reference is made to the accompanying drawings, which form a part hereof, and in which are shown, by way of illustration, specific examples of examples in which the present disclosure may be practiced. These examples are described in sufficient detail to enable a person of ordinary skill in the art to practice the present disclosure. However, other examples may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example of this disclosure to the specified components, steps, features, functions, or the like.

It will be readily understood that the components of the examples as generally described herein and illustrated in the drawing could be arranged and designed in a wide variety of different configurations. Thus, the following description of various examples is not intended to limit the scope of the present disclosure, but is merely representative of various examples. While the various aspects of the examples may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be depicted by block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, and symbols that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal. A person having ordinary skill in the art would appreciate that this disclosure encompasses communication of quantum information and qubits used to represent quantum information.

The various illustrative logical blocks, modules, and circuits described in connection with the examples disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, or a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

A number of different connectivity technologies are utilized by various types of computing devices. The number of different connectivity technologies utilized by the various types of computing devices is growing and the number of types of devices is also growing. Each connectivity technology has its own communication protocol and security. Connectivity technologies may include Universal Asynchronous Receiver-Transmitter (UART), Inter-Integrated Circuit (I2C), Serial Peripheral Interface (SPI), Controller Area Network (CAN), T1S, Bluetooth or Bluetooth Low Energy (BLE), IEEE 802.15.4 or low-rate wireless personal area network (LR-WPAN), 802.11 or Wi-Fi, Ethernet, and Universal Serial Bus (USB).

UART, BLE, T1S, and CAN are typically associated with embedded peripherals, and Wi-Fi and USB are not typically associated with embedded peripherals. At least some or all of the connectivity technologies associated with embedded peripherals (e.g., UART, I2C, SPI, CAN, and 802.15.4 or LR-WPAN) may be considered to be relatively low-end, low-speed (e.g., slow), and/or low-bandwidth technologies, whereas the other connectivity technologies (e.g., Wi-Fi, USB, and Ethernet) may be considered to be relatively high-end, high-speed (e.g., fast), and/or high-bandwidth technologies.

FIG. 1 is an illustrative representation of a system 100 of computing devices 120 having different communication protocols for communication, according to conventional practice. Multiple computing devices 120 of FIG. 1 include computing devices 102, 104, 106, 108, 110 and 112. Respective ones of computing devices 120 include a peripheral communication device associated with a particular communication protocol. Put another way, the multiple peripheral communication devices used by computing devices 120 are associated with different communication protocols.

According to the examples in FIG. 1, computing device 102 may be a laptop computer including a peripheral communication device for Wi-Fi communications; computing device 104 may be a smartphone including a peripheral communication device for BLE communications; computing device 106 may include a peripheral communication device for T1S communications; computing device 108 may include a peripheral communication device for CAN communications; computing device 110 may be a laptop computer including a peripheral communication device for USB communications; and computing device 112 may be a laptop computer comprising a debug console including a peripheral communication device for UART communications. Other types of computing devices include a desktop personal computer (PC), a tablet or tablet PC, a personal digital assistant (PDA), and so on.

Some of computing devices 120 may include multiple peripheral communication devices having different communication protocols. For example, computing device 104 which is the laptop computer may include not only the peripheral communication device for Wi-Fi communications, but also a peripheral communication device for BLE communications and a peripheral communication device for USB communications.

Given the differences in connectivity technologies, it is quite challenging to design an appropriate connectivity framework solution for connecting computing devices 120 in a common network to "talk" or communicate with one another (as indicated by the question mark in the center of the grouping of computing devices 120 of FIG. 1).

Figure 2:
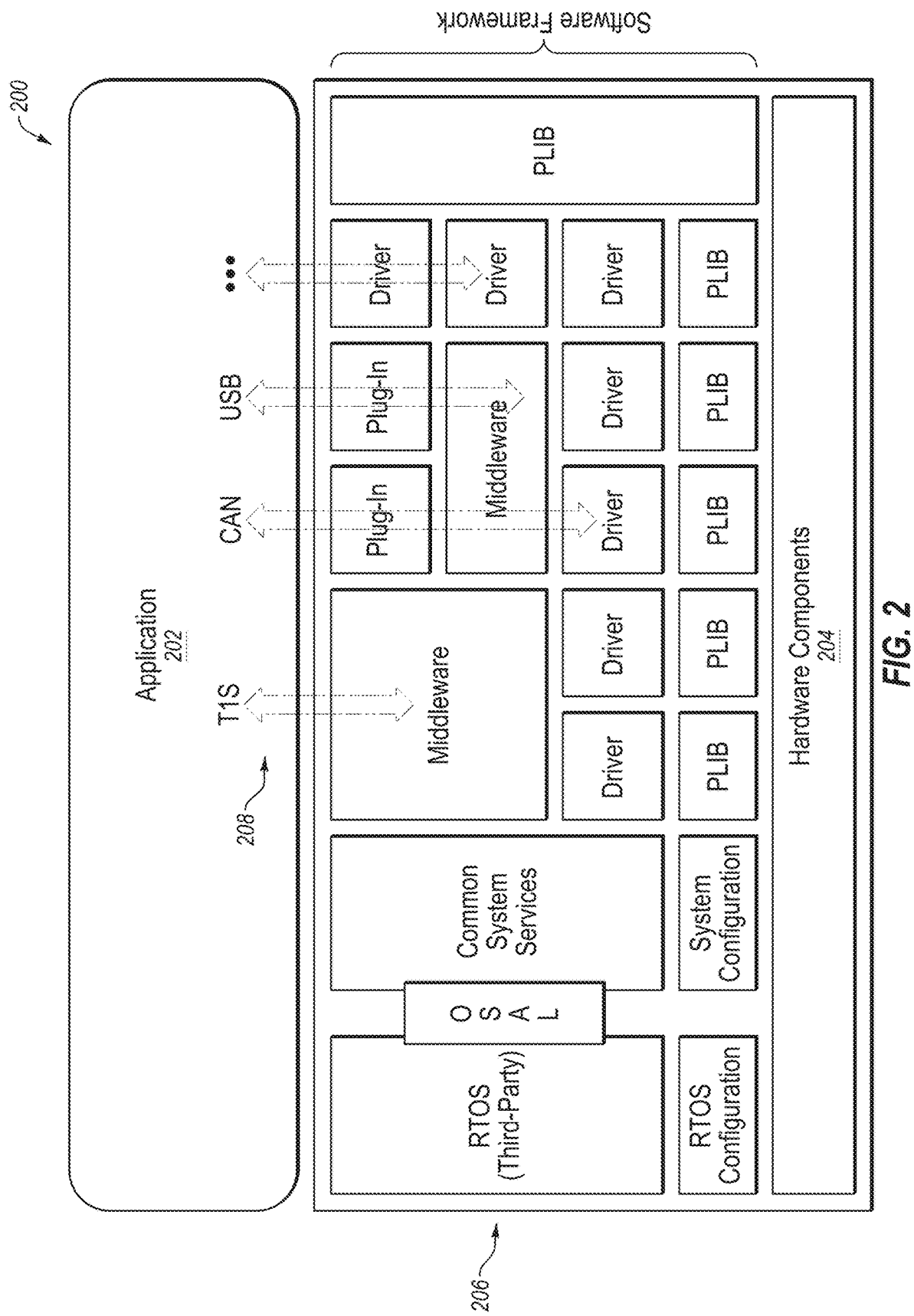
FIG. 2 is a block diagram of a software framework of an example computing device of the multiple computing devices of FIG. 1, according to conventional practice.

FIG. 2 is a block diagram of a software framework 200 of an example computing device of the multiple computing devices of FIG. 1, according to conventional practice. The computing device includes multiple peripheral communication devices for communication. Software framework 200 includes an application 202 and middleware and driver components 206 that reside between application 202 and hardware components 204 of the computing device. Here, application 202 of the computing device is required to process and manage different data communications 208 according to the different communication protocols of its multiple peripheral communication devices. For example, application 202 of the computing device may be required to process and manage the different communications 208 associated with T1S, CAN, USB, and so on.

Typical approaches for connectivity across peripherals known to the inventor of this disclosure attempt to port the Transmission Control Protocol/Internet protocol (TCP/IP) and Transport Layer Security (TLS) stack on top of the peripheral (e.g., a relatively slow or low-speed, embedded peripheral, without limitation). If this succeeds (e.g., for a relatively fast or high-speed peripheral, without limitation), it will be done at the expense of a consistent memory footprint, often making the overall application not any more convenient to use. Note that the TCP/IP approach requires processing and a footprint that is relatively high (e.g., often >100 kB, for all services and standard compliant implementations of them with TLS).

With reference back to FIG. 1, connectivity for computing devices 120 may be facilitated by a service provider, such as a cloud service provider 150. Depending on the connectivity technology, connectivity may be facilitated by cloud service provider 150 with use of a Software Development Kit (SDK). An SDK includes a set of software-building tools for a specific platform for allowing cloud service provider 150 to offer connectivity services. Once software is built using an SDK, customers are often "locked-in" to cloud service provider 150 for its connectivity services. Also, as each peripheral has its own protocol and security, data will likely be exposed somewhere in the network (e.g., in cloud service provider 150, or in a gateway) and hence, end-to-end encryption is not guaranteed.

As is apparent, today's networking protocols do not guarantee true end-to-end encryption between two nodes when multiple protocols, gateways, and/or the cloud are utilized. At the same time, a customer is required to use the vendor SDK and its security infrastructure, which prevents easy migration and increases costs.

According to one or more examples of the disclosure, a connectivity framework comprises an application layer stack for universal secure connectivity for multiple connectivity technologies. In one or more examples, the connectivity framework includes a software stack that runs in the application layer, on top of specific drivers that handle communication peripherals. The stack collects data from lower-level interfaces of input/output buffers of the peripherals in a common networking protocol. In one or more examples, the stack helps abstract the specifics of any communication stack and offers to the application a unique interface to communicate messages to and from any peripheral. The stack may be a common software stack that is utilized at respective ones of the computing devices utilizing the different communication peripherals. In one or more examples, the stack may also be utilized at a gateway that interconnects the multiple computing devices or nodes in the network.

In one or more examples, the connectivity framework utilizes a light-weight protocol that can easily be ported to most any peripheral (e.g., a low-end, low-throughput embedded peripheral), and also ensure end-to-end encryption using a security protocol that is compliant with relevant standards. In one or more examples, the connectivity framework comes natively with routing capability, addressing, network formation, and mesh and cloud connectivity.

Again, in one or more examples, processing of the connectivity framework resides in the application layer. Put another way, the processing of the connectivity framework runs on top of the drivers/middleware/operating system (OS) layers of the computing device. Such a configuration makes the connectivity framework highly portable, for example, to any existing architecture that offers, for each channel, a way to transfer data (bytes) out from an output buffer of the peripheral and receive in data (bytes) from an input buffer of the peripheral. The application may easily access the application programming interfaces (APIs) and services that are offered by the connectivity framework.

Figure 3:
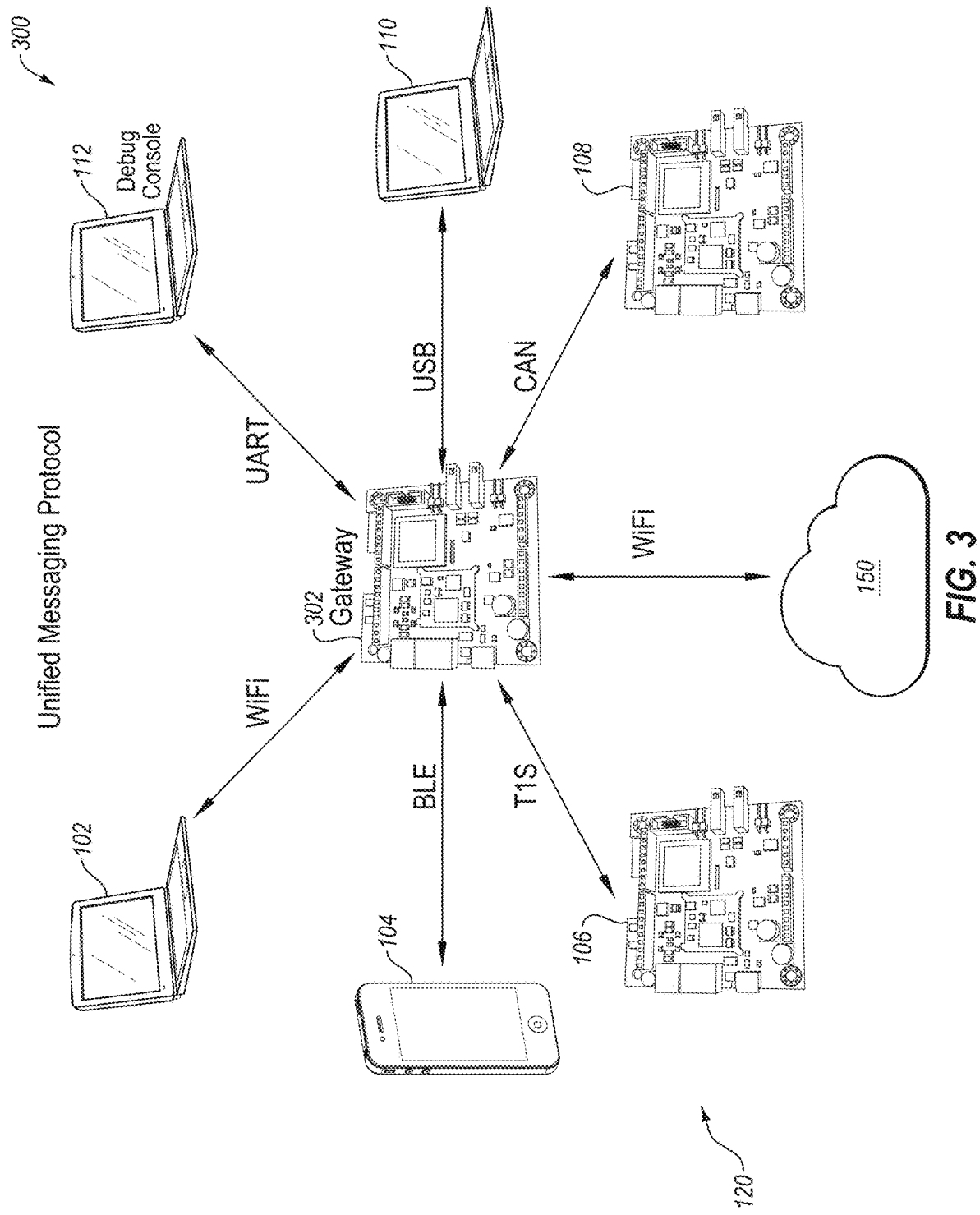
FIG. 3 is an illustrative representation of a system of communication for computing devices, according to one or more examples of the disclosure.

FIG. 3 is an illustrative representation of a system 300 of communication for computing devices 120, according to one or more examples of the disclosure. Computing devices 120 may be the same devices as described in relation to FIG. 1, but adapted according to one or more examples of the disclosure. In one or more examples, respective ones of computing devices 120 may communicate with other devices directly, or through one or more gateways, such as a gateway 302.

According to one or more examples, computing devices 120 are adapted to communicate with each other via the multiple peripheral communication devices according to a unified messaging protocol. The unified messaging protocol used by computing devices 120 is common to the different multiple peripheral communication devices of computing devices 120. According to one or more examples, computing devices 120 may also be adapted to establish secure communication sessions with each other according to an exchange of messages of a mutual authentication and key exchange protocol. The mutual authentication and key exchange protocol used by computing devices 120 is common to the different multiple peripheral communication devices of computing devices 120.

Figure 4A:
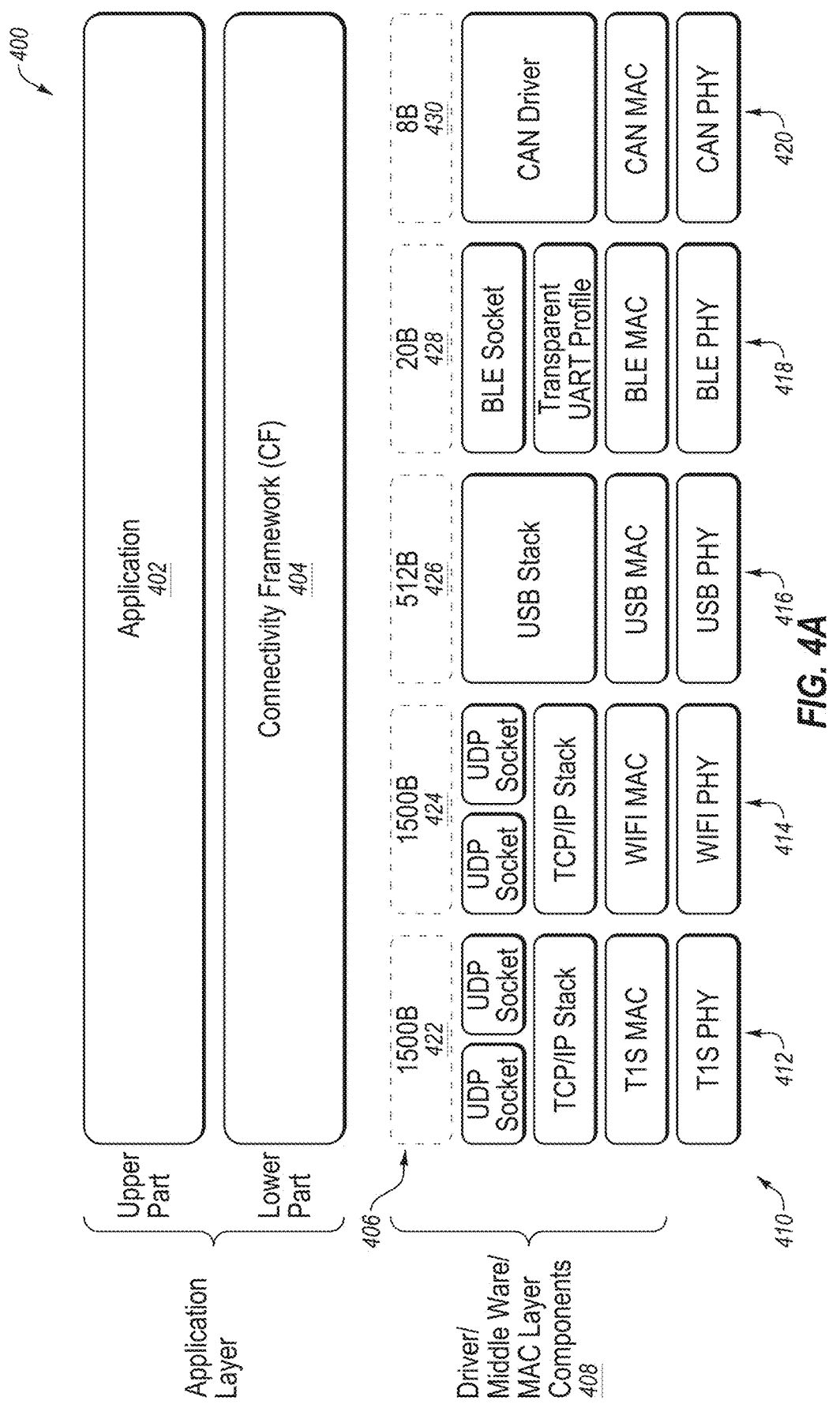
FIG. 4A is a block diagram depicting a connectivity framework system including a connectivity framework for a computing device, according to one or more examples.

FIG. 4A is a block diagram depicting a connectivity framework system 400 including a connectivity framework 404 for a computing device, according to one or more examples. Connectivity framework 404 of connectivity framework system 400 may be utilized by respective ones of computing devices 120 and/or gateway 302 of FIG. 3 to facilitate the unified messaging protocol and/or the mutual authentication and key exchange protocol.

Connectivity framework system 400 of FIG. 4A includes an application 402, connectivity framework 404, and multiple peripheral communication devices 410 of the computing device. In one or more examples, connectivity framework 404 may be, include, and/or be referred to as a connectivity framework processing module(s), and/or include connectivity framework processing instructions or connectivity framework processing. In one or more examples, connectivity framework 404 comprises processor-executable instructions stored in a processor-readable medium (e.g., a data storage device or memory) of the computing device. The processor-executable instructions are executable by one or more processors of the computing device.

Connectivity framework 404 may be provided between application 402 and driver/middleware/MAC layer components 408 ("layer components 408") of respective ones of multiple peripheral communication devices 410. Respective ones of layer components 408 are on top of respective ones of physical layer components of multiple peripheral communication devices 410.

Accordingly, in one or more examples, the processor-executable instructions of connectivity framework 404 comprise an application layer protocol stack to be executed by the one or more processors of the computing device. As illustrated in FIG. 4A, application 402 may operate in an upper part or sublayer of the application layer and connectivity framework 404 may reside in a lower part of sublayer of the application layer.

In the specific, non-limiting example of FIG. 4A, multiple peripheral communication devices 410 of the computing device include a T1S interface 412, a Wi-Fi interface 414, a USB interface 416, a BLE interface 418, and a CAN interface 420. Respective ones of layer components 408 may include, from bottom to top, the following components. For T1S interface 412 including a T1S PHY component: a T1S MAC, a TCP/IP stack, and UDP and TCP sockets; for Wi-Fi interface 414 including a Wi-Fi PHY component: a Wi-Fi MAC, a TCP/IP stack, and UDP and TCP sockets; for USB interface 416 including a USB PHY component: a USB MAC and a USB stack; for BLE interface 418 including a BLE PHY component: a BLE MAC, a transparent UART profile, and a BLE socket; for CAN interface 420 including a CAN PHY component: a CAN MAC and a CAN driver.

Multiple peripheral communication devices 410 include input/output (I/O) buffers 406 (over layer components 408) exposed to connectivity framework 404. In the specific, non-limiting example of FIG. 4A, I/O buffers 406 of multiple peripheral communication devices 410 include I/O buffers 422 for T1S interface 412 (e.g., each buffer having a 1500-byte size); I/O buffers 424 for Wi-Fi interface 414 (e.g., each buffer having a 1500-byte size); I/O buffers 426 for USB interface 416 (e.g., each buffer having a 512-byte size); I/O buffers 428 for BLE interface 418 (e.g., each buffer having a 20-byte size); and I/O buffers 430 for CAN interface 420 (e.g., each buffer having a 8-byte size). The sizes associated with each buffer may represent the typical buffer sizes of each buffer, and/or may be associated with the maximum transmissible unit (MTU) of the peripheral communication devices.

Despite the differences in the connectivity technologies of FIG. 3, the use of connectivity framework 404 of FIG. 4A for respective ones of computing devices 120 and/or gateway 302 facilitates communications amongst computing devices 120 in a common network. Connectivity framework 404 is to facilitate data communications in messages via the respective ones of multiple peripheral communication devices 410 according to a unified messaging protocol that is common to multiple peripheral communication devices 410. In one or more examples, connectivity framework 404 is to facilitate the data communications in the messages according to the unified messaging protocol in cooperation with application 402.

In addition, connectivity framework 404 is to facilitate establishment of respective ones of secure communication sessions with respective destination devices via the respective ones of multiple peripheral communication devices 410 according to an exchange of messages of a mutual authentication and key exchange protocol that is common to multiple peripheral communication devices 410. In one or more examples, connectivity framework 404 is to facilitate the establishment of the secure communication sessions according to the exchange of messages of the mutual authentication and key exchange protocol in cooperation with application 402.

Figure 4B:
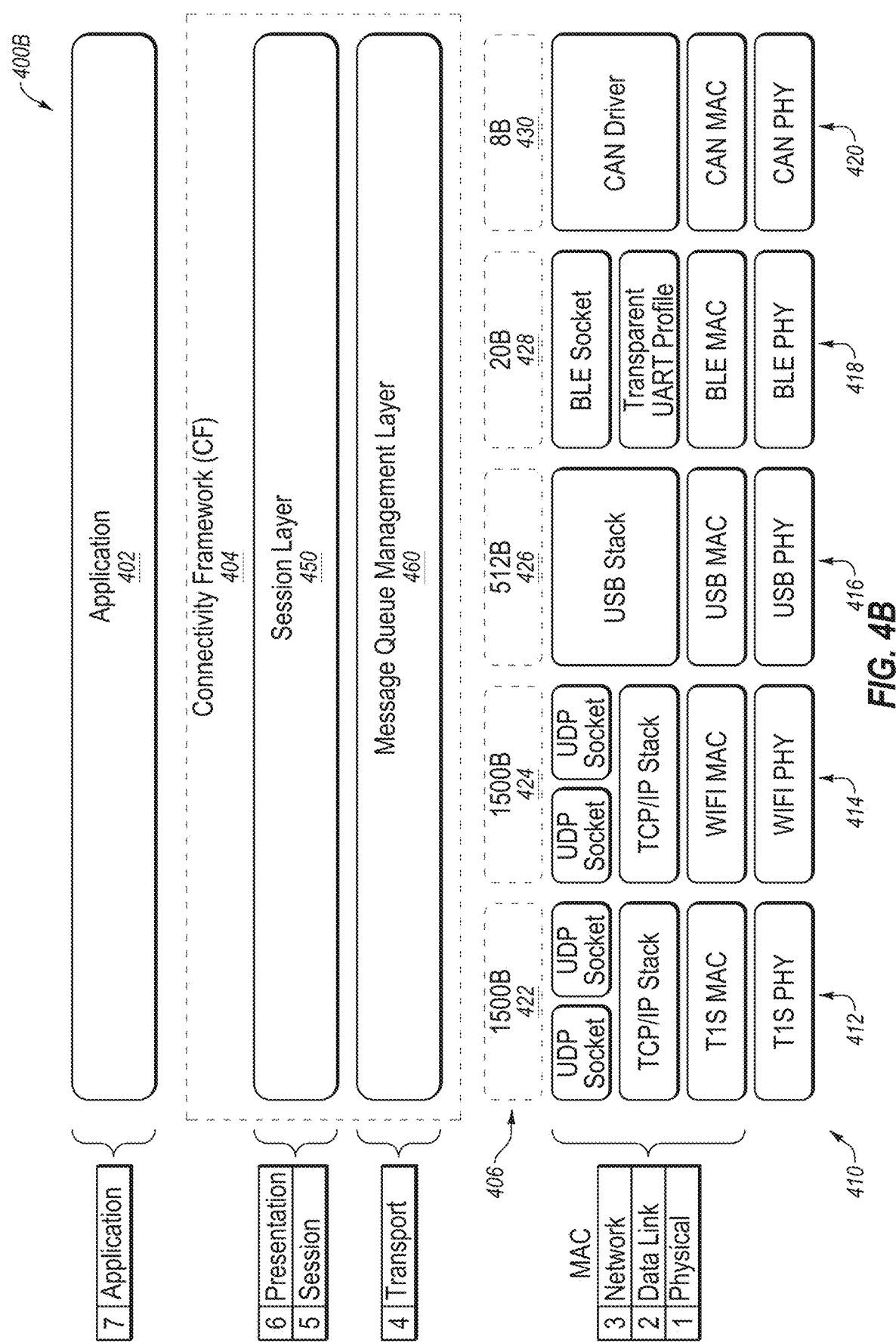
FIG. 4B is the connectivity framework system of FIG. 4A, illustrating the connectivity framework to include processing associated with a sessions layer, as well as processing associated with a message queue management layer.

FIG. 4B is the connectivity framework system 400 of FIG. 4A, illustrating the connectivity framework 404 to include processing (e.g., processor-executable instructions) associated with a sessions layer 450, as well as processing (e.g., processor-executable instructions) associated with a message queue management layer 460. In one or more examples, message queue management layer 460 may be and/or be referred to as a message pool abstraction layer.

Figure 4C:
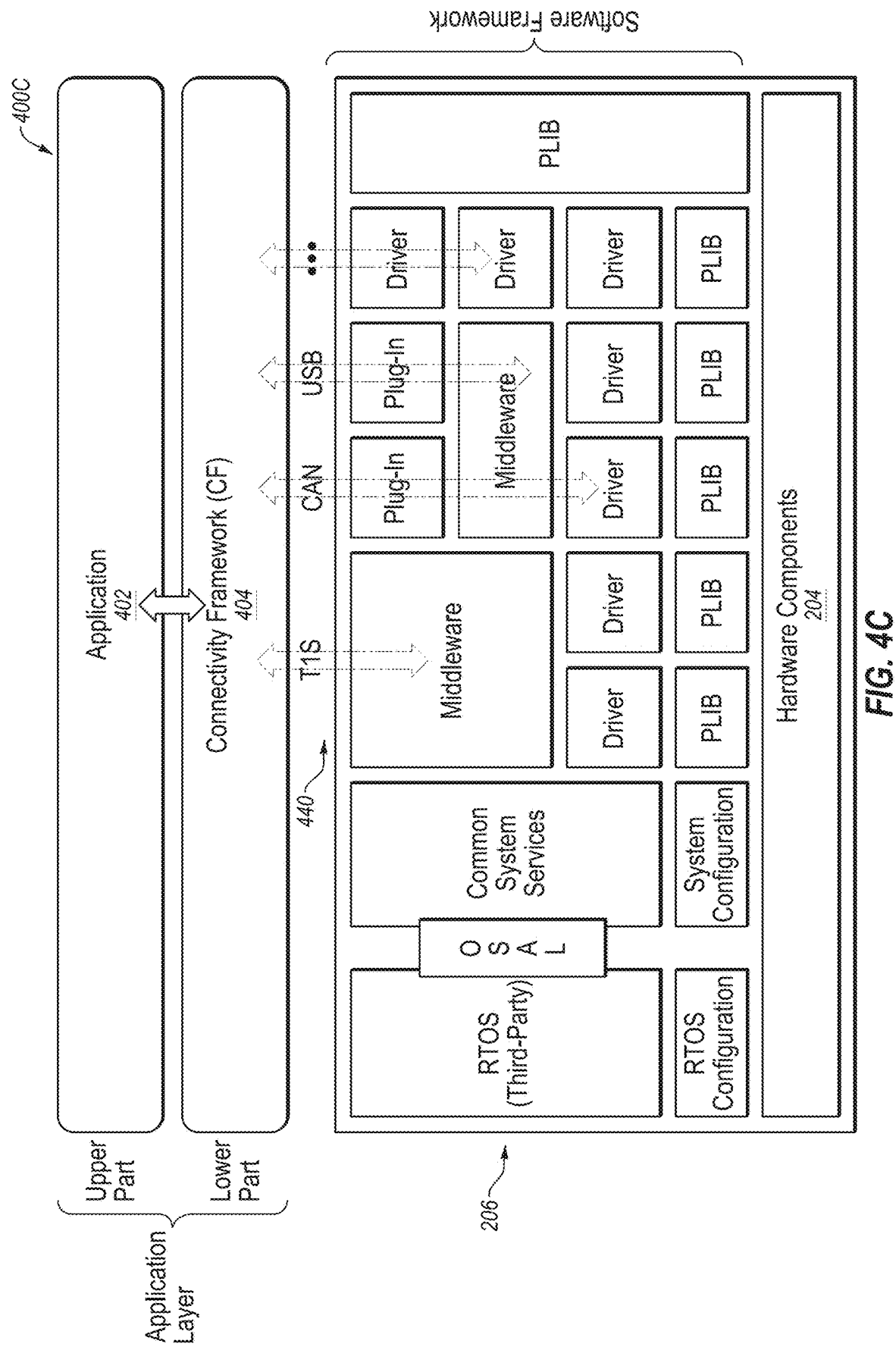
FIG. 4C is a block diagram of a software framework of an example computing device, according to one or more examples.

FIG. 4C is a block diagram of a software framework 400C of an example computing device, according to one or more examples. Software framework 400C of FIG. 4C is provided for comparison to software framework 200 of FIG. 2 according to conventional practice. In one or more examples of FIG. 4C, the computing device having software framework 400C includes multiple peripheral communication devices for communication. Software framework 400C includes connectivity framework 404 that resides between application 402 and middleware and driver components 206 which are on top of hardware components 204 of the computing device. In one or more examples, software framework 400C is provided as part of an application layer protocol stack in the lower part or sublayer of the application layer, whereas application 402 is provided in the upper part or sublayer of the application layer. In FIG. 4C, connectivity framework 404 is to provide data communications 440 in messages via the respective ones of the multiple peripheral communication devices according to a unified messaging protocol that is common to the multiple peripheral communication devices. For example, connectivity framework 404 may provide data communications 440 in messages via the respective ones of the T1S, CAN, and USB interfaces according to the unified messaging protocol that is common to the T1S, CAN, and USB interfaces.

In the specific, non-limiting example of FIG. 4A, a connectivity framework system for a computing device may be built upon MPLAB® Harmony using MPLAB® Code Configurator (MCC). MPLABR Harmony is a layered framework of modular libraries that provide flexible and interoperable software "building blocks" for developing embedded applications. MPLAB® Harmony is part of a broad and expandable ecosystem, providing demonstration applications, third-party offerings, and development tools, such as the MPLAB® Harmony Configurator (MHC). MPLAB® is a registered trademark of Microchip Technologies Incorporated, 2355 West Chandler Boulevard, Chandler, Arizona, U.S.A., 85224-6199. In one or more other examples, the connectivity framework system for a computing device may be built using other tools and/or in other suitable programming environments, for example, those available from NXP Semiconductors N.V., STMicroelectronics N.V. (STM), Silicon Laboratories, Inc. (Silicon Labs), Texas Instruments Incorporated (TI), and so on.

Figure 5:
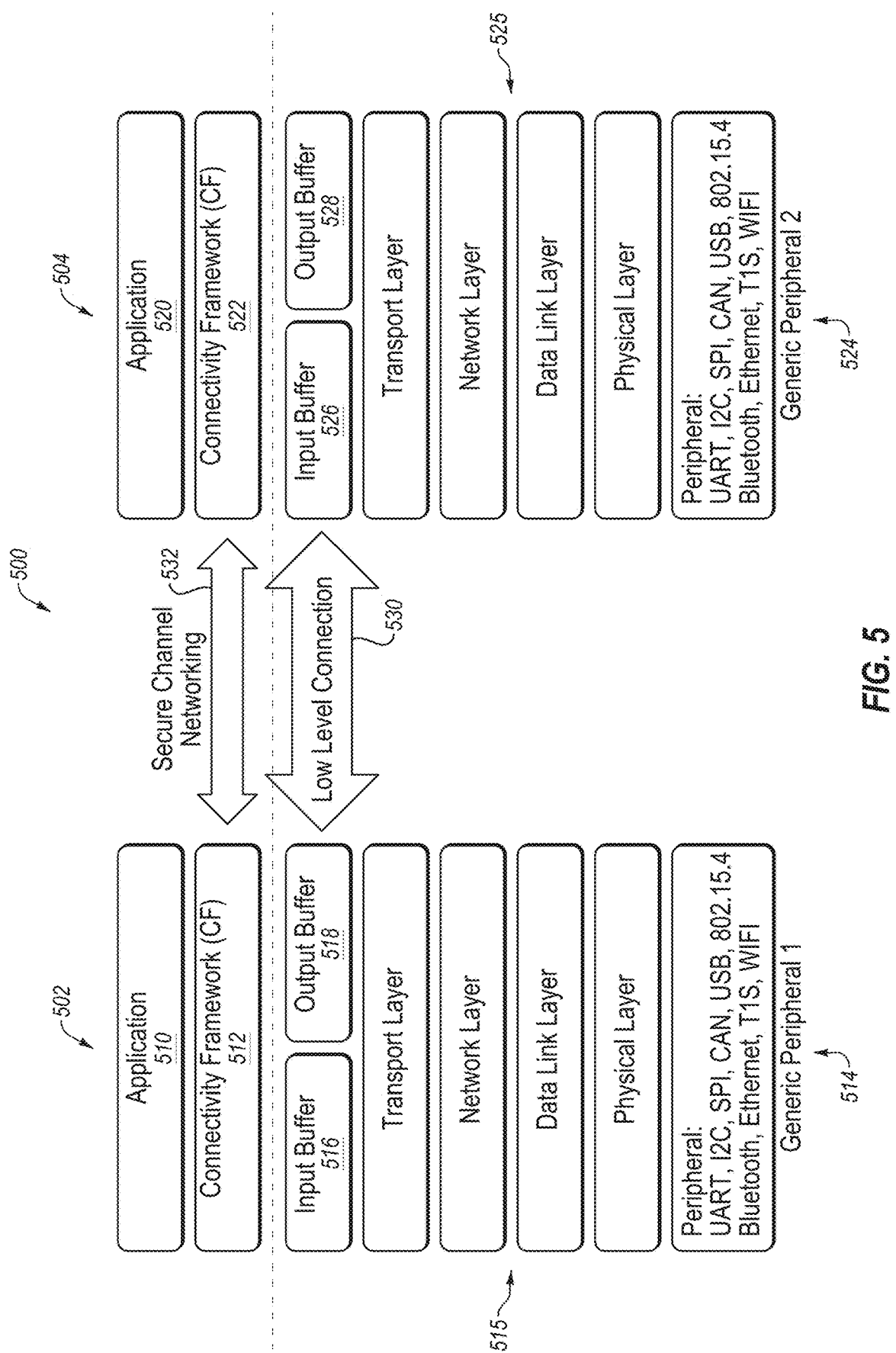
FIG. 5 is a block diagram depicting a system of communication for computing devices, according to one or more examples.

FIG. 5 is a block diagram depicting a system 500 of communication for computing devices, according to one or more examples. The computing devices of system 500 of FIG. 5 include a computing device 502 and a computing device 504. Respective ones of computing device 502 and computing device 504 may be configured according to connectivity framework 404 of FIGS. 4A and 4B.

Computing device 502 includes an application 510, layer components 515 of a peripheral communication device 514, and a connectivity framework 512 in between application 510 and layer components 515 of peripheral communication device 514. In one or more examples, peripheral communication device 514 may be or include one or more of a UART interface, an I2C interface, a SPI interface, a USB interface, an IEEE 802.15.4 interface, a Bluetooth interface, an Ethernet interface, a T1S interface, and a Wi-Fi interface. In one or more examples, peripheral communication device 514 is a single, low-throughput, embedded peripheral. Layer components 515 may be or include driver/middleware/MAC layer components of peripheral communication device 514 and are indicated in FIG. 5 to include components of a data link layer, a network layer, and a transport layer, according to one or more examples.

For computing device 502, connectivity framework 512 is to serve as an interface between application 510 and peripheral communication device 514 for facilitating the unified messaging protocol and/or the mutual authentication and key exchange protocol. In one or more examples, connectivity framework 512 is to prepare and/or encode messages on behalf of application 510 (e.g., messages including data from application 510, and/or messages for the mutual authentication and key exchange protocol) for sending from computing device 502 via peripheral communication device 514. In one or more examples, connectivity framework 512 is to receive and decode messages on behalf of application 510 (e.g., messages including data for application 510, and/or messages for the mutual authentication and key exchange protocol) received via peripheral communication device 514. Peripheral communication device 514 includes an input buffer 516 and an output buffer 518 exposed to connectivity framework 512. Connectivity framework 512 is to write data to input buffer 516 for transmitting data/messages via peripheral communication device 514, and to read data from output buffer 518 for receiving data/messages via peripheral communication device 514.

Similarly, computing device 504 includes an application 520, layer components 525 of a peripheral communication device 524, and a connectivity framework 522 in between application 520 and layer components 525 of peripheral communication device 524. In one or more examples, peripheral communication device 524 may be or include one or more of a UART interface, an I2C interface, a SPI interface, a USB interface, an IEEE 802.15.4 interface, a Bluetooth interface, an Ethernet interface, a T1S interface, and a Wi-Fi interface. In one or more examples, peripheral communication device 524 is a single, low-throughput, embedded peripheral. In one or more examples, peripheral communication device 524 of computing device 504 is different from peripheral communication device 514 of computing device 502. Layer components 525 may be or include driver/middleware/MAC layer components of peripheral communication device 524 and are indicated in FIG. 5 to include components of a data link layer, a network layer, and a transport layer, according to one or more examples.

For computing device 504, connectivity framework 522 is to serve as an interface between application 520 and peripheral communication device 524 for facilitating the unified messaging protocol and/or the mutual authentication and key exchange protocol. In one or more examples, connectivity framework 522 is to prepare and/or encode messages on behalf of application 520 (e.g., messages including data from application 520, and/or messages for the mutual authentication and key exchange protocol) for sending from computing device 504 via peripheral communication device 524. In one or more examples, connectivity framework 522 is to receive and decode messages on behalf of application 520 (e.g., messages including data for application 520, and/or messages for the mutual authentication and key exchange protocol) received via peripheral communication device 524. Peripheral communication device 524 includes an input buffer 526 and an output buffer 528 exposed to connectivity framework 522. Connectivity framework 522 is to write data to input buffer 526 for transmitting data/messages via peripheral communication device 524, and to read data from output buffer 528 for receiving data/messages via peripheral communication device 524.

Given the above-described arrangement, computing devices 502 and 504 may communicate messages with each other according to a unified message protocol. Here, a low-level connection 530 may be established between computing devices 502 and 504, and a networking channel 532 for secure channel networking may also be established between computing devices 502 and 504.

With reference back to FIGS. 4A and 4B, being part of the application layer, connectivity framework 404 may run on existing hardware, and even on existing peripheral drivers/stacks, given that I/O buffers 406 handled by the legacy drivers/firmware/peripheral interfaces are exposed. In one or more examples, connectivity framework 404 will "hook" to I/O buffers 406, prepare the data (bytes) to be sent out by the lower layers, and process the data (bytes) coming in. In one or more examples, connectivity framework 404 is completely abstracted from the hardware and low-level firmware. In one or more examples, connectivity framework 404 comprises a built-in hardware abstraction layer (HAL). In one or more examples, connectivity framework 404 is simpler and lighter (>30 kB) than available approaches but still provides the necessary features to run a secure and versatile network that is available for all peripherals.

In FIGS. 4A and 4B, the sizes of I/O buffers 406 indicate typical buffer sizes associated with the transport layer for the respective peripheral devices, per the standard drivers associated with the respective peripherals. The buffers represent the "point-of-contact" between connectivity framework 404 and the existing lower-layers. Once a message of connectivity framework 404 needs to be communicated on a given peripheral, connectivity framework 404 allocates its memory access capabilities in multiples of that buffer size for memory access associated with its message queue. In one or more examples, such operation is performed in order to remain compliant with the underlying standard driver/MAC implementation. For example, a CAN bus will accept data portions of 8 bytes each, a BLE 4.0 implementation will always have an MTU of 20B, and so on, no matter what hardware is utilized, or what driver is utilized, etc. Given that connectivity framework 404 complies with these buffer sizes, it may always be safely implemented on top of any hardware/driver/MAC layer component. Such an implementation makes connectivity framework 404 highly portable to (most) any microcontroller unit and (most) any peripheral hardware.

In one or more examples, a connectivity framework of the disclosure may comprise processor-executable instructions stored in a processor-readable medium (e.g., a data storage device or memory). The processor-executable instructions are executable by one or more processors of a computing device which includes one or more peripheral communication devices. In one or more examples, the processor-executable instructions comprise an application layer protocol stack to be executed by the one or more processors of the computing device.

In one or more examples, the computing device may include multiple peripheral communication devices of different communication protocol types. In one or more examples, the multiple peripheral communication devices comprise three or more of (e.g., or even five or more of) a UART interface, an I2C interface, an SPI interface, a CAN interface, a T1S interface, a Bluetooth or BLE interface, an IEEE 802.15.4 or LR-WPAN interface, a Wi-Fi interface, an Ethernet interface, and a USB interface. In one or more examples, the multiple peripheral communication devices comprise one or more embedded peripheral communication devices and one or more non-embedded peripheral communication devices. In one or more other examples, the computing device includes only a single peripheral communication device, such as an embedded peripheral communication device (e.g., a UART interface, an I2C interface, an SPI interface, a CAN interface, a T1S interface, a Bluetooth or BLE interface, or an IEEE 802.15.4 or LR-WPAN interface).

Figure 6A:
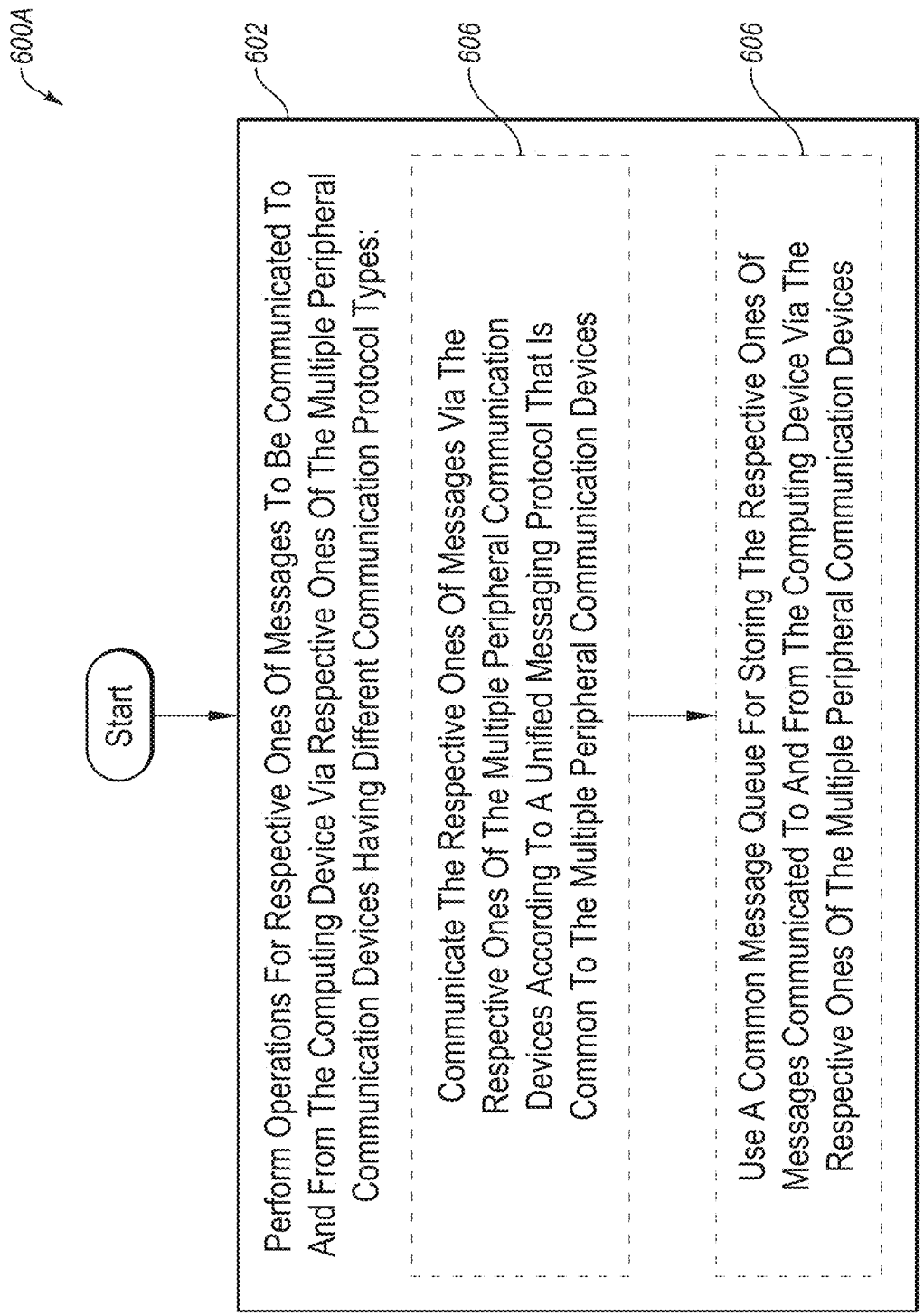
FIG. 6A is a method for communications-related processing of a connectivity framework, according to one or more examples.
Figure 6B:
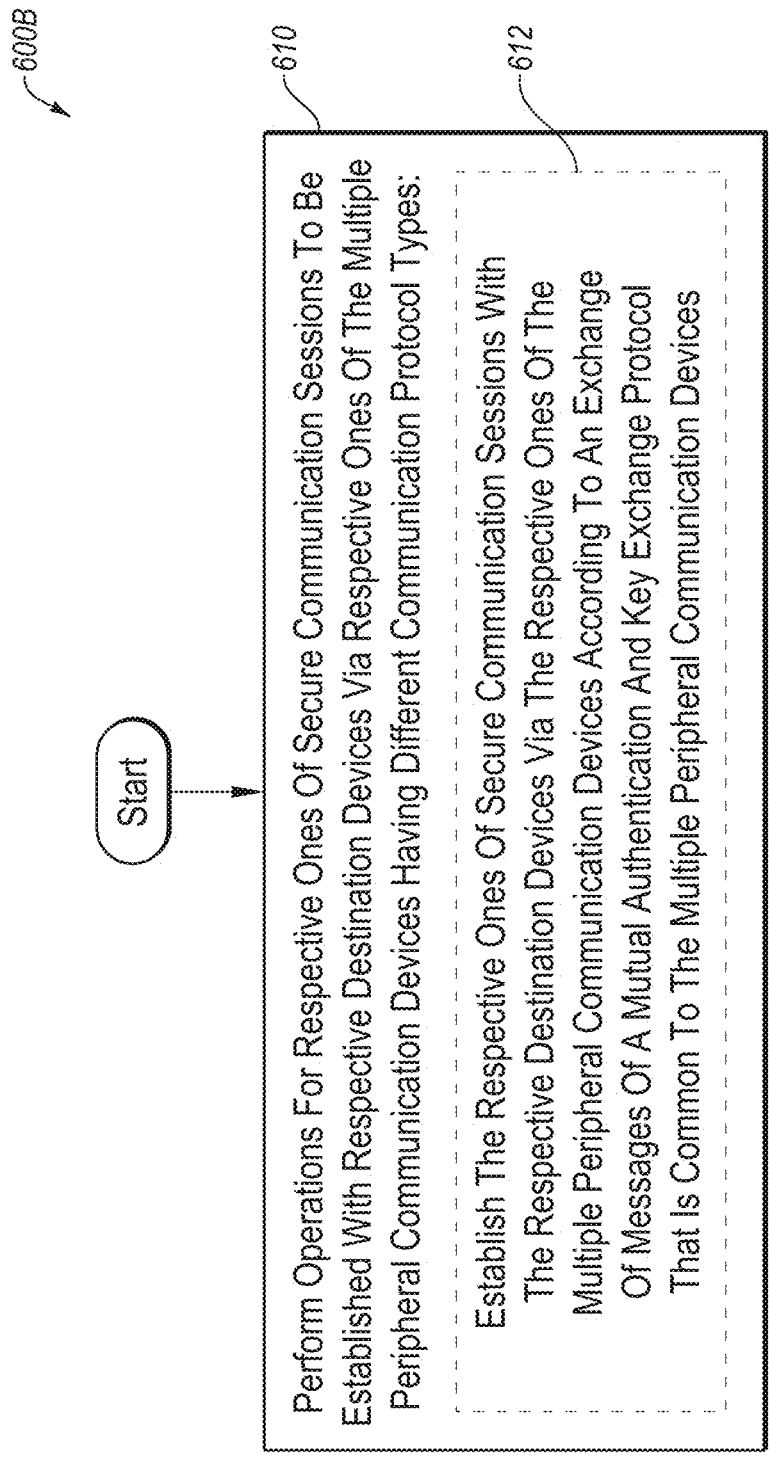
FIG. 6B is a method for communications-related processing of a connectivity framework, according to one or more examples.

In one or more examples, the processor-executable instructions of the connectivity framework processing module are adapted such that, when executed by the one or more processors, cause the one or more processors to perform operations described in relation to FIG. 6A and/or FIG. 6B.

FIG. 6A is a method 600A for communications-related processing of a connectivity framework, according to one or more examples. The communications-related processing of method 600A may be for connectivity framework 404 of FIGS. 4A, 4B and 5, and/or for connectivity frameworks 512 and 522 of FIG. 5. At an act 602, operations are performed for respective ones of messages to be communicated to and from the computing device via respective ones of the multiple peripheral communication devices. The operations may include, at an act 604, communicating the respective ones of messages via the respective ones of the multiple peripheral communication devices according to a unified messaging protocol that is common to the multiple peripheral communication devices. The operations may further include, at an act 606, using a common message queue for (temporarily) storing the respective ones of messages communicated to and from the computing device via the respective ones of the multiple peripheral communication devices. In one or more examples, the operations may further include the communications-related processing according to a method 600B of FIG. 6B.

FIG. 6B is a method 600B for communications-related processing of a connectivity framework, according to one or more examples. The communications-related processing of method 600B may be for connectivity framework 404 of FIGS. 4A, 4B, and 5, and/or for connectivity frameworks 512 and 522 of FIG. 5. At an act 610, operations are performed for respective ones of secure communication sessions to be established with respective destination devices via respective ones of the multiple peripheral communication devices. The operations may include, at an act 612, establishing the respective ones of secure communication sessions with the respective destination devices via the respective ones of the multiple peripheral communication devices according to an exchange of messages of a mutual authentication and key exchange protocol that is common to the multiple peripheral communication devices. In one or more examples, the operations may further include the communications-related processing according to a method 600A of FIG. 6A.

Connectivity framework messaging is now described. Networking and sessions may be established through an exchange of messages, all referring to a unique message structure. In one or more examples, the same message structure may be utilized throughout the network, travelling unmodified on any peripheral, even on a cloud connection.

Figure 7A:
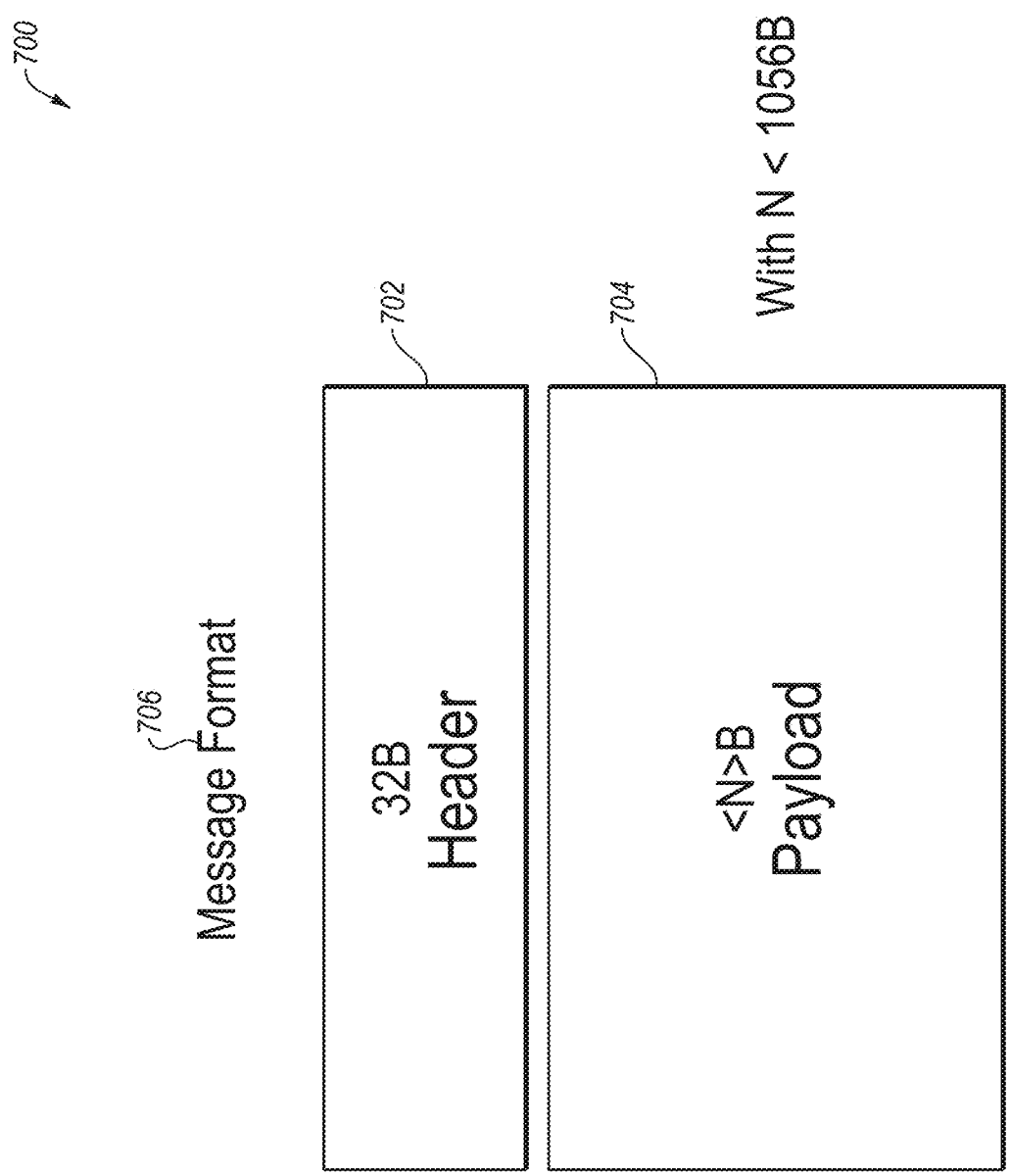
FIG. 7A is a block diagram depicting a message format of a message for communication in accordance with connectivity framework messaging, according to one or more examples.

FIG. 7A is a block diagram depicting a message format 706 of a message 700 for communication in accordance with connectivity framework messaging, according to one or more examples. Message format 706 of the message 700 includes a header 702 and a payload 704. In one or more examples, header 702 is a fixed-length header having a predefined length (e.g., 32 bytes). In one or more examples, payload 704 has a maximum payload length of N<1056 bytes.

Figure 7B:
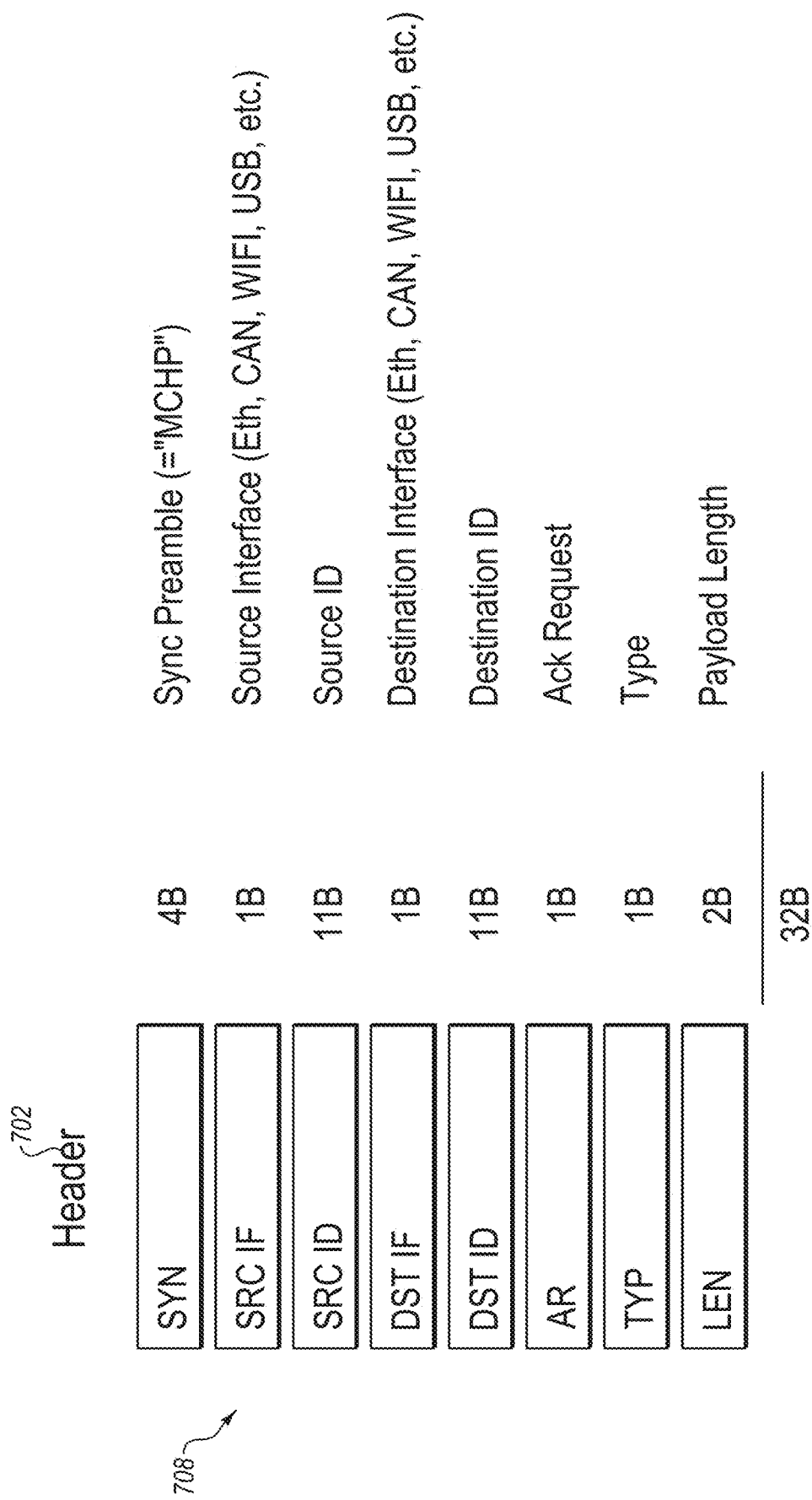
FIG. 7B is a diagram depicting header of the message of FIG. 7A, according to one or more examples.

FIG. 7B is a diagram depicting header 702 of the message of FIG. 7A, according to one or more examples. Header 702 is shown to include header fields 708. Header fields 708 include a sync preamble (SYN), a source interface (SRC IF), a source ID (SRC ID), a destination interface (DST IF), a destination ID (DST ID), an acknowledgement request (AR), a type (TYP), and a payload length (LEN). The source and the destination interfaces each may indicate an appropriate peripheral interface, such as Ethernet, CAN, Wi-Fi, USB, and so on. In one or more examples, the sync preamble has a length of 4 bytes, the source interface may have a length of 1 byte, the source ID may have a length of 11 bytes, the destination interface may have a length of 1 byte, the destination ID may have a length of 11 bytes, the acknowledgement request may have a length of 1 byte, the type may have a length of 1 byte, and the payload length may have a length of 2 bytes.

Figure 7C:
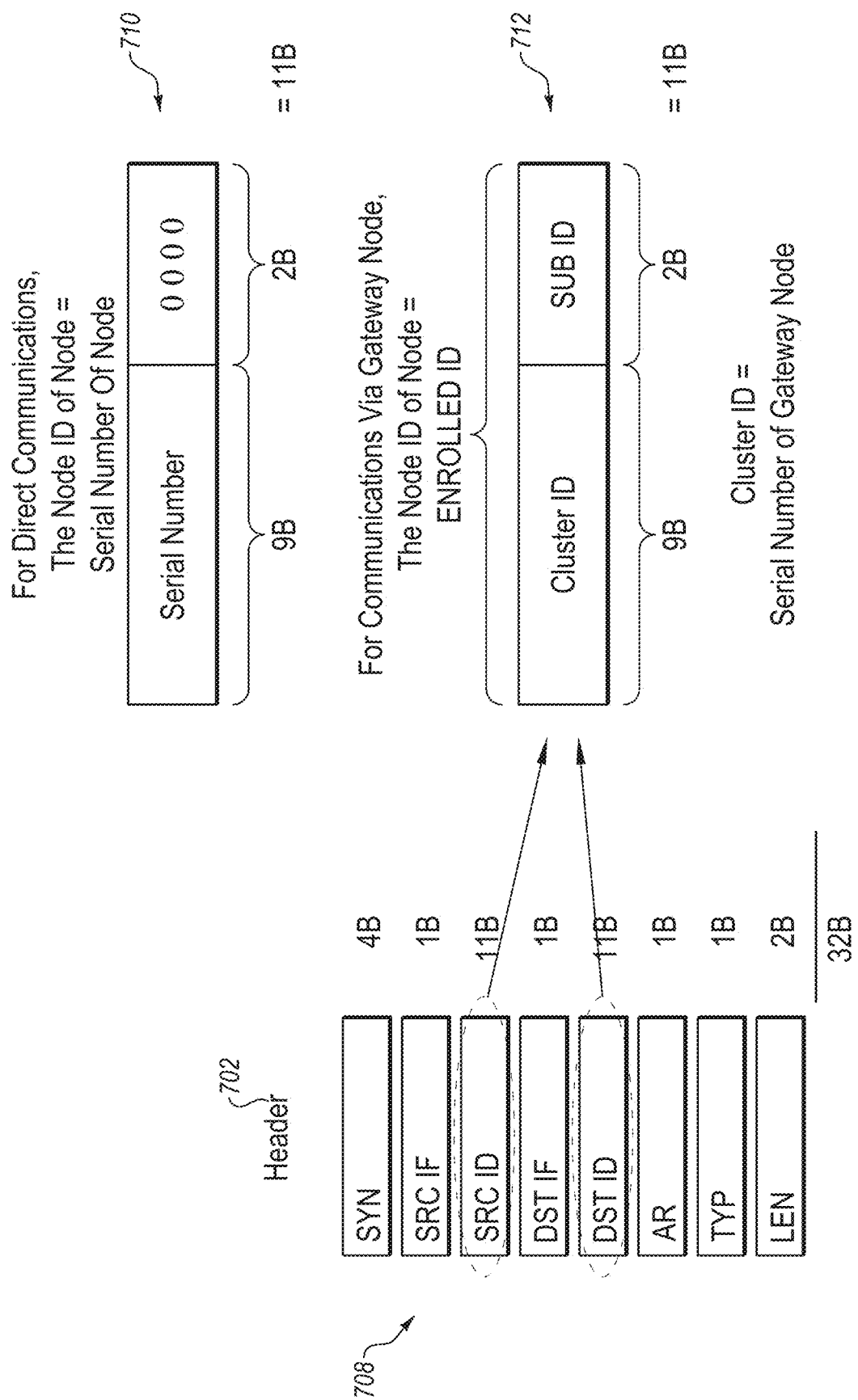
FIG. 7C is a diagram depicting header having the header fields of FIG. 7B, together with information associated with the source ID and the destination ID, according to one or more examples.

FIG. 7C is a diagram depicting header 702 having the header fields 708 of FIG. 7B, together with information associated with the source ID and the destination ID, according to one or more examples. In one or more examples at an indication 710, for direct communications, a node ID of an end node may include a serial number (e.g., 9 bytes) of the end node and a value (e.g., 2 bytes) of "0000" appended to the serial number. In one or more examples at an indication 712, for communications via a gateway node, a node is assigned with an enrolled ID upon enrollment to the gateway node. The enrolled ID includes a cluster ID (e.g., 9 bytes) and a sub ID (e.g., 2 bytes) appended to the cluster ID. A cluster which is identified by the cluster ID is a group of nodes that includes the gateway node and one or more end nodes connected to and/or enrolled with the gateway node. In one or more examples, the cluster ID is the serial number of the gateway node, and the sub ID is a selected value (e.g., "0002") unique to each node enrolled to the gateway node. The serial number for an end node or a gateway node is a unique number assigned by a manufacturer of the node.

FIG. 7D is a diagram depicting fields 720 of a record of an open session (e.g., a buffered structure), according to one or more examples. The fields 720 of the message structure of FIG. 7D include a session ID, which is the destination ID, a session status (STATUS), an interface (IFACE), which is the destination interface, a channel (CHANNEL) (socket, or other), a key agreement (ECDH PRIVATE) (ephemeral private key), a nonce sent (MY NONCE), a nonce received (HIS NONCE), a destination device public key (HIS PUBLIC), a key agreement (HIS EPHEMERAL) (ephemeral public key), a premaster key (PREMASTER), an incremental HMAC for transmissions (HMAC TX), and an incremental HMAC for reception. In one or more examples, fields 720 may include the byte lengths indicated in FIG. 7D. In one or more examples, none of the information is the responsibility of the user (application) but rather is automatically managed and allocated by the connectivity framework. The user may need to be aware that, given 2 k bytes of memory, a maximum of N communication sessions may be opened at the same time. For example, if 2 k bytes are available, then 2*N sessions are available; if 334 bytes are freed, then more sessions may be made available.

Figure 7E:
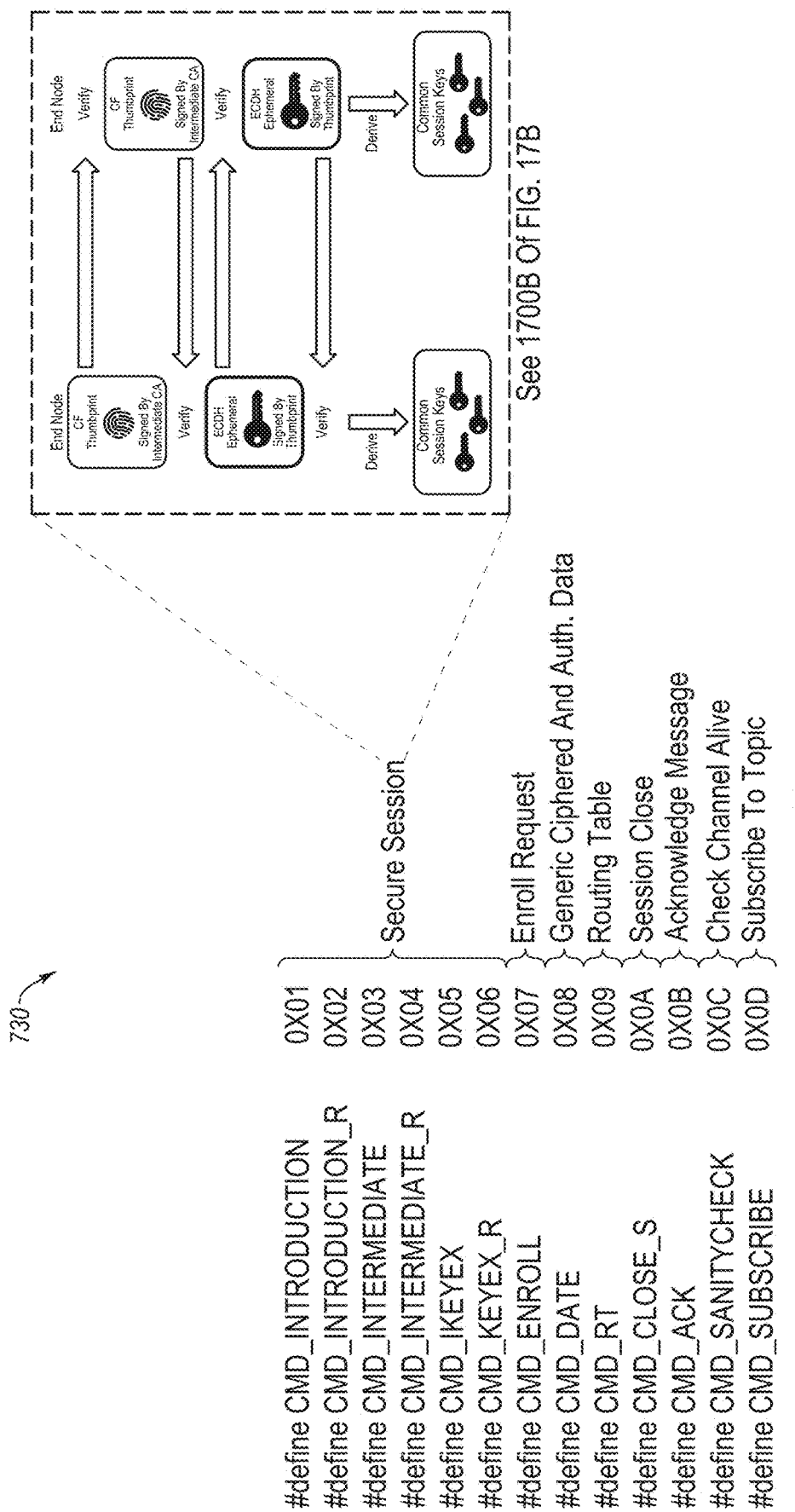
FIG. 7E is a diagram indicating message types or commands and example definitions thereof, according to one or more examples.

FIG. 7E is a diagram indicating message types 730 or commands and example definitions thereof, according to one or more examples. Message types 730 include types for establishing a secure communication session, which include an introduction type, an introduction response type, an intermediate type, an intermediate response type, a key exchange type, and a key exchange response type. Message types 730 also include an enroll request type, a generic ciphered and authentication data type, a routing table type, a session close type, an acknowledgement message type, a check channel alive type, and a subscribe to topic type.

Figure 8A:
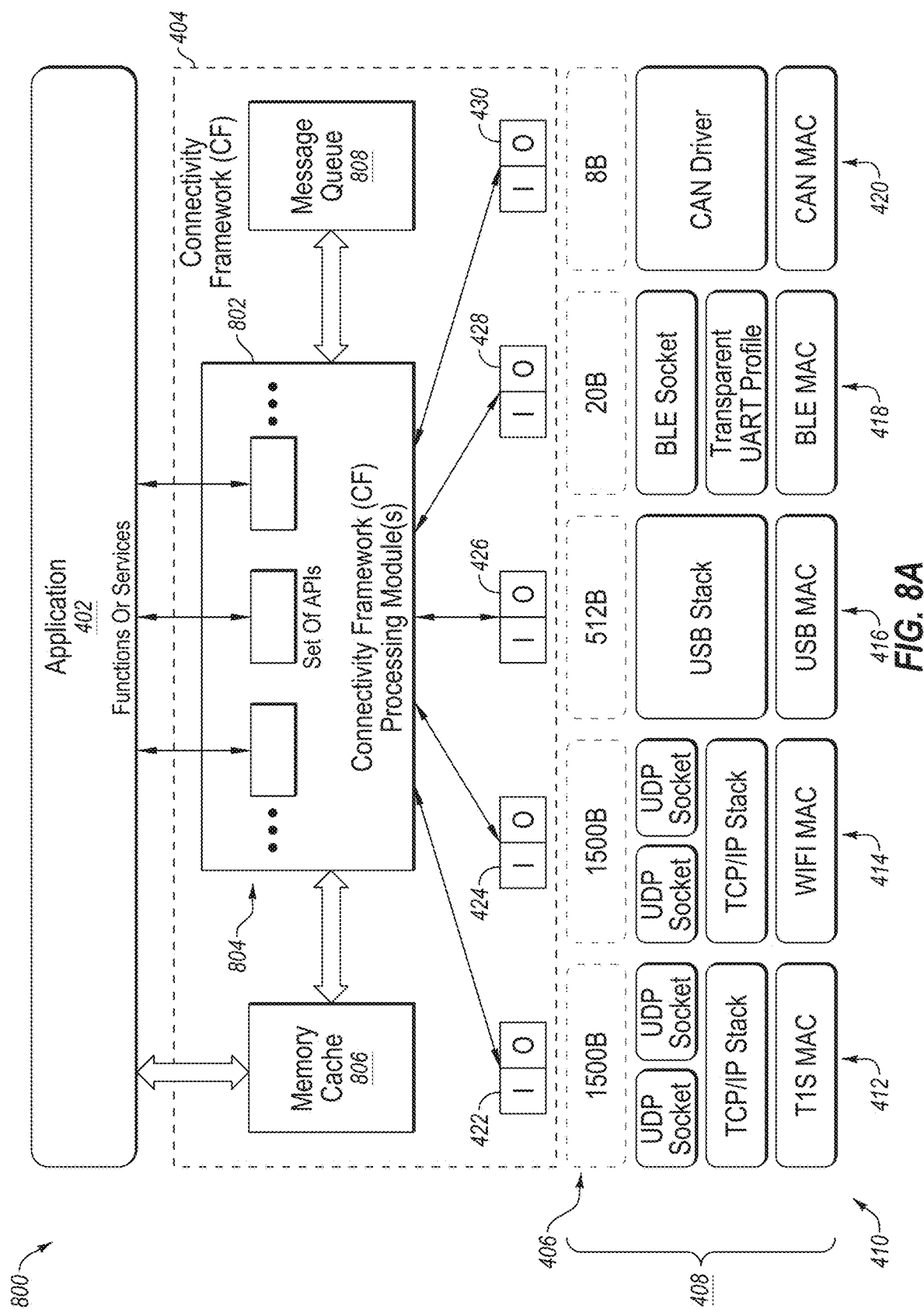
FIG. 8A is a block diagram depicting a connectivity framework system including a connectivity framework, according to one or more examples.

FIG. 8A is a block diagram depicting a connectivity framework system 800 including connectivity framework 404, according to one or more examples. In FIG. 8A, connectivity framework 404 of connectivity framework system 800 is shown to include a connectivity framework processing module 802. Connectivity framework processing module 802 may include processor-executable instructions (e.g., including an application layer protocol stack) adapted such that, when executed by one or more processors of a computing device, cause the one or more processors to perform various operations described herein. Although depicted as a single module in FIG. 8A, connectivity framework processing module 802 may include multiple processing modules according to one or more examples. In FIG. 8A, respective ones of I/O buffers 406 of respective ones of multiple peripheral communication devices 410 are shown separately as an input buffer (indicated as "I") and an output buffer (indicated as "O"). Note that, in FIG. 8A and subsequent figures, multiple peripheral communication devices 410 of the computing device are shown without their respective physical layers to simply the illustrations.

In one or more examples, connectivity framework processing module 802 operates to provide a set of functions or services to application 402. The set of functions are associated with a set of APIs 804 exposed to application 402 that invokes function calls to the functions. Function calls to respective functions may be received and processed by connectivity framework processing module 802. In one or more examples, the set of functions include one or more functions to communicate messages/data (including communication-related functions) and/or one or more functions to open or close secure communication sessions (including secure session-related functions). In one or more examples, the set of functions include at least some of the functions described later in relation to FIGS. 9, 10, 11A, 11B, 12, and 13.

In one or more examples, connectivity framework processing module 802 and application 402 each may interface with a memory cache 806 for transferring data and/or messages to each other. In addition, connectivity framework processing module 802 may interface with a message queue 808 for (temporarily) storing messages to be communicated to and from the computing device via multiple peripheral communication devices 410.

In one or more examples, connectivity framework processing module 802 may perform operations for communicating respective ones of messages via respective ones of multiple peripheral communication devices 410 according to a predetermined messaging protocol. In one or more examples, the predetermined messaging protocol may be a unified messaging protocol that is common to multiple peripheral communication devices 410. In one or more examples, connectivity framework processing module 802 may perform operations using message queue 808 as a common message queue for (temporarily) storing the respective ones of messages communicated to and from the computing device via the respective ones of the multiple peripheral communication devices.

Figure 8B:
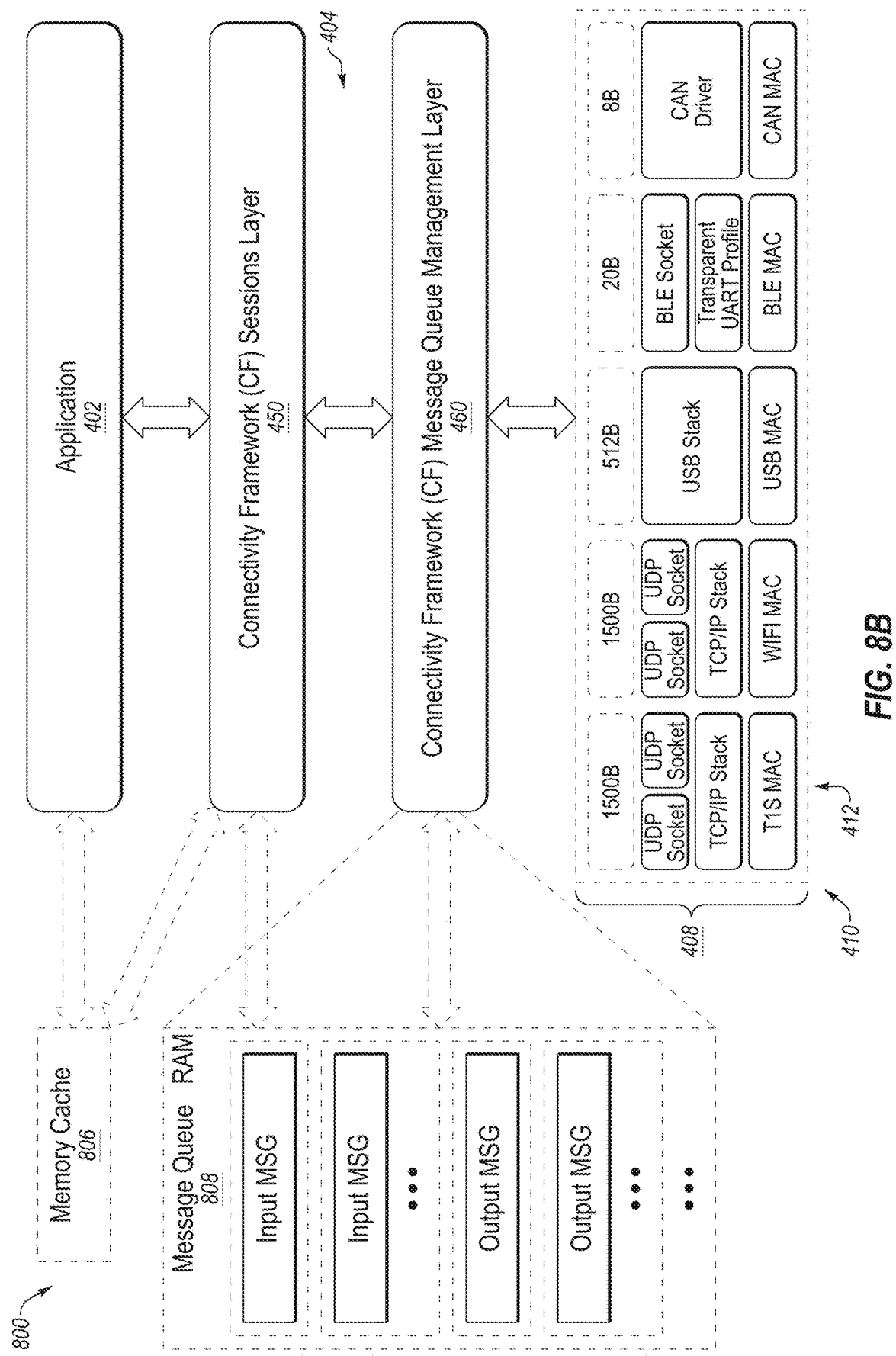
FIGS. 8B, 8C, and 8D are block diagrams depicting the connectivity framework of connectivity framework system of FIG. 8A with the sessions layer and message queue management layer, for illustrating example processing associated with the sending and receiving of messages, according to one or more examples.
Figure 8C:
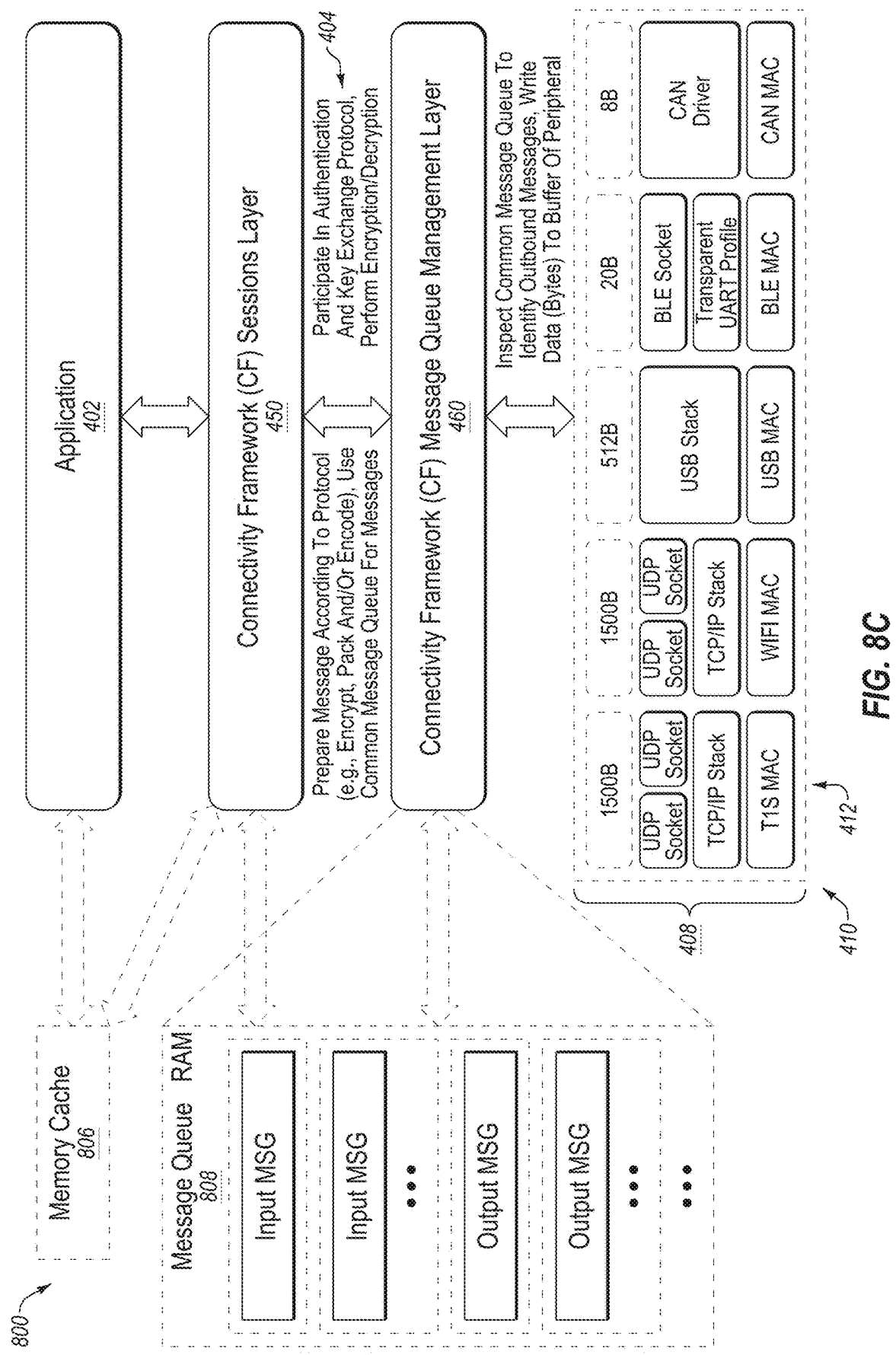
Figure 8D:
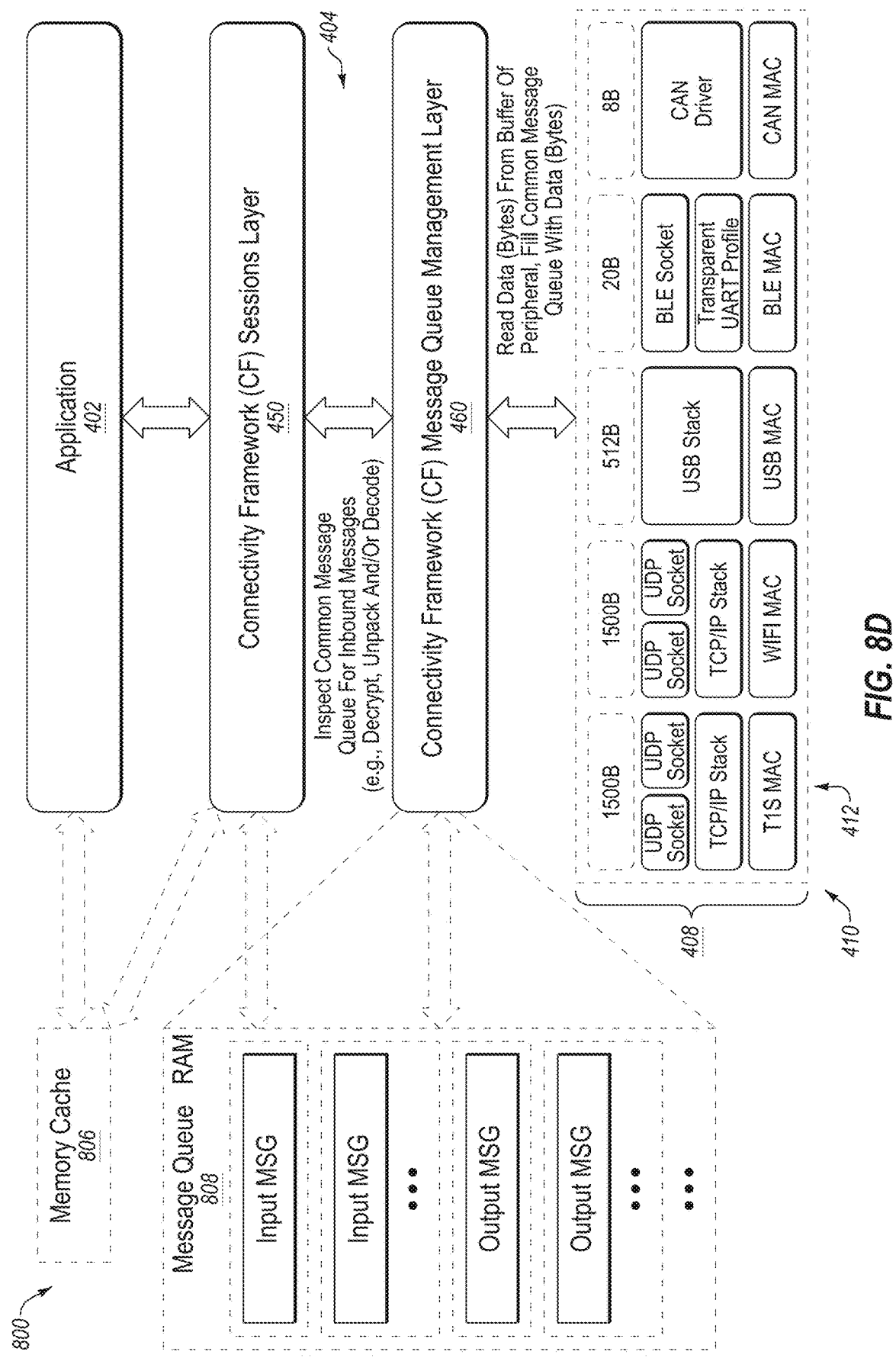

FIGS. 8B, 8C, and 8D are block diagrams depicting connectivity framework 404 of connectivity framework system 800 of FIG. 8A with sessions layer 450 and message queue management layer 460 (e.g., FIG. 4B) for illustrating example processing associated with the sending and receiving of messages, according to one or more examples.

In one or more examples, sessions layer 450 is to process inbound messages and create outbound messages. Each message belongs to a session; a session is identified by the destination ID. If a message that is marked inbound does not belong to any of the existing sessions, it is assumed to be a session initiator message; otherwise, the message may be discarded. Sessions layer 450 maintains a record for each open session (e.g., a buffered structure allocated in RAM). In one or more examples, message queue management layer 460 is to inspect message queue 808, looking for outbound messages. For example, when an interface middleware task "fires," message queue management layer 460 may check if an outbound message is available and, if so, it sends it out (e.g., based on a header-destination interface). Message queue management layer 460 is to fill message queue 808 with data (bytes) received on a given peripheral interface. For example, when a receiving interrupt or polling task for a peripheral interface "fires," it collects the data (bytes) to fill message queue 808 with the data.

Accordingly, for sending messages, connectivity framework processing module 802 may perform operations for respective ones of messages to send from the computing device via the multiple peripheral communication devices 410. With respect to FIG. 8C, the operations of sessions layer 450 may include preparing a message based on data from application 402 (e.g., stored in memory cache 806) and storing the message in message queue 808 (OUTPUT MSG), where the message is prepared with a message format according to the unified messaging protocol. In one or more examples, the operations may include encrypting data and/or encoding the message according to the unified messaging protocol. The operations of message queue management layer 460 may include writing one or more data portions of the message from message queue 808 to an input buffer of an indicated one of multiple peripheral communication devices 410 (e.g., peripheral communication device 412), until the message is transmitted via the indicated peripheral communication device. The same or similar operations may be performed for sending messages regardless of which one of the multiple peripheral communication devices 410 are used.

For receiving messages, connectivity framework processing module 802 may perform operations for respective ones of messages to receive at the computing device via the multiple peripheral communication devices 410. With respect to FIG. 8D, the operations of message queue management layer 460 may include reading one or more data portions of a message from an output buffer of an indicated one of multiple peripheral communication devices 410 (e.g., peripheral communication device 412) and storing the one or more data portions of the message in message queue 808, until the entire message (INPUT MSG) is received via the indicated peripheral communication device. In one or more examples, the message has the message format according to the unified messaging protocol. In one or more examples, the operations may include decrypting data, unpacking the message, and/or decoding the message according to the unified messaging protocol. In one or more examples, the message includes a header and a payload including data, where sessions layer 450 reads the message from the message queue 808 and processes the message according to a type indicated in the header (e.g., for further processing by sessions layer 450 or application 402). The same or similar operations may be performed for receiving messages regardless of which one of the multiple peripheral communication devices 410 are used.

Thus, in one or more examples, a user only has to learn a single simple protocol in designing application 402, abstracting all complexity linked to the hardware.

Figure 9:
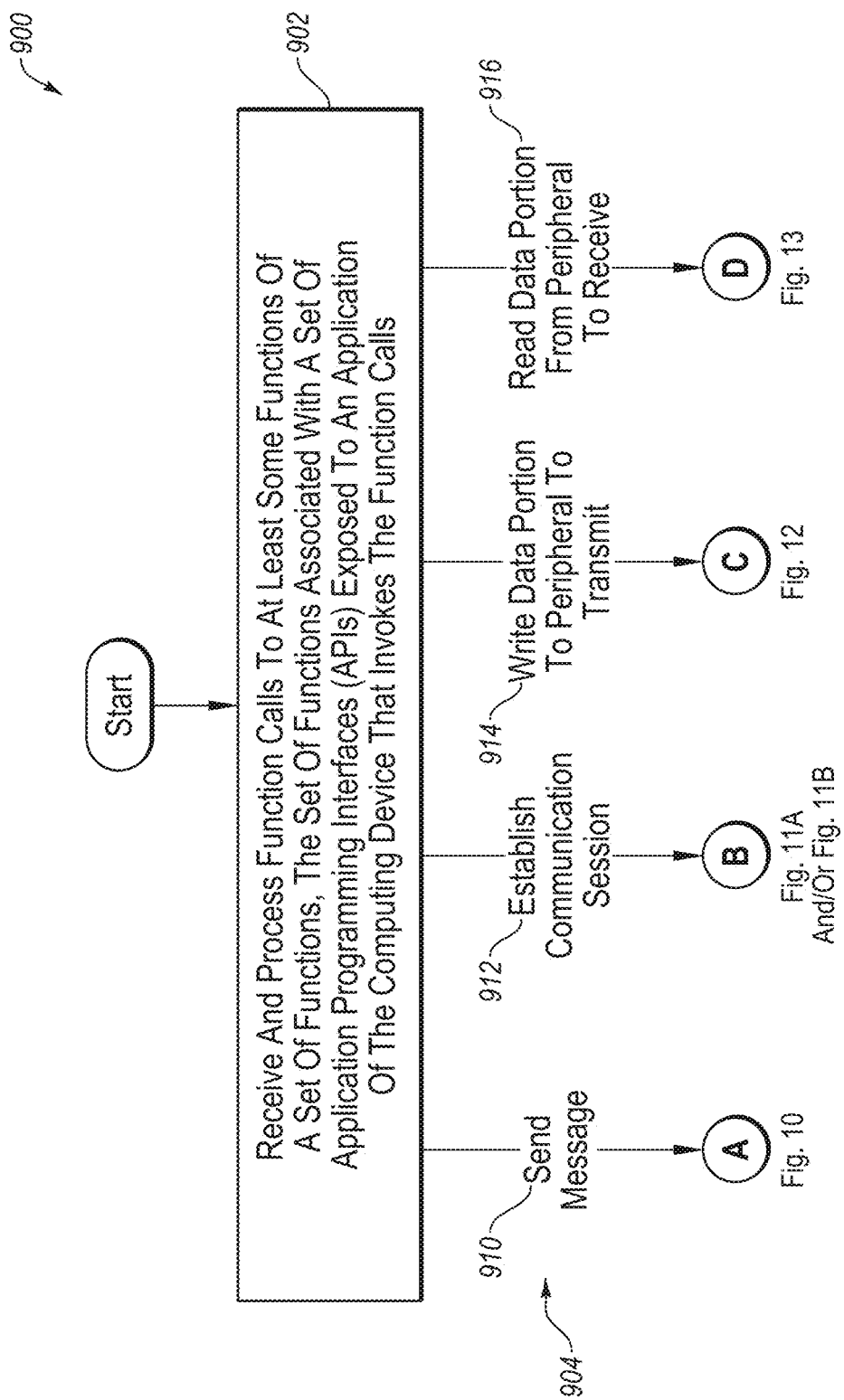
FIG. 9 is a method of operation of a connectivity framework processing module, according to one or more examples.

FIG. 9 is a method 900 of operation of a connectivity framework processing module, according to one or more examples. At an act 902, function calls to at least some functions of a set of functions of the connectivity framework processing module are received and processed. The set of functions are associated with a set of APIs exposed to an application that invokes the function calls. In one or more examples, the set of functions comprise functions 904 which include a function 910 to send a message, a function 912 to establish a communication session (e.g., a secure communication session), a function 914 to write a data portion to a peripheral device (for data transmission), and a function 916 to receive a data portion from a peripheral device (for data reception).

Figure 10:
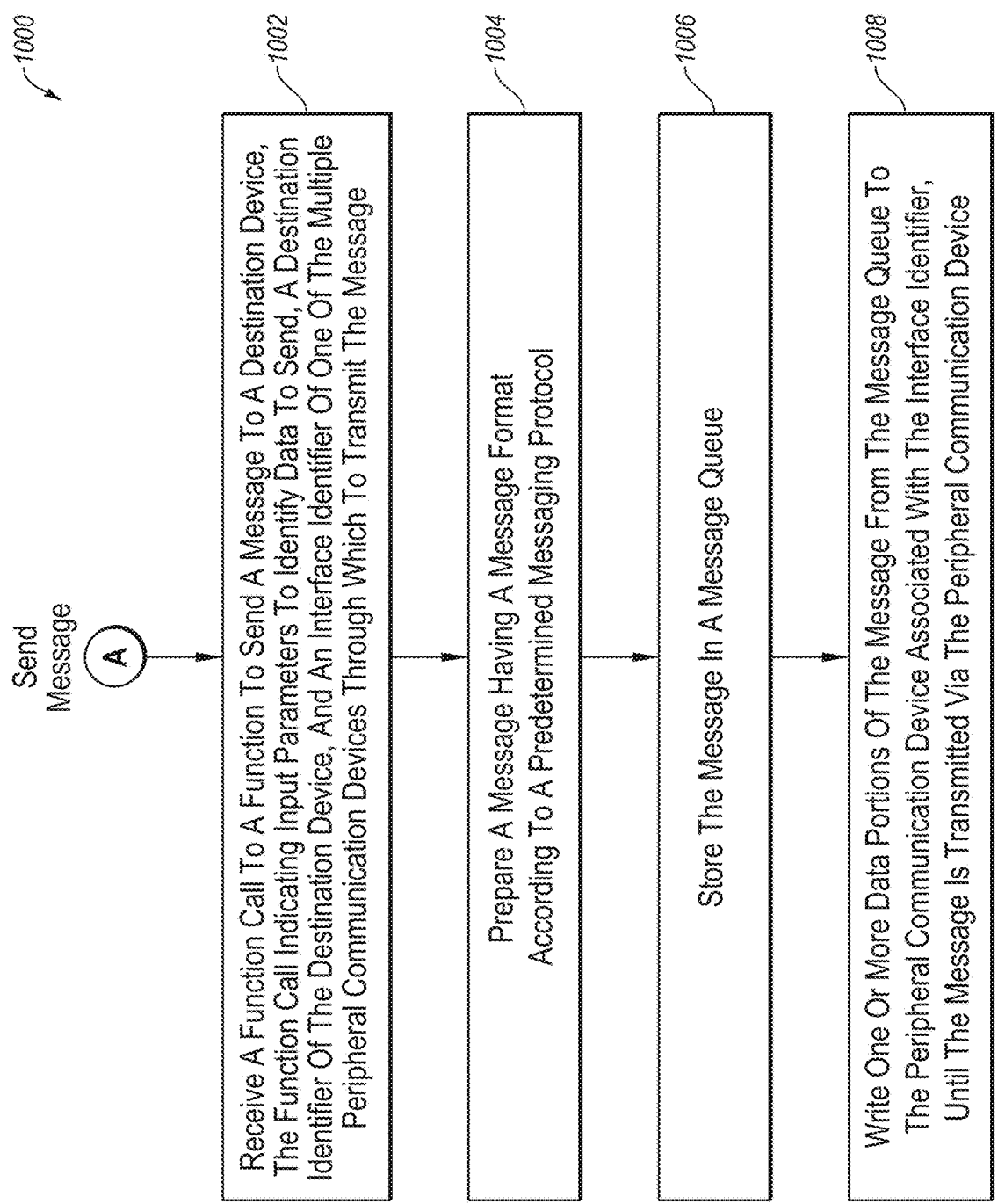
FIG. 10 is a method of processing a function to send a message in a connectivity framework processing module, according to one or more examples.

Processing associated with the function call to function 910 to send a message may be performed via a connector A to FIG. 10, according to one or more examples. Processing associated with the function call to function 912 to establish a communication session (e.g., a secure communication session) may be performed via a connector B to FIG. 11A and/or FIG. 11B, according to one or more examples. Processing associated with the function call to function 914 to write a data portion to a peripheral device (for data transmission) may be performed via a connector C to FIG. 12, according to one or more examples. Processing associated with the function call to function 916 to read a data portion from a peripheral device (for data reception) may be performed via a connector D to FIG. 13, according to one or more examples.

FIG. 10 is a method 1000 of processing a function to send a message in a connectivity framework processing module, according to one or more examples. In one or more examples, a function call to the function may originate from FIG. 9 (e.g., as function 910 to send a message) via the connector A. At an act 1002, a function call to the function to send a message to a destination device is received. The function call indicates input parameters to identify one or more data items. In one or more examples, the function call indicates input parameters to identify data to send, a destination identifier of the destination device, and an interface identifier of one of the multiple peripheral communication devices through which to transmit the message. In one or more examples, additional and/or alternative input parameters may be utilized as described elsewhere herein.

At least partially responsive to receiving the function call to the function, at an act 1004, a message having a message format according to a predetermined messaging protocol is prepared. The message may include the data. In one or more examples, the message may include a header and a payload including the data, according to the message formatting of FIGS. 7A, 7B, 7C, 7D, and/or 7E. In one or more examples, prior to sending the message, the data of the message may be encrypted based on one or more session keys. At an act 1006, the message is stored in a message queue.

At an act 1008 (e.g., which may be one or more actions), one or more data portions of the message from the message queue are written to the peripheral communication device associated with the interface identifier, until the message is transmitted via the peripheral communication device. In one or more examples, the act 1008 to write the one or more data portions of the message to the peripheral communication device may be performed using the function call to function 914 of FIG. 9 to write a data portion to a peripheral device (for data transmission) via the connector C to FIG. 12, as described later below.

In one or more examples, the preparing (in act 1004), the storing (in act 1006), and the writing (in act 1008) are repeated for respective ones of one or more additional function calls to send messages (e.g., the function 910 to send a message in FIG. 9) through respective other ones of the multiple peripheral communication devices, until the (entire) message is transmitted via the peripheral communication device.

In one or more examples, the predetermined messaging protocol for sending the messages comprises a unified messaging protocol. The unified messaging protocol is common to messages sent via the multiple peripheral communication devices. In one or more examples, the message queue comprises a common message queue to (temporarily) store the messages sent via the multiple peripheral communication devices.

Figure 11A:
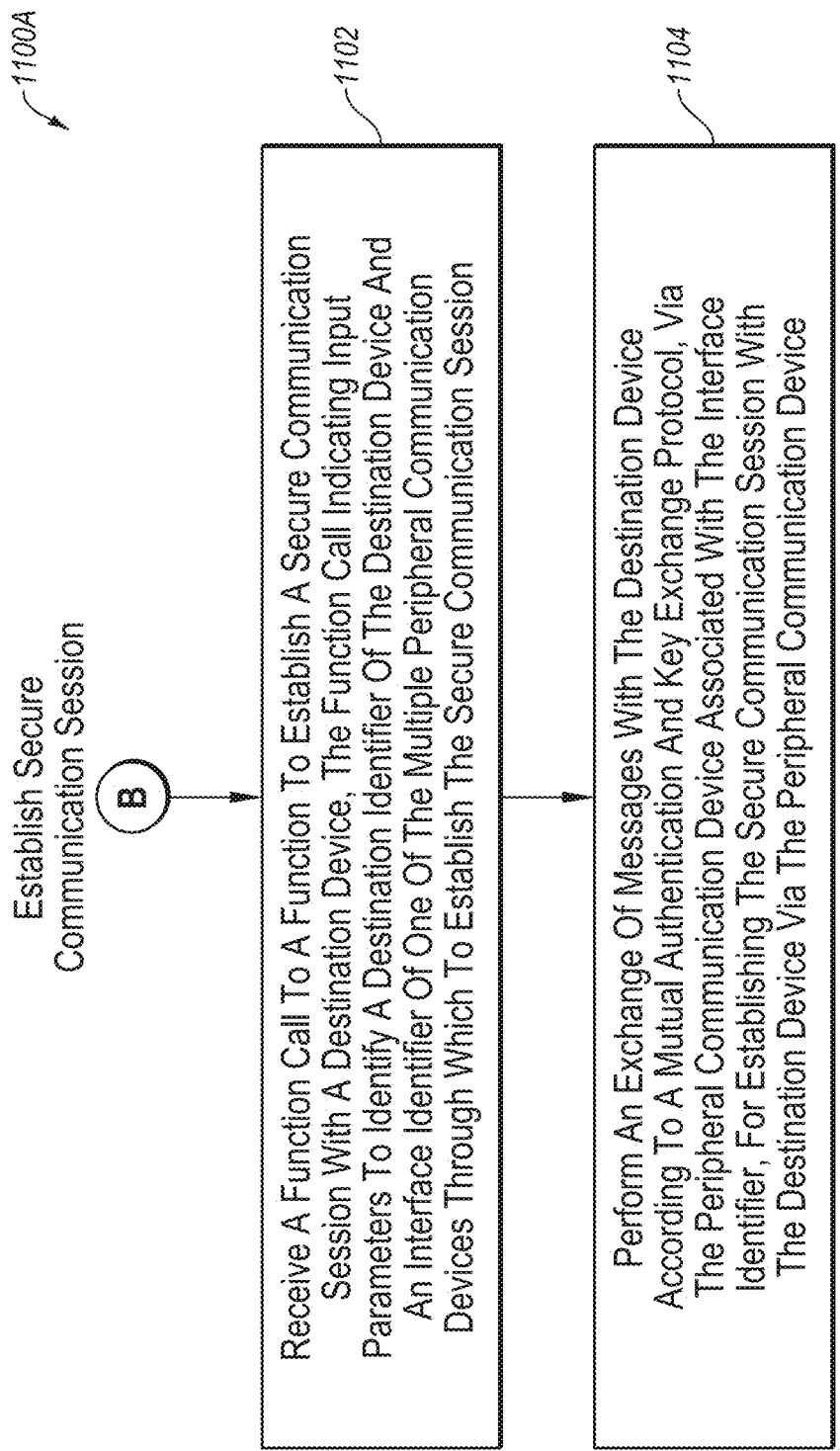
FIG. 11A is a method of processing a function to establish a communication session in a connectivity framework processing module, according to one or more examples.

FIG. 11A is a method 1100A of processing a function to establish a communication session in a connectivity framework processing module, according to one or more examples. In one or more examples, a function call to the function may originate from FIG. 9 (e.g., as function 912 to establish a communication session) via the connector A. At an act 1102, a function call to a function to establish a communication session with a destination device is received. The function call indicates input parameters to identify one or more data items. In one or more examples, the function call indicates input parameters to identify a destination identifier of the destination device and an interface identifier of one of the multiple peripheral communication devices through which to establish the communication session. In one or more examples, additional and/or alternative input parameters may be utilized as described elsewhere herein.

At least partially responsive to receiving the function call to the function, at an act 1104, an exchange of messages with the destination device according to a mutual authentication and key exchange protocol is performed via the peripheral communication device associated with the interface identifier. The exchange of messages is for establishing the communication session with the destination device via the peripheral communication device. The communication session may be a secure communication session. In one or more examples, the act 1104 may be performed according to a method 1100B of FIG. 11B.

In one or more examples, one or more additional function calls to establish other communication sessions (e.g., the function 912 to establish a communication session in FIG. 9) with other destination devices through other ones of the multiple peripheral communication devices are received. In one or more examples, for respective ones of the one or more additional function calls, the performing of the exchange of messages (in the act 1104) with the other destination device according to the mutual authentication and key exchange protocol is repeated. That is, the performing of the exchange of messages is repeated via the other peripheral communication device for establishing the other communication session with the other destination device via the other peripheral communication device. In one or more examples, the mutual authentication and key exchange protocol used is the same irrespective of which one of the multiple peripheral communication devices the messages is exchanged through.

Figure 11B:
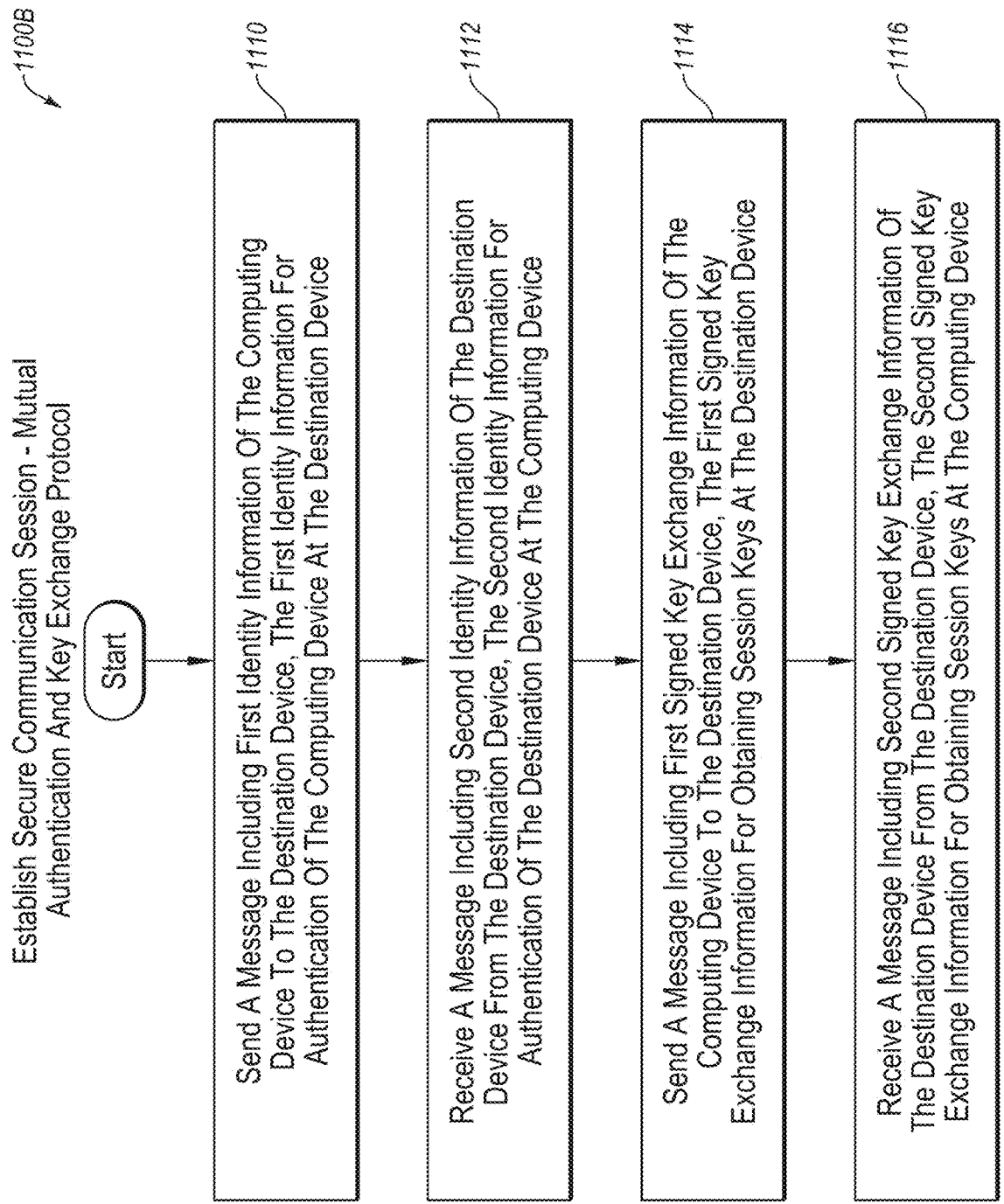
FIG. 11B is a method of performing an exchange of messages according to a mutual authentication and key exchange protocol in a connectivity framework processing module, according to one or more examples.

FIG. 11B is a method 1100B of performing an exchange of messages according to a mutual authentication and key exchange protocol in a connectivity framework processing module, according to one or more examples. In one or more examples, the method 1100B may be performed as the act 1104 in the method 1100A of FIG. 11A. At an act 1110, a message including first identity information of the computing device is sent to the destination device. The first identity information is for authentication of the computing device at the destination device. At an act 1112, a message including second identity information of the destination device is received from the destination device. The second identity information is for authentication of the destination device at the computing device. At an act 1114, a message including first signed key exchange information of the computing device is sent to the destination device. The first signed key exchange information is for obtaining or deriving session keys at the destination device. At an act 1116, a message including second signed key exchange information of the destination device is received from the destination device. The second signed key exchange information is for obtaining or deriving session keys at the computing device.

In one or more examples, for respective ones of the messages sent according to the mutual authentication and key exchange protocol (e.g., in the act 1110 and the act 1114), the method may further include preparing the message of the mutual authentication and key exchange protocol with a message format according to a predetermined messaging protocol; storing the message in a message queue; and writing one or more data portions of the message from the message queue to the peripheral communication device associated with the interface identifier, until the message is transmitted via the peripheral communication device.

In one or more examples, for respective ones of the messages received according to the mutual authentication and key exchange protocol (e.g., in the act 1112 and the act 1116), the method further includes reading one or more data portions from the peripheral communication device and storing the one or more data portions in the message queue, until the message comprising the one or more data portions is received via the peripheral communication device and stored in the message queue; storing the message in a memory cache of the computing device, the message having the message format according to the predetermined messaging protocol; and processing the message according to the mutual authentication and key exchange protocol.

In one or more examples, one or more additional function calls to establish other communication sessions with other destination devices through other ones of the multiple peripheral communication devices are received and processed. In one or more examples, for respective ones of the one or more additional function calls, the preparing, the storing, and the writing for respective ones of the messages sent according to the mutual authentication and key exchange protocol are repeated. In addition, in one or more examples, for respective ones of the one or more additional function calls, the reading, the storing, and the processing for respective ones of the messages received according to the mutual authentication and key exchange protocol are repeated. In one or more examples, the predetermined messaging protocol comprises a unified messaging protocol which is common to messages sent and received through the multiple peripheral communication devices. In one or more examples, the message queue comprises a common message queue to store the messages sent and received through the multiple peripheral communication devices.

Figure 12:
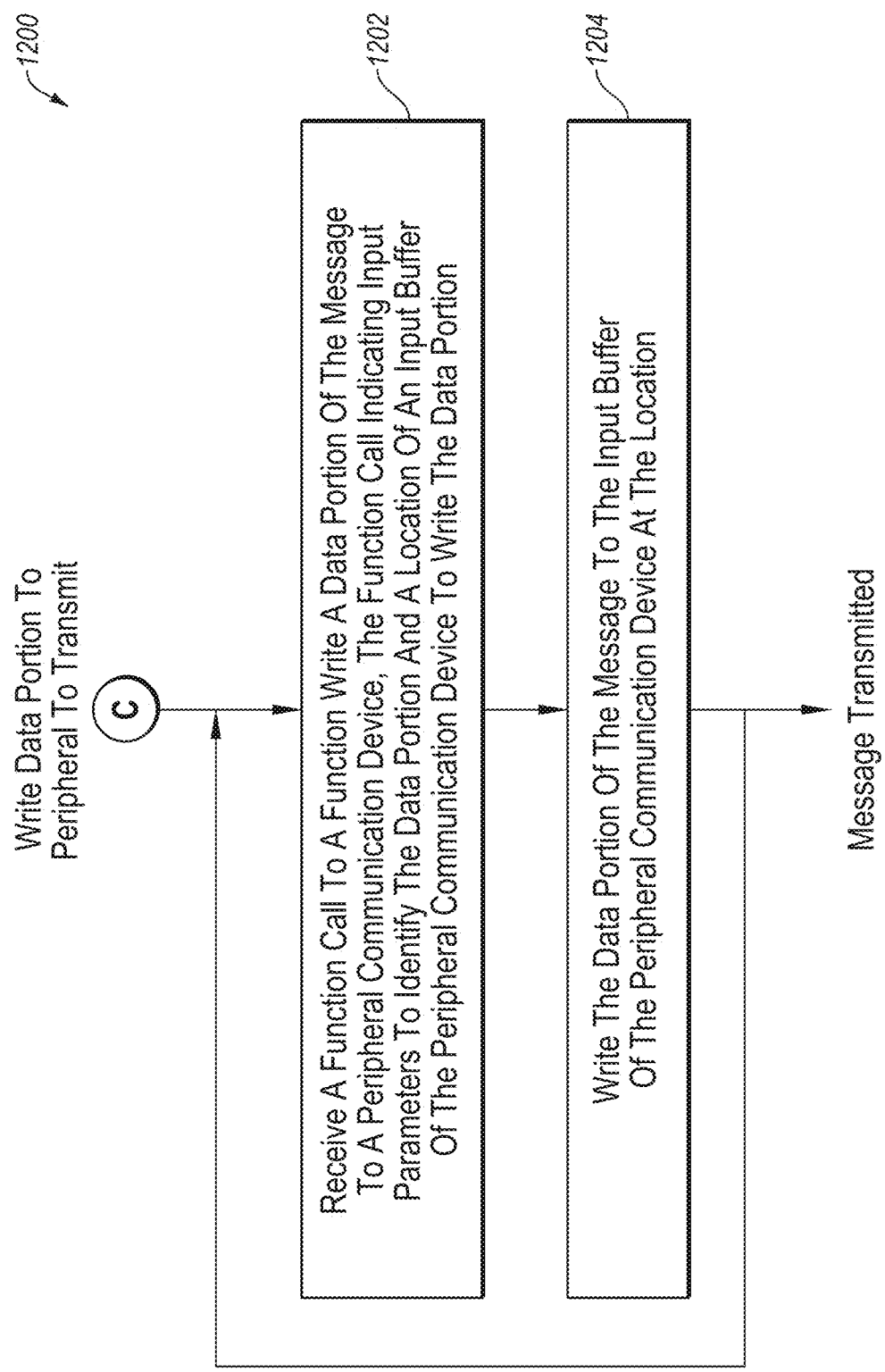
FIG. 12 is a method of processing a function to write a data portion to a peripheral device (for data transmission) in a connectivity framework processing module, according to one or more examples.

FIG. 12 is a method 1200 of processing a function to write a data portion to a peripheral device (for data transmission) in a connectivity framework processing module, according to one or more examples. In one or more examples, a function call to the function may originate from FIG. 9 (e.g., as function 914 to write a data portion to a peripheral device) via the connector C. At an act 1202, a function call to a function to write a data portion of the message to a peripheral communication device is received. The function call indicates input parameters to identify one or more data items. In one or more examples, the function call indicates input parameters to identify the data portion and a location of an input buffer of the peripheral communication device to write the data portion. In one or more examples, additional and/or alternative input parameters may be utilized as described elsewhere herein. At least partially responsive to receiving the function call to the function, at an act 1204, the data portion of the message from the message queue is written to the location of the input buffer of the peripheral communication device.

In one or more examples, one or more additional function calls to write a (next) data portion of the message (e.g., the function 914 to write the data portion in FIG. 9) to the peripheral communication device are received. At least partially responsive to respective ones of the one or more additional function calls, the writing (in the act 1204) is repeated for respective ones of next data portions of the message from the message queue to the input buffer of the peripheral communication device at the location.

Figure 13:
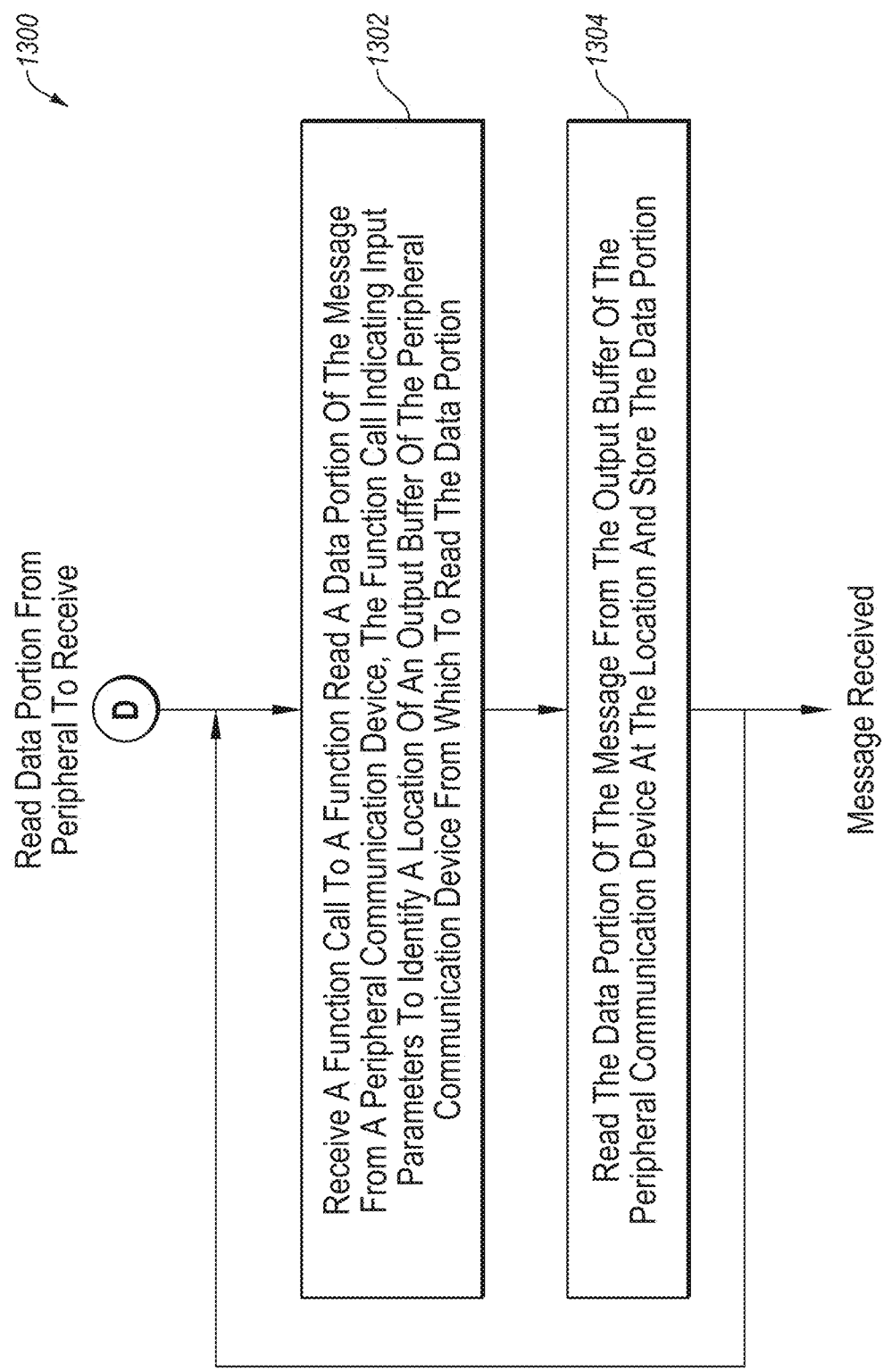
FIG. 13 is a method of processing a function to read a data portion from a peripheral device (for data reception) in a connectivity framework processing module, according to one or more examples.

FIG. 13 is a method 1300 of processing a function to read a data portion from a peripheral device (for data reception) in a connectivity framework processing module, according to one or more examples. In one or more examples, a function call to the function may originate from FIG. 9 (e.g., as function 916 to read a data portion from a peripheral device) via the connector D. At an act 1302, a function call to a function to read a data portion from a peripheral communication device is received. The function call indicates input parameters to identify one or more data items. In one or more examples, the function call indicates input parameters to identify a location of an output buffer of the peripheral communication device from which to read the data portion. in one or more examples, additional and/or alternative input parameters may be utilized as described elsewhere herein. At least partially responsive to receiving the function call to the function, at an act 1304, the data portion from the output buffer of the peripheral communication device at the location is read and the data portion is stored in memory.

In one or more examples, the data portion comprises at least a header of a message having the message format according to the predetermined messaging protocol. In one or more examples, the entire message may include the header and a payload according to the message formatting of FIGS. 7A, 7B, 7C, 7D, and/or 7E. The payload may include data of the message. In one or more examples, in response to reading the (initial) data portion of the message, a portion of a message queue is allocated or reserved according to a payload length of the payload as indicated in the header.

In or more examples, one or more additional function calls to read a (next) data portion from the peripheral communication device (e.g., the function 916 to read the data portion in FIG. 9) is received. At least partially responsive to respective ones of the additional function calls, the reading of respective ones of next data portions (in the act 1304) from the output buffer of the peripheral communication device, for storing in the message queue at the next consecutive location, is repeated. In one or more examples, the reading and storing are repeated until the (entire) message comprising the data portion and the next data portions are received in the message queue. In one or more examples, a signal or indication is provided responsive to the data portions filling in the message queue to the payload length, to indicate "message complete" or "message ready."

In one or more examples, the message is processed according to a type indicated in the header. For example, when the type indicates sessions layer processing, the message may be processed by the sessions layer of the connectivity framework processing module (e.g., for processing associated with establishment of a communication session). As another example, when the type does not indicate sessions layer processing, and/or indicates application layer processing, the message may be processed by the application. In one or more examples, the data of the message may be stored in a memory cache of the computing device, and a signal or indication of receipt of the data stored in the memory cache may be provided to the application.

Upon completion of message processing, allocated memory of the message queue is freed. If an error occurs (e.g., unexpected, unknown destination, timeout, out-of-sync, etc.), the element is deleted and the allocated memory is freed.

Figure 14A:
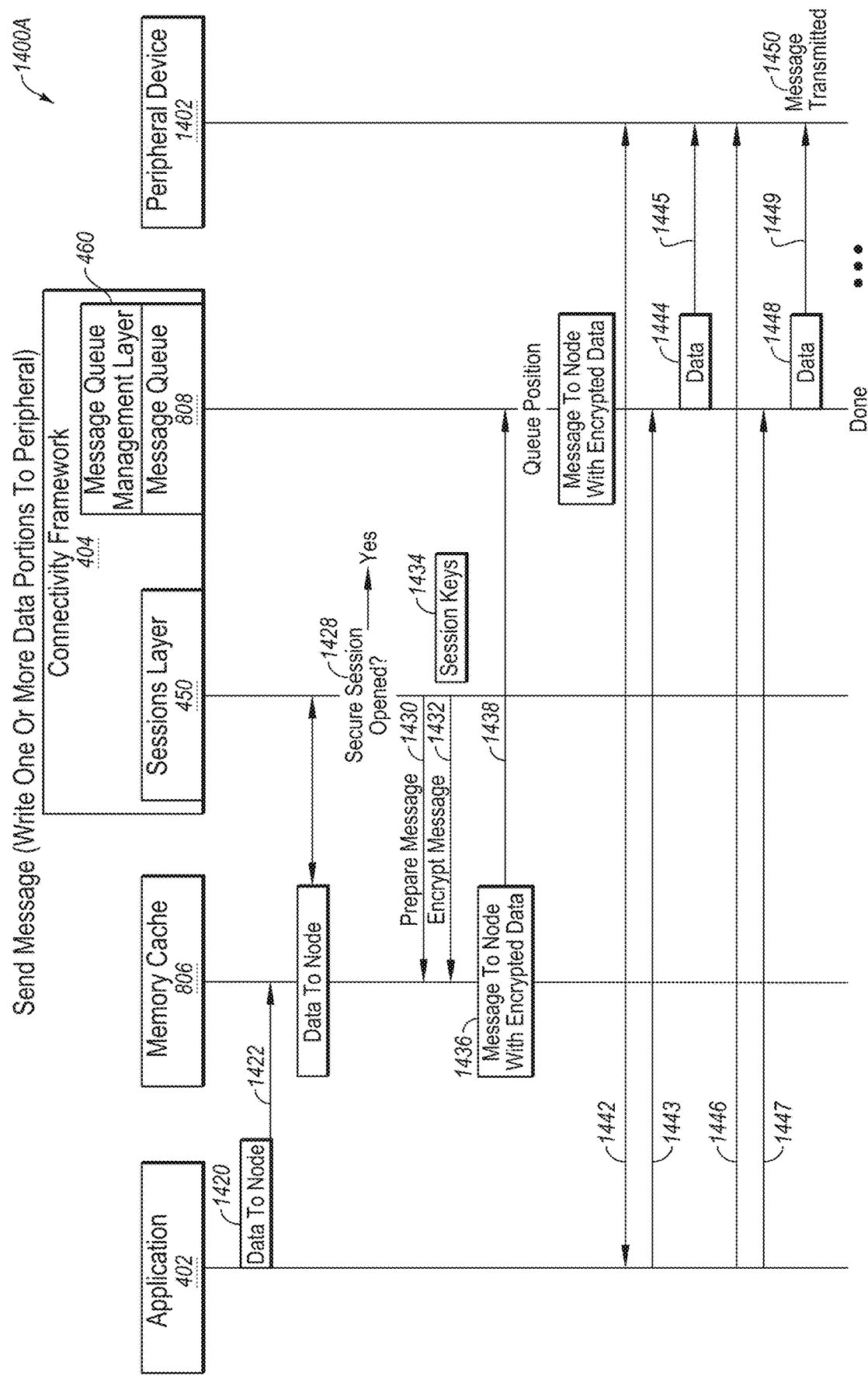
FIG. 14A is a flow diagram of a data/message flow for sending a message using a connectivity framework processing module of a computing device, according to one or more examples.

FIG. 14A is a flow diagram of method 1400A illustrating a data/message flow for sending a message using a connectivity framework processing module of a computing device, according to one or more examples. At an act 1420, application 402 obtains data to send to a node. At an act 1422, application 402 may insert or store in memory cache 806 the data to send. Here, in one or more examples, application 1420 invokes a function call to a function to send a message including the data to a destination device (e.g., function 910 to send a message in FIG. 9). In one or more examples, the function call indicates input parameters to identify the data to send, a destination identifier of the destination device, and an interface identifier of one of the multiple peripheral communication devices of the computing device (e.g., a peripheral communication device 1402) through which to transmit the message.

Connectivity framework 404 is to receive the function call to the function to send the message. At an act 1428, sessions layer 450 identifies whether a communication session with the destination device is open. In this case, a communication session between the computing device and the destination device is open. In response, at an act 1430, sessions layer 450 begins to perform processing to send a message. More particularly, sessions layer 450 prepares a message having a message format according to a predetermined messaging protocol. In one or more examples, the message may include a header and a payload including the data, prepared according to the message formatting of FIGS. 7A, 7B, 7C, 7D, and/or 7E. In one or more examples, at an act 1432, the data of the message may be encrypted based on one or more session keys 1434. At an act 1438, a message 1436 with encrypted data in memory cache 806 is inserted or stored in a queue position in message queue 808.

At acts 1442, 1443, 1444, 1445, 1446, 1447, 1448, and 1449, one or more data portions of the message from the message queue 808 are written to peripheral communication device 1402 associated with the interface identifier, until the message is transmitted via the peripheral communication device 1402 as indicated at a message transmitted indication 1450. In one or more examples, the above acts to write the one or more data portions of the message to the peripheral communication device may include use of the function call to function 914 of FIG. 9 to write a data portion to a peripheral device (for data transmission) via the connector C to FIG. 12.

In one or more examples, in an act 1442, an availability of peripheral communication device 1402 to transmit data may be detected by application 402 (e.g., through monitoring or interrupt). In response to availability, at an act 1443, application 402 may invoke a function call to a function to write a data portion to peripheral communication device 1402 (e.g., the function call to function 914 of FIG. 9). In response, message queue management layer 460 obtains a data portion 1444 from message queue 808 and writes data portion 1444 to the location of the input buffer of the peripheral communication device 1402 to transmit the data portion. The acts 1442, 1443, and 1445 may be repeated for one or more additional data portions of the message (e.g., a data portion 1448) in acts 1446, 1447, and 1449, respectively, until the entire message is transmitted, as indicated at a message transmitted indication 1450.

Figure 14B:
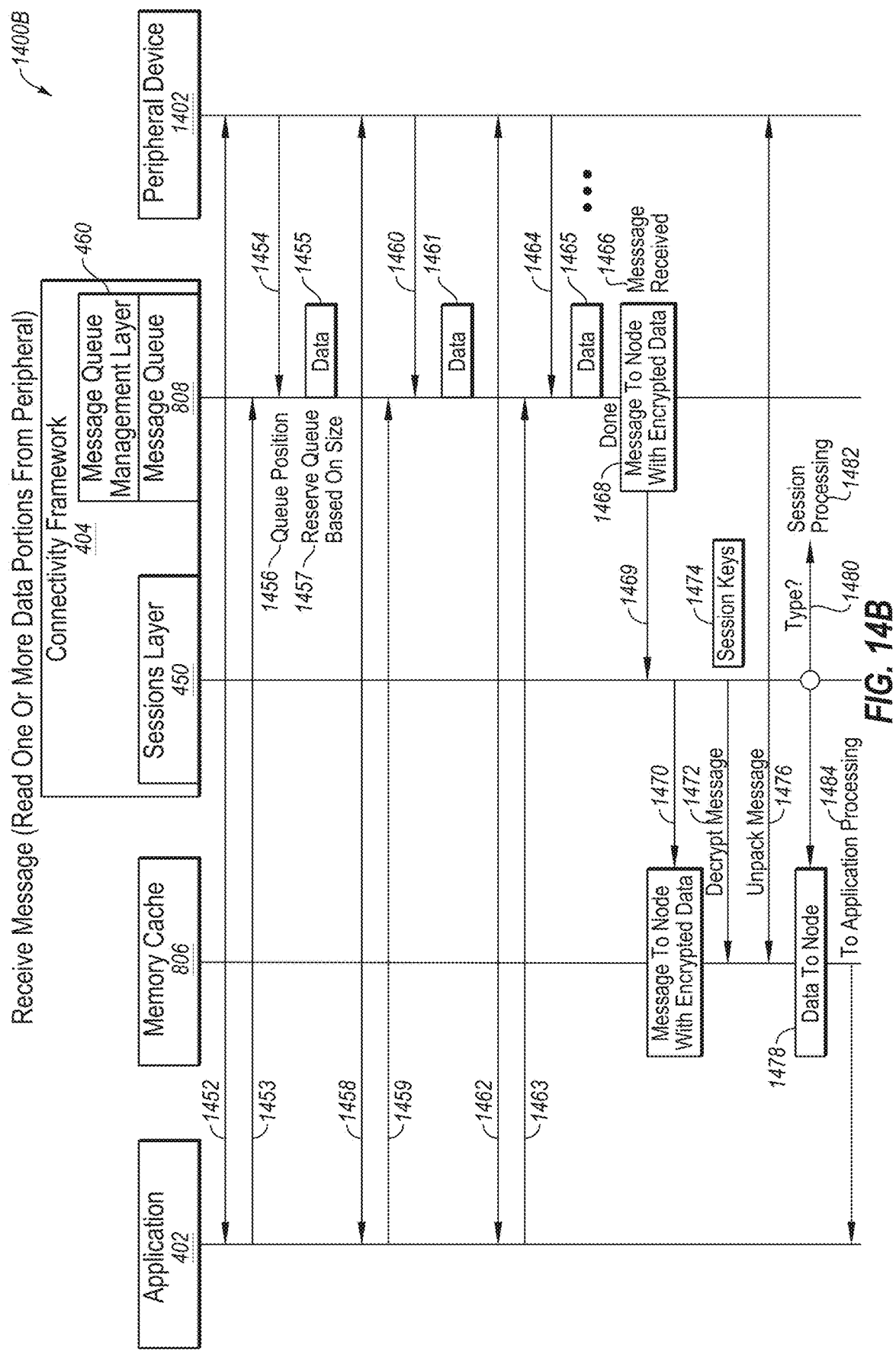
FIG. 14B is a flow diagram of a data/message flow for receiving a message using a connectivity framework processing module of a computing device, according to one or more examples.

FIG. 14B is a flow diagram of method 1400B illustrating a data/message flow for receiving a message using a connectivity framework processing module of a computing device, according to one or more examples. At an act 1452, an availability of data received at peripheral communication device 1402 may be detected by application 402 (e.g., through monitoring or interrupt). In response to data availability, at an act 1453, application 402 may invoke a function call to a function to read a data portion from peripheral communication device 1402 (e.g., the function call to function 916 of FIG. 9). In response, at an act 1454, message queue management layer 460 reads a data portion 1455 from the location of the output buffer of peripheral communication device 1402 and inserts data portion 1455 at a queue position 1456 in message queue 808.

In one or more examples, data portion 1455 is (only) the initial data portion of the message to be received. For example, the message to be received may be larger than the size of the output buffer of peripheral communication device 1402. In one or more examples, data portion 1455 comprises at least a header of the message having the message format according to the predetermined messaging protocol. In one or more examples, the entire message to be received may include the header and a payload according to the message formatting of FIGS. 7A, 7B, 7C, 7D, and/or 7E. In one or more examples, the header includes a payload length of the payload, and at an act 1457, message queue management layer 460 reserves or allocates a memory portion of message queue 808 equal or commensurate to the payload length as indicated in the header.

Subsequently, at an act 1458, an availability of additional data received at peripheral communication device 1402 may be detected by application 402 (e.g., through monitoring or interrupt). In response to additional data availability, at an act 1459, application 402 may invoke an additional function call to the function to read a data portion from peripheral communication device 1402 (e.g., the function call to function 916 of FIG. 9). In response, at an act 1460, message queue management layer 460 reads a data portion 1461 from the location of the output buffer of peripheral communication device 1402 and inserts data portion 1461 in the next position in message queue 808. The acts 1458, 1459, and 1460 may be repeated for one or more additional data portions of the message (e.g., a data portion 1465) in acts 1462, 1463, and 1464, respectively, until the entire message is received, as indicated at a message received indication 1466.

Accordingly, a message 1468 with encrypted data is stored in message queue 808. At an act 1469, message queue management layer 460 may provide a signal or indication to sessions layer 450 that a message has been received. At an act 1470, sessions layer 450 may transfer the message to memory cache 806 for processing. At an act 1472, sessions layer 450 may decrypt the data in the message based on one or more session keys 1474. At an act 1476, sessions layer 450 may unpack the message and/or process the message based on the message format according to the predetermined messaging protocol (e.g., based on header fields and type). Again, in one or more examples, the message may include the header and the payload according to the message formatting of FIGS. 7A, 7B, 7C, 7D, and/or 7E. At least data 1478 (decrypted) of the message will be stored in memory cache 806. At an act 1480, sessions layer 450 may determine the appropriate processing to perform on the message based on the type indicated in the header. At an act 1482, sessions layer 450 may perform sessions layer processing if the type indicated in the header is for sessions processing. On the other hand, at an act 1484, sessions layer 450 may provide a signal or indication to application 402 (e.g., "data/message received") if the type indicated is for application processing or not sessions processing.

FIGS. 15A, 15B, 15C, and 15D are message queue processing diagrams 1500A, 1500B, 1500C, and 1500D, respectively, depicting message queue processing of a received message in message queue 808 by a message queue management layer, according to one or more examples. In one or more examples, at least a portion of heap memory is used to construct a highly efficient message queue (or pool) that can ensure a smooth, reliable, and ordered processing of data. In one or more examples, the connectivity framework utilizes message queue 808, a mechanism to use memory on-demand to fill-in a queue which is common to all peripherals and technologies.

Figure 15A:
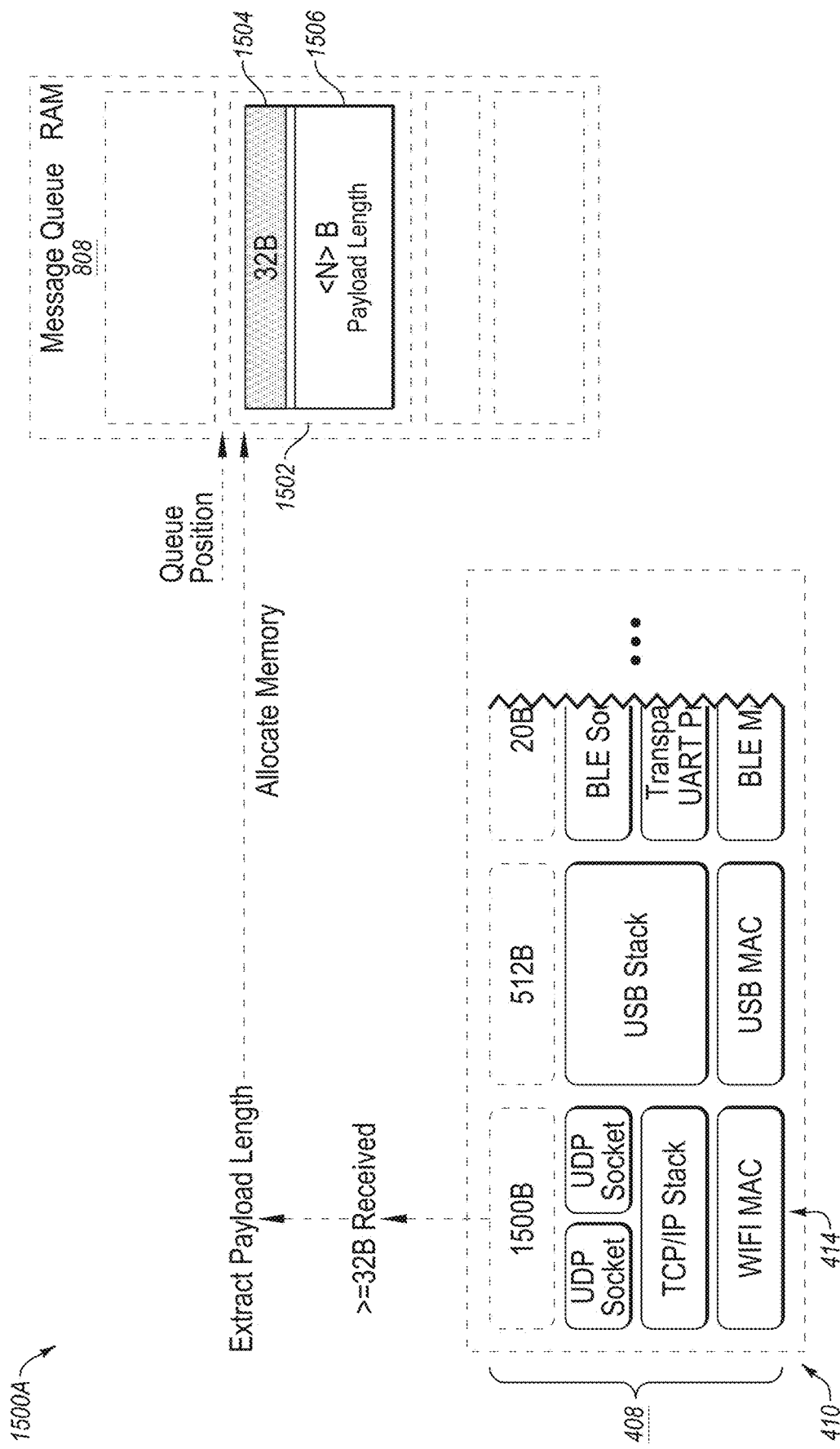
FIGS. 15A, 15B, 15C, and 15D are message queue processing diagrams depicting message queue processing of a received message in a message queue by a message queue management layer, according to one or more examples.

In FIG. 15A, a data portion is received and read from the output buffer of peripheral communication device 414. The data portion is stored in message queue 808 at a queue position as a data portion 1504. In this example, data portion 1504 is only an initial data portion of the message, as the message to be received is larger than the size of the output buffer of peripheral communication device 414. Data portion 1504 comprises at least a header of the message (e.g., 32 bytes), where the header includes a payload length of the payload. Based on the payload length indicated in the header, message queue management layer 460 allocates or reserves an allocated memory portion 1502 of message queue 808 equal or commensurate to the payload length. An available memory portion 1506 of allocated memory portion 1502 remains available to use for remaining data portions of the message to be received. As indicated in FIG. 15A, the payload length is N bytes.

Figure 15B:
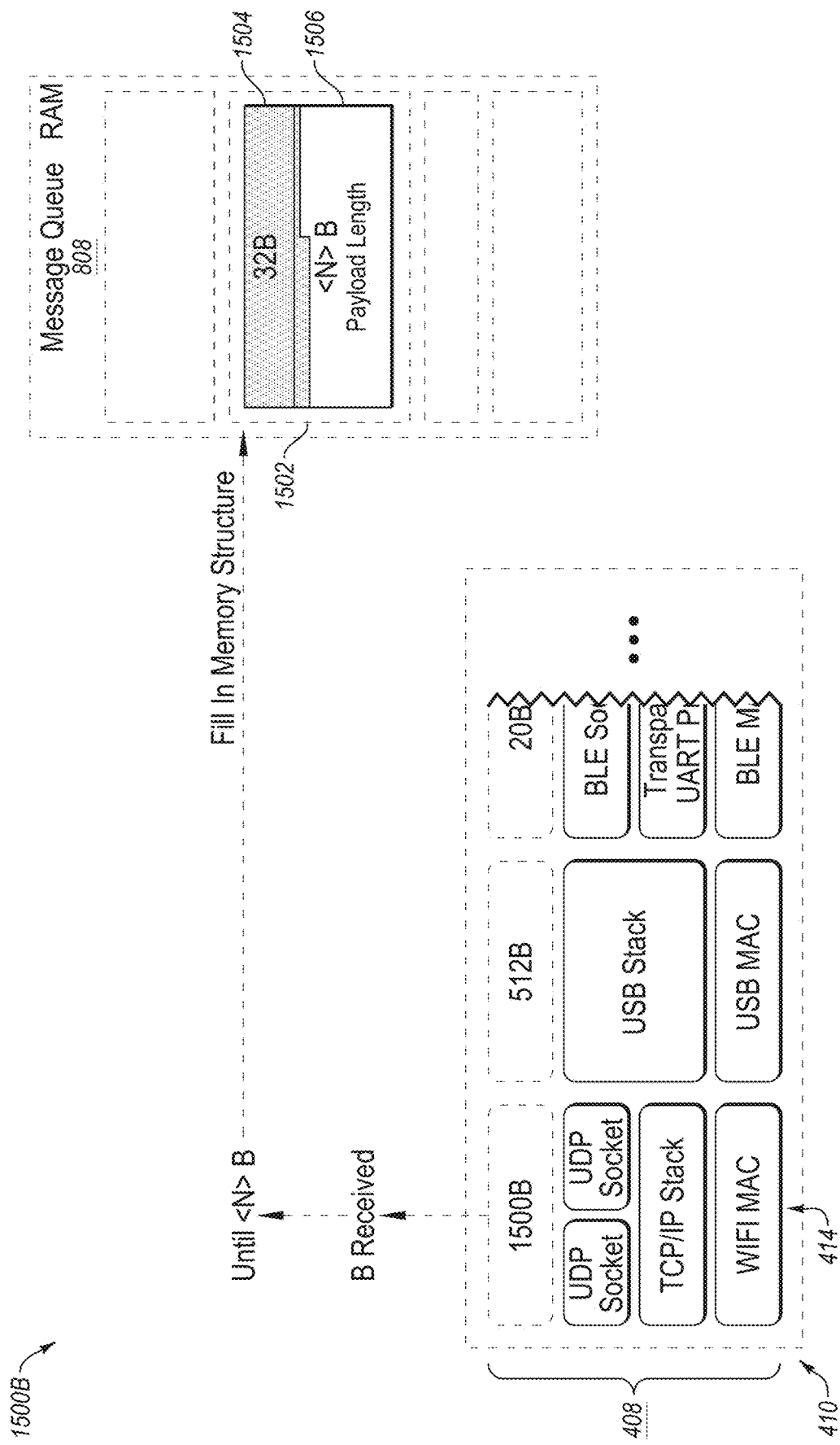
Figure 15C:
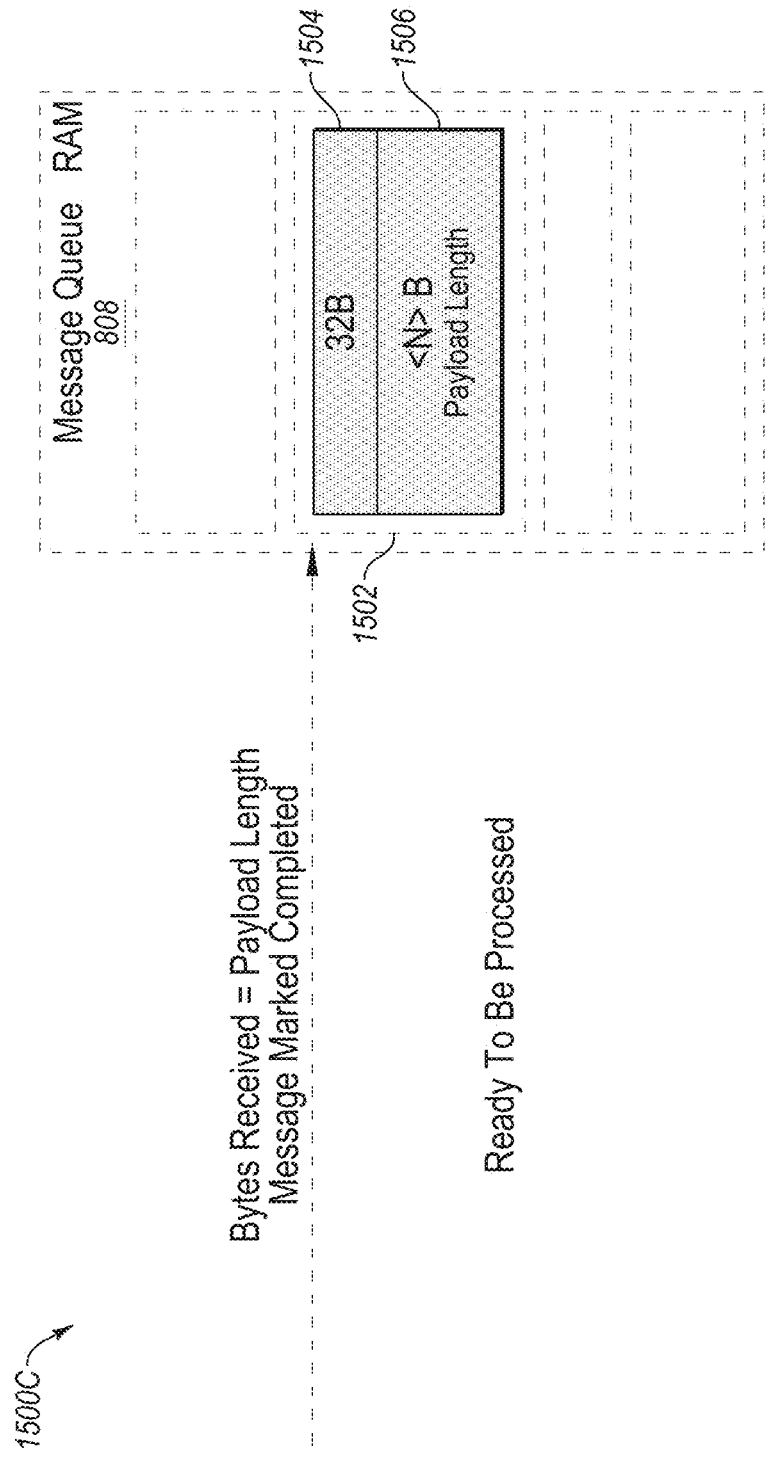

In FIG. 15B, additional data portions are then received and read from the output buffer of peripheral communication device 414 and stored in message queue 808, filling in more of available memory portion 1506 of allocated memory portion 1502 of message queue 808. In FIG. 15C, remaining data portions of the message are received and read from the output buffer of peripheral communication device 414 and stored in available memory portion 1506 of allocated memory portion 1502 of message queue 808, such that the total number of bytes received is equal to the payload length. Message queue management layer 460 may mark the message as completed, ready to be processed, or otherwise provide a signal or indication for processing of the message (e.g., processing by the sessions layer or the application).

Figure 15D:
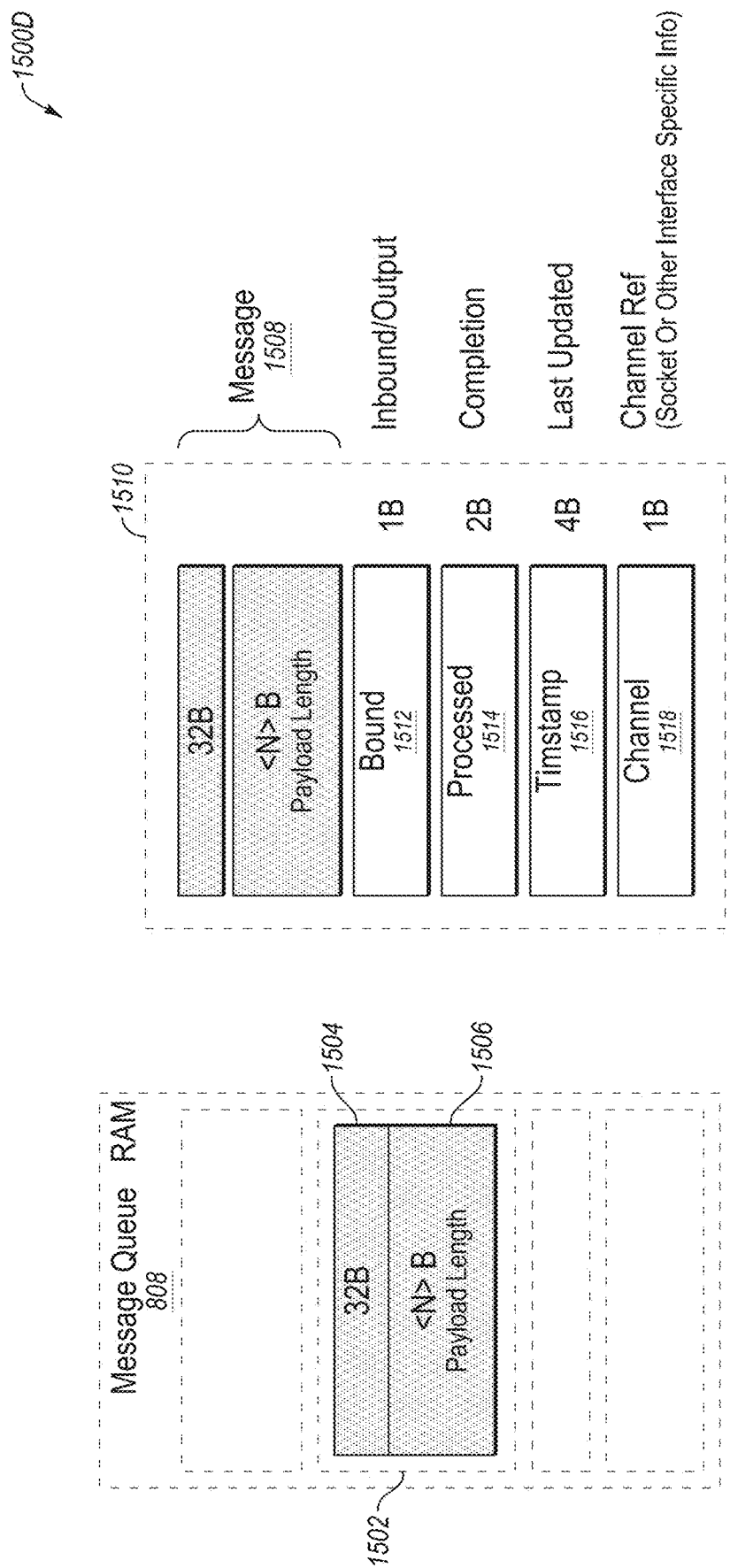

In FIG. 15D, an insert 1510 indicates that multiple context values may be associated with a message, such as message 1508. The context values may include a bound 1512 (for input/output), a processed value 1514, a timestamp 1516, and a channel 1518. In one or more examples, the processed value 1514 may be the number of bytes processed for message 1508 and used to identify message completion of message 1508. In one or more examples, timestamp 1516 may indicate the last time message queue 808 was updated for message 1508 (i.e., the last time bytes were received) and may be based on system tick. In one or more examples, channel 1518 (e.g., 0, 1, 2, and so on) may indicate on which channel the two nodes communicate and may include a socket or other interface-specific information.

Figure 16:
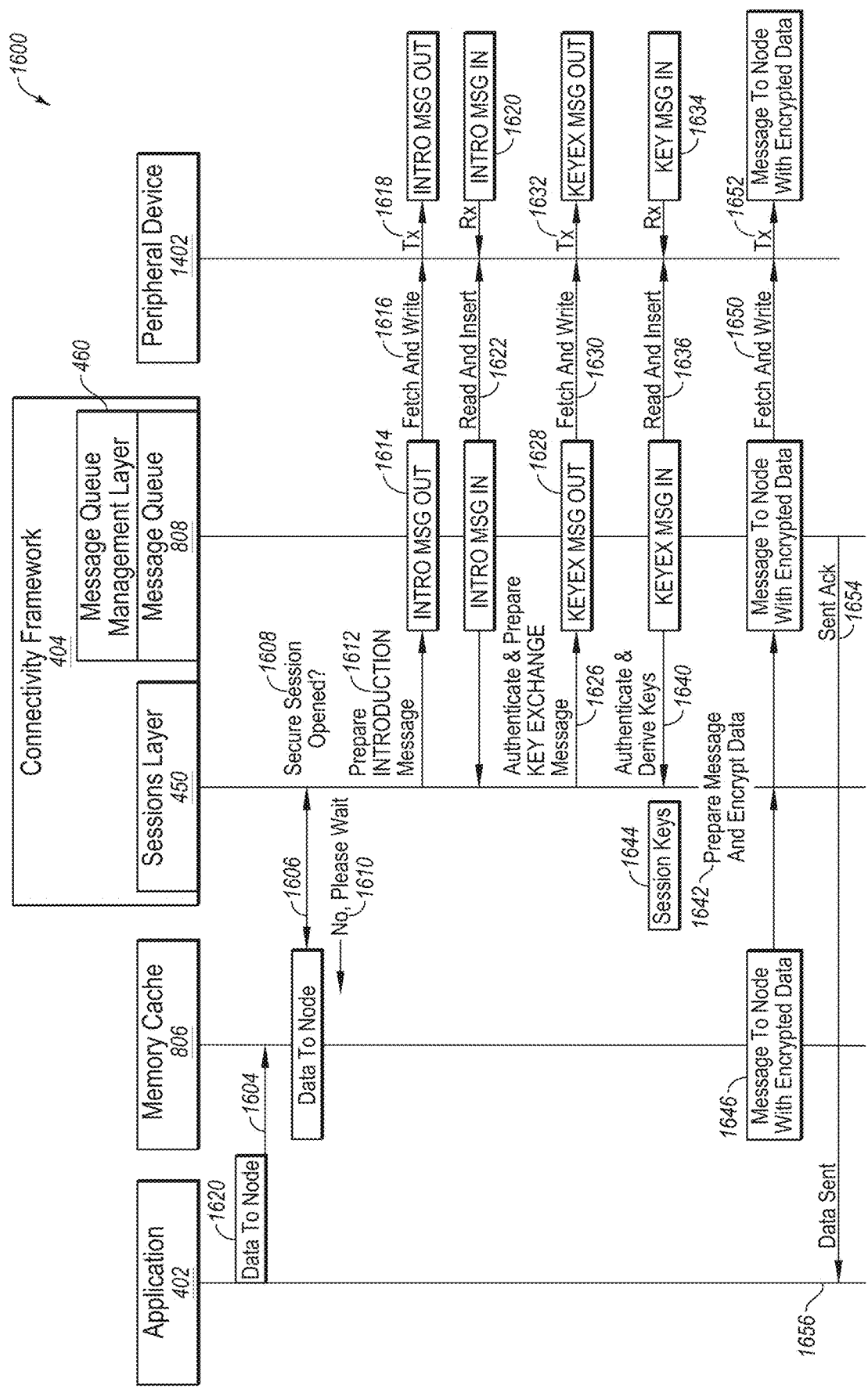
FIG. 16 is a flow diagram of a data/message flow for establishing a secure communication session using a connectivity framework processing module of a computing device, according to one or more examples.

FIG. 16 is a flow diagram 1600 of a data/message flow for establishing a secure communication session using a connectivity framework processing module of a computing device, according to one or more examples. At an act 1602, application 402 obtains data to send to a node. At an act 1604, application 402 may insert or store in memory cache 806 the data to send. Here, in one or more examples, application 402 invokes a function call to a function to send a message including the data to a destination device (e.g., function 910 to send a message in FIG. 9). In one or more examples, the function call indicates input parameters to identify the data to send, a destination identifier of the destination device, and an interface identifier of one of the multiple peripheral communication devices of the computing device (e.g., a peripheral communication device 1402) through which to transmit the message.

Connectivity framework 404 is to receive the function call to the function to send the message. At an act 1606, sessions layer 450 may receive an indication of the message to send. At an act 1608, sessions layer 450 identifies whether a secure communication session with the destination device is open. In this case, a secure communication session between the computing device and the destination device is not open. At an act 1610, sessions layer 450 may provide an indication that the secure communication session is not open and/or an indication for the application to wait. In response, sessions layer 450 begins to perform processing to establish a secure communication session. More particularly, sessions layer 450 may initiate an exchange of messages with the destination device according to a mutual authentication and key exchange protocol. In one or more examples, the mutual authentication and key exchange protocol may be performed according to any one of the methods described in relation to FIG. 11B, 17B, 17C, or 17D.

Here, at an act 1612, sessions layer 450 prepares an introduction message and inserts it into message queue 808 as an INTRO MSG OUT 1614. At an act 1616, data portions of the introduction message are fetched from message queue 808 and written to peripheral communication device 1402 to transmit the message from the computing device at an act 1618 (e.g., per acts 1442, 1443, 1444, and 1445, and so on, of method 1400A of FIG. 14A). The introduction message will be received and processed by the destination device for authentication/verification. In response, an introduction message from the destination device is received (e.g., an INTRO MSG IN 1620) at the computing device via the peripheral communication device 1402. At an act 1622, data portions of the introduction message are read from peripheral communication device 1402 and inserted into message queue 808 (e.g., per acts 1452, 1453, 1454, and 1455, and so on, of method 1400B of FIG. 14B). Sessions layer 450 receives a signal or indication that the introduction message has been received.

In response, at an act 1626, sessions layer 450 performs authentication/verification and prepares a key exchange message and inserts it into message queue 808 as a KEYEX MSG OUT 1628. At an act 1630, data portions of the introduction message are fetched from message queue 808 and written to peripheral communication device 1402 to transmit the message from the computing device at an act 1632 (e.g., per acts 1442, 1443, 1444, and 1445, and so on, of method 1400A of FIG. 14A). The key exchange message will be received and processed by the destination device for authentication/verification and derivation of one or more session keys. In response, a key exchange message from the destination device is received (e.g., a KEYEX MSG IN 1634) at the computing device via the peripheral communication device 1402. At an act 1636, data portions of the key exchange message are read from peripheral communication device 1402 and inserted into message queue 808 (e.g., per acts 1452, 1453, 1454, and 1455, and so on, of method 1400B of FIG. 14B). Sessions layer 450 receives a signal or indication that the introduction message has been received. In response, at an act 1640, sessions layer 450 performs authentication/verification and derives one or session keys 1644.

Subsequently, at an act 1642, sessions layer 450 prepares a message including the data (in memory cache 806) for sending to the destination device (e.g., per acts 1430, 1432, 1436, and 1438, and so on, of method 1400A of FIG. 14A). The data may be encrypted using one or more session keys 1644. A message 1646 including the encrypted data in memory cache 806 is inserted or stored in message queue 808. At an act 1650, data portions of the message are fetched from message queue 808 and written to peripheral communication device 1402 to transmit the message from the computing device at an act 1652 (e.g., per acts 1442, 1443, 1444, and 1445, and so on, of method 1400A of FIG. 14A). In response to sending the message, at an act 1654, a signal or indication of acknowledgment may be provided, and received by application 402 at an act 1656.

Thus, with use of sessions layer 450 of connectivity framework 404, secure communication sessions may be facilitated for computing devices. In one or more examples, sessions between nodes are created upon authentication and made secure using encryption using keys obtained according to a key agreement protocol and key derivation function. In one or more examples, authentication may be performed based on Elliptic Curve Digital Signature Algorithm (ECDSA) signatures. In one or more examples, the key agreement and key derivation may be compliant with National Institute of Standards and Technology (NIST) SP80-56a and -56c.

In one or more examples, each session is (substantially) the equivalent of a secure sockets layer (SSL)/TLS socket. Session keys may be used to encrypt data messages with AES128CBC, and each one may be signed with an incremental hash-based message authentication code (HMAC).

According to one or more examples, connectivity framework 404 provides a message structure, a compact protocol, as well as customized cryptographic libraries to provide a minimal memory footprint (e.g., 30 KB). In one or more examples, the connectivity framework allows use of any peripheral driver and any crypto device/accelerator. In one or more examples, for smaller microcontroller units, connectivity framework 404 may be utilized with a secure element or cryptography chip (e.g., ECC608) or hardware acceleration. In one or more examples, on a personal computer (PC), a server, or a smartphone, connectivity framework 404 may be distributed in library form (+ source) for easy maintenance. In one or more examples, the connectivity framework uses standard libraries from different OSs to be less subject to continuous or ongoing changes.

In a specific, non-limiting example, security for end-to-end encryption may be based on "simpleMAP" with added compliance with NIST SP800-56a and SP800-56c. SimpleMAP™ is a trademark of Microchip Technologies Incorporated, 2355 West Chandler Boulevard, Chandler, Arizona, U.S.A., 85224-6199.

In another specific, non-limiting example, connectivity framework 404 is to facilitate an exchange of messages according to a mutual authentication and key exchange protocol which is now described. In one or more specific examples, connectivity framework 404 may utilize one or more techniques described in U.S. patent application having Ser. No. 16/948,101, entitled "Mutual Authentication for Systems With Low-Throughput Communication Links, And Devices For Performing The Same," published as U.S. Publication No. US20210184869 A1, which is hereby incorporated by reference herein in its entirety for all purposes. Some of the techniques associated with the above-mentioned application are described herein for completeness.

When two or more parties desire to communicate, each party's identity is verified through an Elliptic-Curve-Digital Signature Algorithm (ECDSA) verification process. As part of the ECDSA verification process, the parties exchange identity information in a limited manner (i.e., in terms of number of message and size of data (in bytes) exchanged). While limited, the identity information is sufficient, alone or in combination with other information known by the parties, to successfully perform the ECDSA verification process. Once verified, the parties exchange (e.g., perform a key exchange agreement protocol, without limitation) a properly signed Elliptic Curve Diffie-Helman (ECDH) session key(s) used to derive session keys for communication. The session keys may be used to encrypt communication (e.g., messages, certificates, codes, without limitation) according to an encryption cipher such as a symmetric encryption algorithm (e.g., Advanced Encryption Standard (AES) 128, AES 256, without limitation), a stream cipher (e.g., Salsa20, Rivest Cipher (RC) 4, RC5, or RC6, without limitation), or a symmetric-key tweakable block cipher (e.g., ThreeFish, without limitation), without limitation.

FIG. 17A is a block diagram depicting structures 1700A of a thumbprint 1702 and a credentials 1708 for connectivity framework security, according to one or more examples. In one or more examples, thumbprint 1702 may be referred to as a connectivity framework (CF) thumbprint, and credentials 1708 may be referred to as CF credentials. Thumbprint 1702 includes a public key 1704 and a digital signature 1706 (e.g., having a total size of 150 bytes). Public key 1704 may include a serial number (SN) associated with the subject and a SN associated with the issuer. In one or more examples, credentials 1708 includes a device thumbprint 1710 (e.g., 150 bytes), an intermediate thumbprint 1712 (e.g., 150 bytes), a server thumbprint 1714 (e.g., 150 bytes), and a certificate authority (CA) thumbprint 1716 (e.g., 150 bytes) (e.g., where credentials 1708 may have a total size of 600 bytes).

Figure 17B:
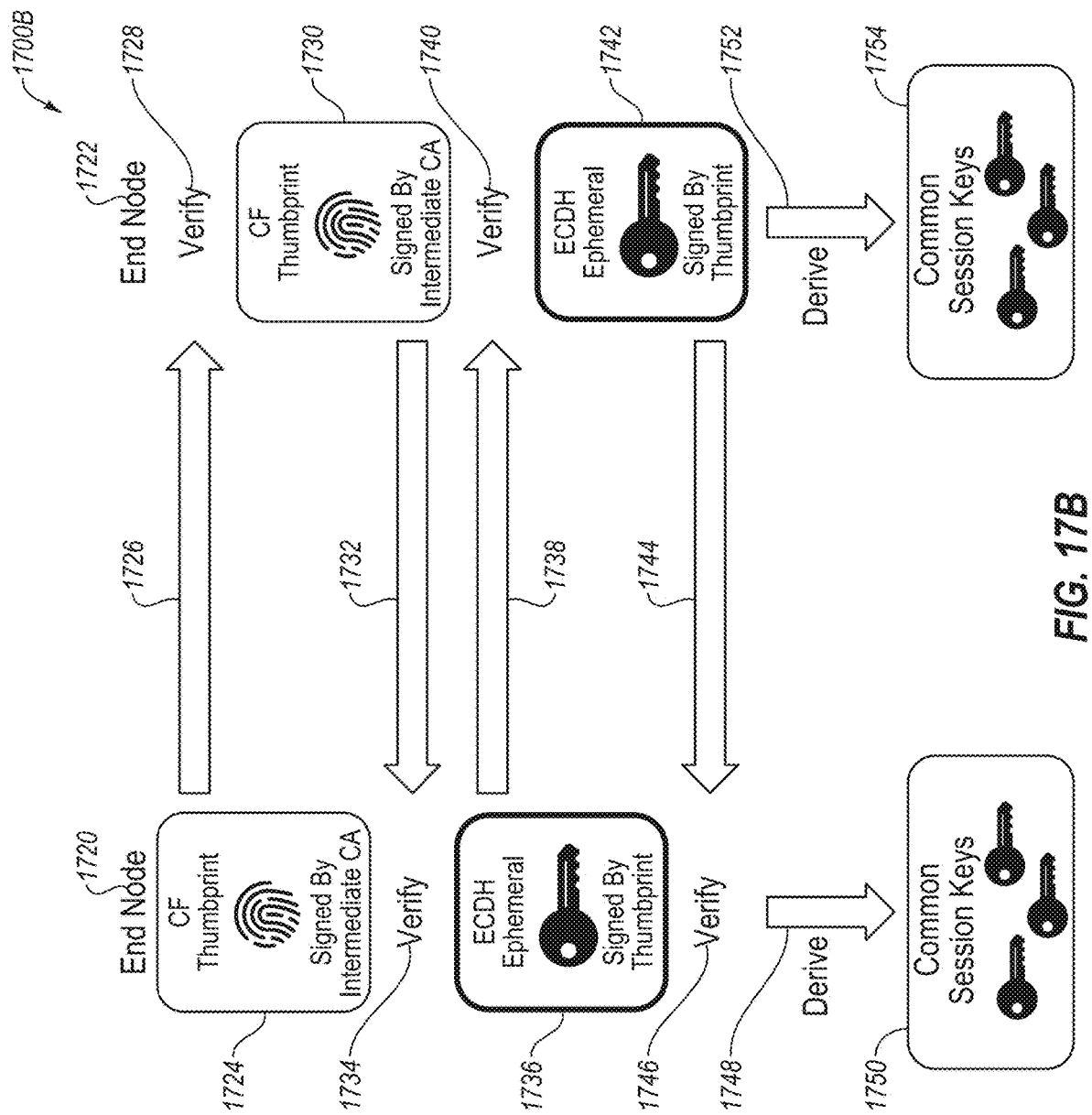
FIG. 17B is a message flow diagram of a message flow associated with an exchange of messages according to a mutual authentication and key exchange protocol, according to one or more examples.

FIG. 17B is a message flow diagram of a message flow 1700B associated with an exchange of messages according to a mutual authentication and key exchange protocol, according to one or more examples. In one or more examples, end node 1720 may be associated with a first party and end node 1722 may be associated with a second party. At an act 1724, end node 1720 prepares an introduction message including first identity information of end node 1720. The first identity information may be or include a CF thumbprint of end node 1720, which may be signed by an intermediate CA, in one or more examples. At an act 1726, end node 1720 sends the introduction message including the CF thumbprint to end node 1722. End node 1722 receives the introduction message from end node 1720. At an act 1728, end node 1722 verifies the CF thumbprint of end node 1720. At an act 1730, end node 1722 prepares an introduction message including second identity information of end node 1722. The second identity information may be or include a CF thumbprint of end node 1722, which may be signed by an intermediate CA, in one or more examples. At an act 1732, end node 1722 sends the introduction message including the CF thumbprint to end node 1720. End node 1720 receives the introduction message from end node 1722. At an act 1734, end node 1720 verifies the CF thumbprint of end node 1722.

At an act 1736, end node 1720 prepares a key exchange message including an ECDH public key signed according to the CF thumbprint of end node 1720. ECDH is a key agreement protocol that allows two parties, each having an elliptic-curve public-private key pair, to establish a shared secret over an otherwise insecure channel. At an act 1738, end node 1720 sends the key exchange message including the signed ECDH public key to end node 1722. End node 1722 receives the key exchange message from end node 1720. At an act 1740, end node 1722 verifies the key exchange message from end node 1720. At an act 1742, end node 1622 prepares a key exchange message including an ECDH public key signed according to the CF thumbprint of end node 1722. At an act 1744, end node 1722 sends the key exchange message including the signed ECDH public key to end node 1720. End node 1720 receives the key exchange message from end node 1722. At an act 1746, end node 1722 verifies the key exchange message from end node 1722. At an act 1748, end node 1720 derives one or more session keys 1750 based on the key exchange for secure communication with end node 1722. Similarly, at an act 1752, end node 1722 derives one or more session keys 1754 based on the key exchange for secure communication with end node 1720.

Figure 17C:
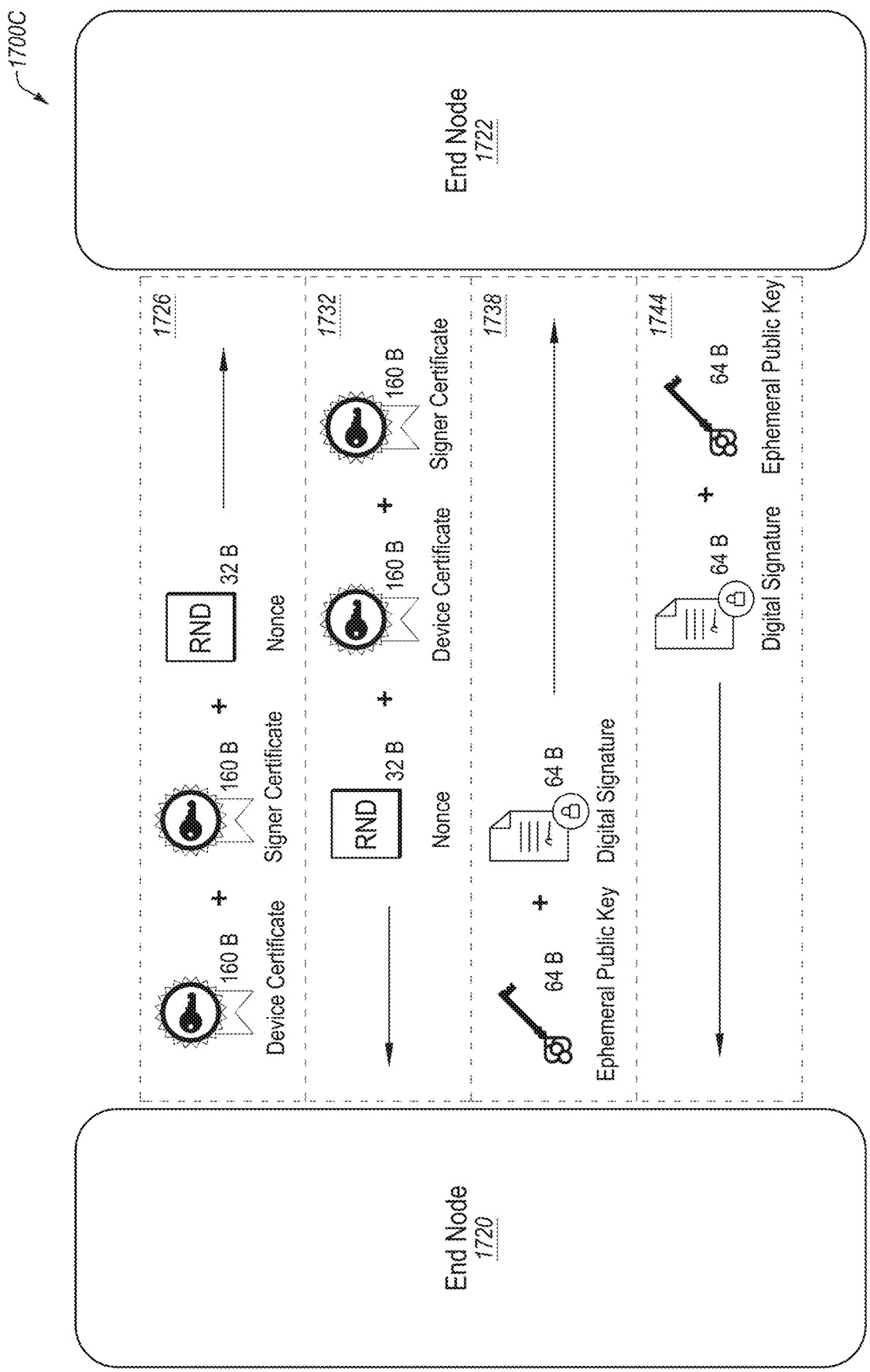
FIG. 17C is a block diagram depicting example messaging for a handshake messaging phase of a mutual authentication and key exchange protocol, according to one or more examples.

FIG. 17C is a block diagram depicting example messaging 1700C for a handshake messaging phase of a mutual authentication and key exchange protocol, according to one or more examples. A first message 1726 and a second message 1732 are sent as part of an identify information exchange. As depicted, each one of the messages includes a device certificate portion signed by a "signer," a signer certificate signed by a certificate authority, and a cryptographic nonce (e.g., a 32-byte random number). A third message 1738 and a fourth message 1744 are sent as part of an exchange of key agreement exchange information of a signed key agreement exchange protocol. As depicted, each one of the messages includes a signed ephemeral public key (e.g., signed with a digital signature generated using the sender's ephemeral private key and the received cryptographic nonce). In one or more examples, the signed ephemeral public key may be signed with the digital signature generated using the sender's ephemeral public key and the received cryptographic nonce.

Figure 17D:
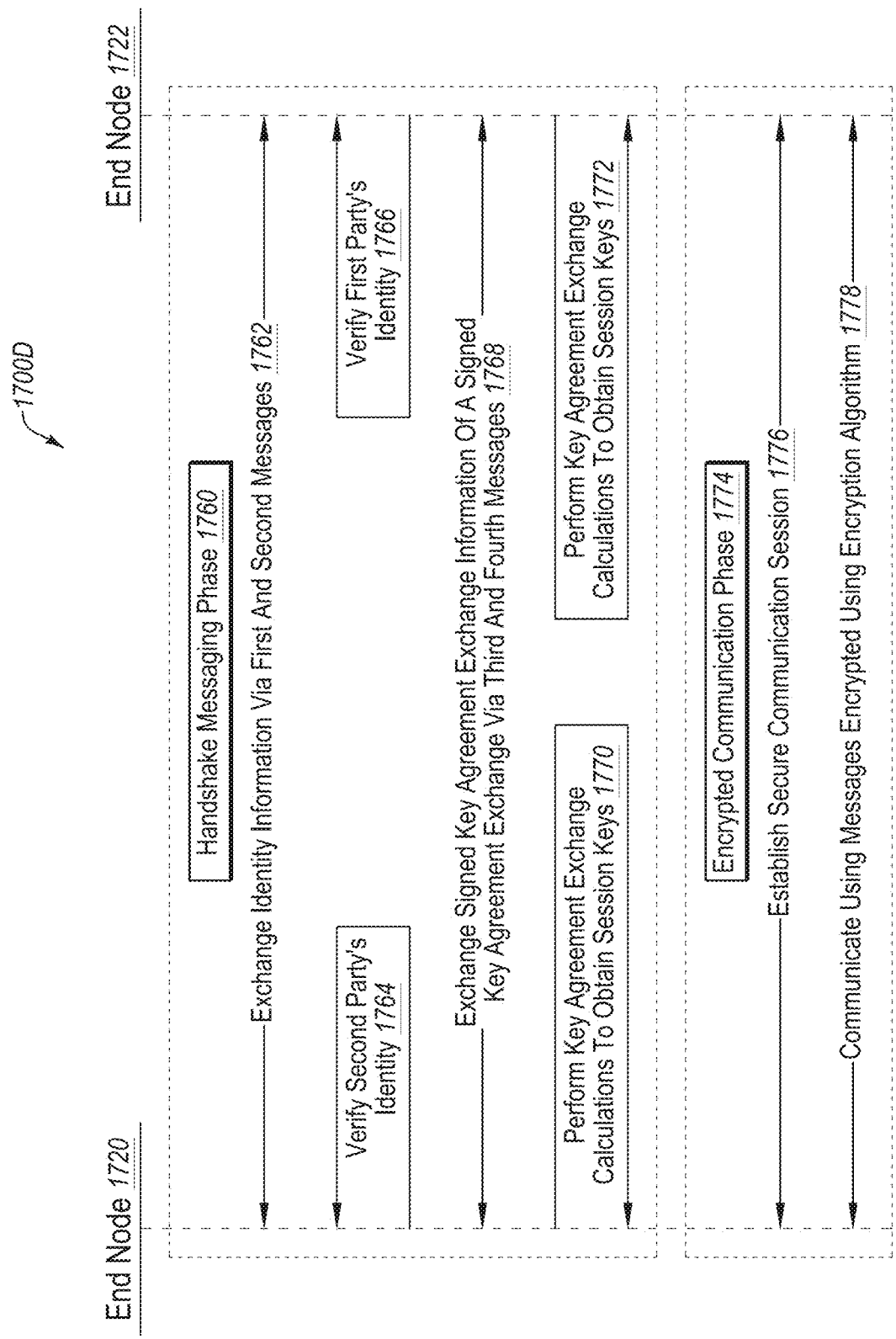
FIG. 17D is a message flow diagram depicting a protocol (e.g., an authentication protocol, or a mutual authentication and key exchange protocol), in accordance with one or more examples.

FIG. 17D is a message flow diagram depicting a protocol 1700D (e.g., an authentication protocol, or a mutual authentication and key exchange protocol), in accordance with one or more examples. In the specific non-limiting example of FIG. 17D, end node 1720 of a first party and end node 1722 of a second party perform protocol 1700D, which may include two phases: a handshake messaging phase 1760 and an encrypted communication phase 1774 which is performed upon successfully performing handshake messaging phase 1760.

During handshake messaging phase 1760, end node 1720 and end node 1722 exchange information as part of an attempt to agree on a set (or sets) of cryptographic keys that the parties will use to encrypt and decrypt messages during a secure communication session between the parties. Such cryptographic keys may be referred to herein as "session keys." More specifically, the parties attempt to agree on an intermediate key from which multiple session keys may be derived, such an intermediate key referred to herein as a "session secret." Performing handshake messaging phase 1760 may also be characterized herein as exchanging messages for "establishing a secure communication session" between parties, here, the first party associated with end node 1720 and the second party associated with end node 1722.

In operation 1762, end node 1720 and end node 1722 exchange respective identity information by performing first messaging of handshake messaging phase 1760. First messaging may include each one of end node 1720 and end node 1722 sending a message (a first and second message, respectively) with its respective identify information (which may include an optional cryptographic nonce), which message is received by the other party. Identity information may include, or be in the form of, one or more digital certificates for sharing information about the party, about the party's public key, about a signer of a party's certificate, and about a certificate authority that authenticates the signer. A public key certificate is a digital certificate authenticating ownership of a public key. A party's public key certificate may be referred to herein a "device certificate." Use of digital certificates that authenticate the identity of an entity for reasons other than authenticating ownership of a public key do not exceed the scope of this disclosure.

Generally, the role of a signer is to bring in an entity that has been authenticated (signed) by a certificate authority and thus enables devices such as end node 1720 and end node 1722, to be signed (authenticated) with a private key, provided by the signer carried (e.g., stored, without limitation) by such devices with less risk than carrying a certificate authority's private key that would have to be subject to extensive efforts to protect it and keep it secure. A signer's certificate may be signed (i.e., authenticated) by a certificate authority, and a device certificate may be signed (i.e., authenticated) by the signer. In one or more examples, identity information may include a signed device certificate portion and a signed public key certificate of a signer arranged in a certificate chain.

Identity information exchanged by the parties may include a portion of a device certificate, the portion signed by a signer authenticated by a certificate authority. As a non-limiting example, identity information may be included in an X.509 formatted certificate that corresponds to a portion of a device certificate. X.509 is presently defined by the ITU Telecommunication Standardization Sector (ITU-T). In one or more examples, a signed device certificate portion may include some, but not all, of the information used in a TLS certificate, a secure socket layer (SSL) certificate, or similar type certificate. A device certificate portion, signed or unsigned, may have a public key certificate format such as according to the X.509 format (including extensions thereof). Such a public key certificate format may include a specific certificate structure that defines specific fields for specific information and a size of a respective field in bytes. While some, or a totality of, information of a signed device certificate portion exchanged by the parties may be compressed, a device certificate portion, signed or unsigned, is in contrast to a compressed public key certificate where a totality of a public key certificate is recoverable solely by decoding the bits of the compressed public key certificate. Each party may recover the other party's device certificate from a signed device certificate portion and use respective recovered device certificates to verify the other party's identity, as a non-limiting example, using an ECDSA verification process.

In one or more examples, a device certificate or device certificate portion, signed or unsigned, may include instructions for requesting a public key from a sender, that is, a device certificate portion provided by end node 1720 may include instructions for requesting a public key from end node 1720, and a device certificate portion provided by end node 1722 may include instructions for requesting a public key from end node 1722. In one or more examples, the instructions may be encoded with a device certificate or device certificate portion and may be recovered and/or performed, a non-limiting example, as part of an ECDSA verification process.

In operation 1764 and operation 1766, each party verifies the other party's identity using the exchanged identity information, as a non-limiting example, using an ECDSA verification process. In the case of a device certificate and signer certificate arranged in a certificate chain, for each party, verification in operations 1764 and 1766 may include verifying a signer's signature applied to the signed device certificate portion using ECDSA verification and a signer's public key included with a signer's public key certificate signed by a certificate authority. The certificate authority's signature applied to the signer's public key certificate may be verified using ECDSA verification and a certificate authority's public key delivered separately from protocol 1700D using a trusted delivery procedure.

If both end node 1720 and end node 1722 verify the other, then they obtain the other party's respective public key (sent in the other party's signed device certificate portion) and may proceed to operation 1768. If either of the parties does not verify the other party, then operations 1762, 1764, and 1766 of protocol 1700D may be re-performed until both parties' respective identities are verified (e.g., or some threshold number of attempts to verify have been performed) or protocol 1700D may end.

In operation 1768, end node 1720 and end node 1722 exchange signed key agreement exchange information of a signed key agreement exchange via second messaging of handshake messaging phase 1760. Second messaging may include each party sending a message (a third and fourth message, respectively) with its signed key agreement exchange information, which message is received by the other party. Signed key agreement exchange information may include each party's signed ephemeral public key.

In one or more examples, the first and second cryptographic nonces exchanged in operation 1762 may be used by the parties to perform some of the operations of a signed key agreement exchange. As a non-limiting example, a cryptographic nonce, including without limitation the first and second cryptographic nonces may be a one-time-use number (e.g., an arbitrary number such as a time variant number, random number, pseudorandom number, or combinations thereof, without limitation) provided by end node 1720 and end node 1722, respectively. End node 1720 and end node 1722 use the first and second cryptographic nonces, respectively, to identify a specific authentication session (i.e., an authentication session corresponding to a particular execution of protocol 1700D), a specific communication or a specific secure communication session and associate messages therewith. An attacker cannot, or at least finds it more difficult to, copy and re-send encrypted messages that a party will accept—i.e., a so-called "replay attack," where a receiver treats an attacker's message as if it was sent by an authenticated sender.

In one or more examples, an encoded digital signature may be generated by encoding the generated digital signature using the other party's cryptographic nonce (i.e., the cryptographic nonce received in the previous message), and the ephemeral public key is signed using the encoded digital signature.

In operation 1770 and operation 1772, end node 1720 and end node 1722 each perform one or more calculations of a protocol for the signed key agreement exchange. In one or more examples, calculations of operation 1770 and operation 1772 include obtaining a session secret. In one or more examples, the session secret may be usable by one or both parties to obtain or recover session keys. In a specific non-limiting example, a session secret may be obtained by performing an ECDH algorithm and referred to as an "ECDH session key." A specific, non-limiting example, an ECDH session key type session secret is a pre-master key obtainable by performing a specific ECDH algorithm using a combination of signed public ephemeral keys exchanged by end node 1720 and end node 1722 in operation 1768, and private ephemeral keys generated by the end node 1720 and end node 1722.

In one or more examples, protocol 1700D obtains one or more session keys by performing a specific ECDH algorithm (e.g., an ECDH key agreement protocol) using a combination of signed public keys and respective private keys at end node 1720 and end node 1722. Non-limiting examples of session keys obtainable from an ECDH session key include an AES combined 32-byte key obtained by performing an HKDF derivation function to the ECDH session key, 16-byte AES and 16-byte AESIV keys derived from the AES combined 32-byte key, and an HMAC 32-byte key.

In one or more examples, each one of end nodes 1720 and 1722 to perform protocol 1700D may be configured to obtain a hash-based message authentication code (HMAC) key or a salted-HMAC key by applying a hash-based simple key derivation function (HKDF) to a session secret (e.g., ECDH session key) and one, or both of the first and second cryptographic nonces. Upon obtaining one or more of the session keys and HMAC key, each one of end node 1720 and end node 1722 may use those session keys and HMAC key to encrypt data and perform encrypted communication as part of a secure communication session.

Notably, operations of handshake messaging phase 1760 of protocol 1700D may be performed by exchanging a specific or maximum number of messages and bytes between end node 1720 and end node 1722. In the specific non-limiting example, four messages (i.e., each party sending a message including identity information and a cryptographic nonce, and each party sending a message including signed ephemeral public keys), and a total of 960 bytes (first and second messages, each: 320-byte certificate chain+32-byte cryptographic nonce; and second and third messages, each: 64-byte ephemeral public key and 64-byte digital signature—together forming the signed ephemeral public key) are exchanged between end node 1720 and end node 1722 during operation 1762 and operation 1768. A typical TLS protocol known to the inventor of this disclosure uses several kilobytes of data to perform an equivalent handshake phase to handshake messaging phase 1760.

As discussed above, operation 1762, operation 1764, operation 1766, operation 1768, operation 1770, and operation 1772 form some, or a totality, of handshake messaging phase 1760 of protocol 1700D. Operation 1776 and operation 1778 to be described include some, or a totality, of operations of an encrypted communication phase 1774 of protocol 1700D.

In operation 1774, protocol 1700D establishes a secure communication session between end node 1720 and end node 1722. As a non-limiting example, the secure communication session may be deemed established in response to end node 1720 and end node 1722 successfully performing handshake messaging phase 1760. In operation 1778, end node 1720 and end node 1722 communicate using a secure communication link, and more specifically, using messages encrypted using an encryption algorithm and the session keys derived by performing operation 1768, operation 1770, and operation 1772. Each party may use the derived session keys to decrypt the encrypted messages received from the other party.

As described herein in one or more examples, the connectivity framework utilizes a messaging system that allows for address distribution, network formation, routing, and secure peer-to-peer (P2P) sessions. This includes authenticated address distribution, routing and message forwarding, clusters and mesh networking, secure P2P sessions (e.g., similar to TLS) compliant with NIST standards (SP80-56a and -56c), and cloud connectivity.

Connectivity framework networking is now described in more detail. According to one or more examples, a common protocol is provided for use in relation to most any peripheral. In one or more examples, the common protocol highly reduces the complexity of bridging and/or message routing in a multi-technology network. In one or more examples, the common protocol ensures end-to-end encryption and authentication for nodes, together with lightweight, secure communication. In one or more examples, the common protocol facilitates use of different network topologies and also natively provides mesh support. In one or more examples, it allows customers to extend connectivity to the cloud, without modification of the protocol, for using any suitable messaging protocol broker (e.g., an MQTT Broker, as described later herein) and thus any service provider.

Figure 18:
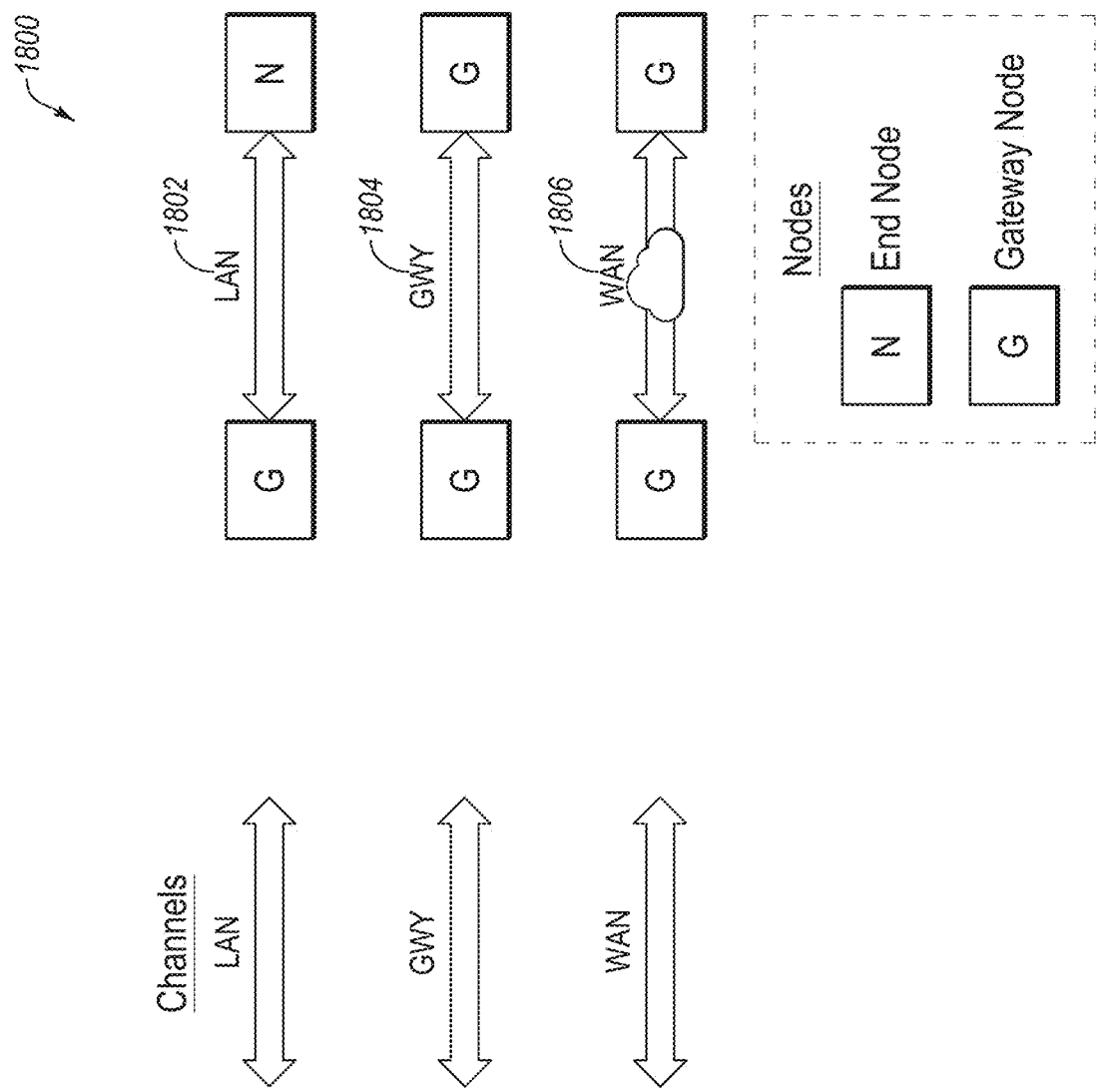
FIG. 18 is a block diagram to illustrate channel types for networking using the connectivity framework, according to one or more examples.

FIG. 18 is a block diagram to illustrate channel types 1800 for networking using the connectivity framework, according to one or more examples. Channel types 1800 include a local area network (LAN) channel 1802, a gateway (GWY) channel 1804, and a wide area network (WAN) channel 1806. LAN channel 1802 is a channel established between a gateway node and an end node. GWY channel 1804 is a channel established between a gateway node and a gateway node. WAN channel 1806 is a channel established between a gateway node and one or more remote gateway nodes (e.g., with an intervening network, for example, a cloud service provider, connected therebetween).

Figure 19A:
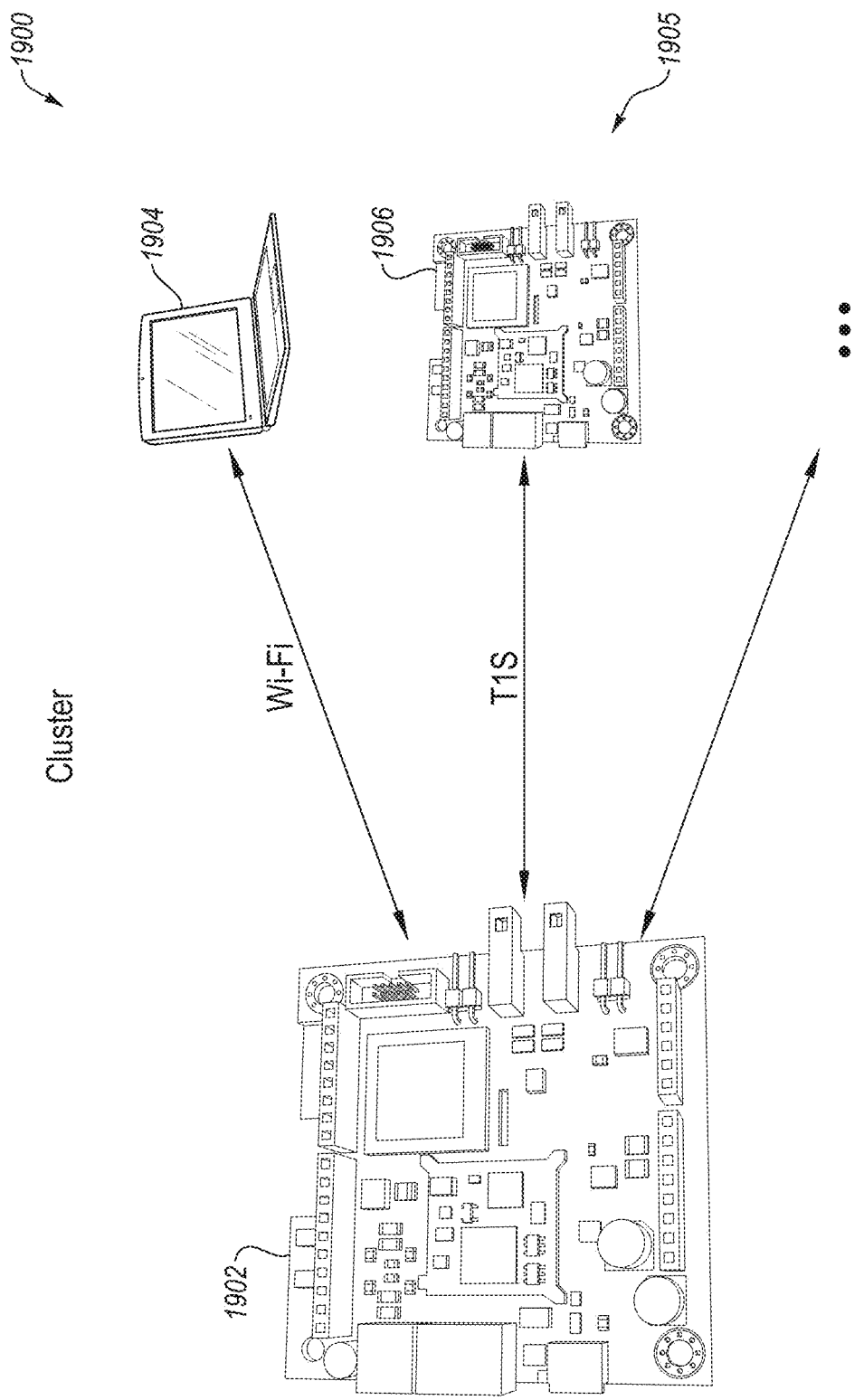
FIG. 19A is an illustrative representation of a system of communication for computing devices, according to one or more examples of the disclosure.

FIG. 19A is an illustrative representation of a system 1900 of communication for computing devices 1905, according to one or more examples of the disclosure. Computing devices 1905 may be or include some of the same devices as described in relation to FIG. 3, adapted according to one or more examples of the disclosure.

In one or more examples, respective ones of computing devices 1905 may communicate with other devices through a gateway node 1902. In one or more examples, computing devices 1905 are adapted to communicate with each other according to a unified messaging protocol via gateway node 1902. The unified messaging protocol used by computing devices 1905 is common to the different peripheral devices of computing devices 1905. In one or more examples, computing devices 1905 may also be adapted to establish secure communication sessions with each other according to an exchange of messages of a mutual authentication and key exchange protocol via gateway node 1902. The mutual authentication and key exchange protocol used by computing devices 1905 is common to the different multiple peripheral communication devices of computing devices 1905.

In FIG. 19A, computing devices 1905 include an end node 1904 and an end node 1906. In the specific, non-limiting example of FIG. 19A, end node 1904 includes a peripheral communication device for Wi-Fi communications and end node 1906 includes a peripheral communication device for T1S communications. Gateway node 1902, end node 1904, and end node 1906 form a cluster of devices or nodes associated with a cluster ID.

In one or more examples, gateway node 1902 includes multiple peripheral communication devices for various different communication protocols. In one or more examples, gateway node 1902 includes at least the peripheral communication devices for Wi-Fi and T1S communications. In one or more other examples, gateway node 1902 includes multiple peripheral communication devices for most or all (e.g., supported) communication protocols (sec, e.g., FIG. 3), regardless of whether the particular interface is currently in use by an end node.

Figures 19B, 19C:
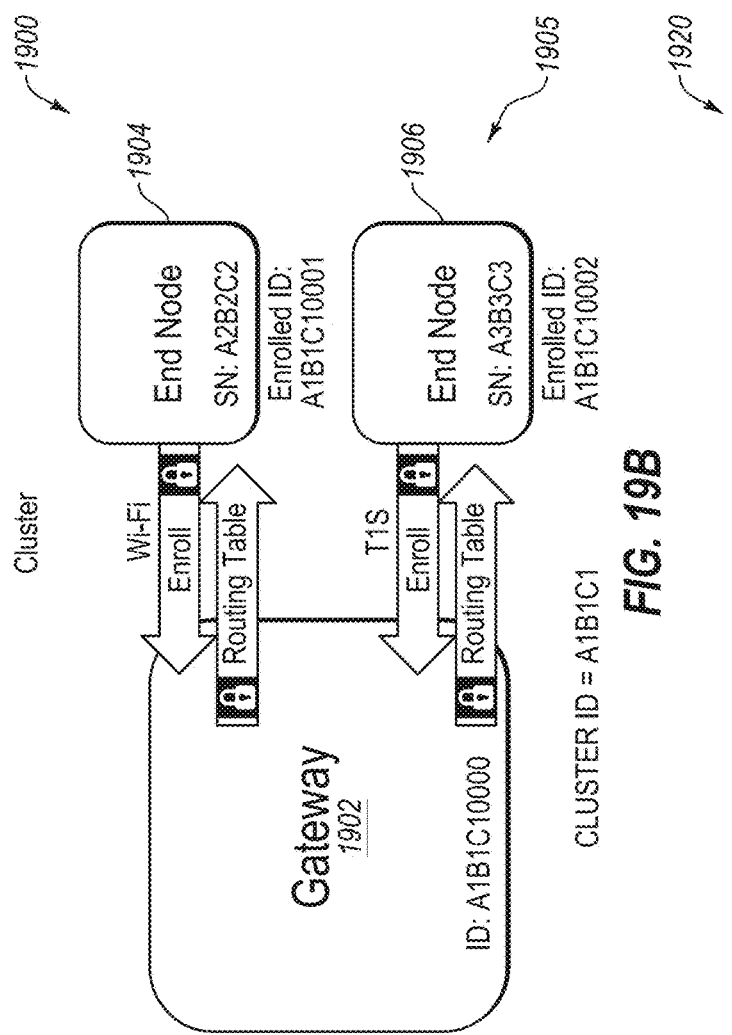
FIG. 19B is a block diagram of a system of FIG. 19A, which includes messaging for end node enrollment to a gateway node and messaging for distribution of routing tables by the gateway node, according to one or more examples.
FIG. 19C is an example routing table of the gateway node of FIGS. 19A and 19B, according to one or more examples.

FIG. 19B is a block diagram of system 1900 of FIG. 19A which includes messaging for end node enrollment to gateway node 1902 and messaging for distribution of routing tables by gateway node 1902, according to one or more examples.

An end node or a gateway node may enroll with a gateway node. In one or more examples, enrolling from an end node to a gateway node may include being authenticated and receiving a routing table of the gateway node, and receiving an ID as part of a cluster (e.g., ID=<serial number of gateway><SUB ID>). In one or more examples, enrolling from a gateway node to another gateway node may include establishing a GWY channel with the gateway node, and receiving a routing table containing all GWY and WAN channels that are present on the gateway node. A gateway node is to maintain and distribute a routing table, which includes a list of all connected nodes and channels. In one or more examples, a gateway node is to periodically check the status of its connections to keep the routing table regularly updated. For example, the gateway node may operate to send periodic "sanitycheck" messages to ensure that a connection is still alive.

Accordingly for communications via gateway node 1902, an end node is assigned with an enrolled ID upon enrollment to gateway node 1902. The enrolled ID includes a cluster ID and a sub ID appended to the cluster ID (see, e.g., FIG. 7C).

A cluster, which is identified by a cluster ID, is a group of nodes including gateway node 1902 and one or more end nodes enrolled with gateway node 1902 for communication. In one or more examples, the cluster ID is the serial number of gateway node 1902, and the sub ID is a selected value (e.g., "0002") unique to each node enrolled with gateway node 1902. In one or more examples, the serial number for an end node or a gateway node is a unique number assigned by a manufacturer of the node.

In the example of FIG. 19B, the serial number of gateway node 1902 is "A1B1C1," the serial number of end node 1904 is "A2B2C2," and the serial number of end node 1906 is "A3B3C3." For direct communications, end nodes 1904 and 1906 may use their respective serial numbers for identification. For communications via gateway node 1902, end nodes 1904 and 1906 will use their respective enrollment IDs assigned by gateway node 1902. Here, end node 1904 may send a message to enroll in gateway node 1902. In response, gateway node 1902 may select or generate an enrolled ID for end node 1904, and send a message to end node 1904 including its enrolled ID. Similarly, end node 1906 may send a message to enroll in gateway node 1902. In response, gateway node 1902 may select or generate an enrolled ID for end node 1906, and send a message to end node 1906 including its enrolled ID. In the example of FIG. 19B, the enrolled ID of end node 1906 may be "A1B1C10002."

FIG. 19C is an example routing table 1910 of gateway node 1902 of FIGS. 19A and 19B, according to one or more examples. Gateway node 1902 is to generate and maintain (e.g., regularly update) a routing table 1910 including a list 1920 of routing table entries. In one or more examples, gateway node 1902 may distribute routing table 1910 to its end nodes so that each end node may communicate with other nodes. In one or more examples, gateway node 1902 may regularly or periodically distribute an updated routing table to its end nodes so that each end node may communicate with other nodes.

Figure 20:
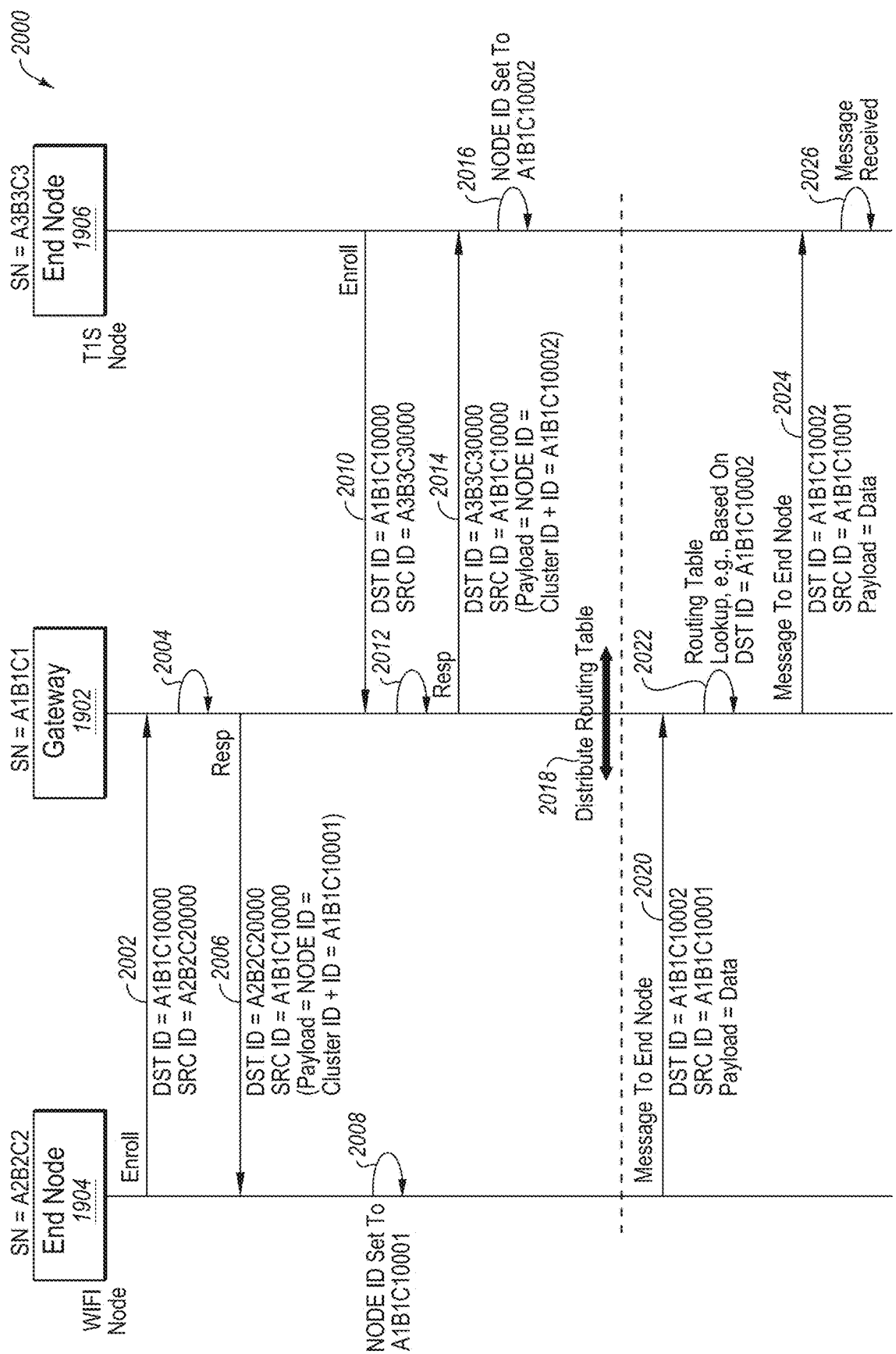
FIG. 20 is a message flow diagram of a message flow for gateway enrollment and routing of messages via a gateway node using a unified messaging protocol, according to one or more examples.

FIG. 20 is a message flow diagram of a message flow 2000 for gateway enrollment and routing of messages via a gateway node 1902 using a unified messaging protocol, according to one or more examples. Message flow 2000 is associated with the cluster of devices described in relation to FIGS. 19A and 19B. At an act 2002, end node 1904 sends an enrollment message to gateway node 1902. In response, at an act 2004, gateway node 1902 selects or generates an enrolled ID for end node 1904. At an act 2006, gateway node 1902 sends a message to end node 1904 including its enrolled ID. In the example of FIG. 20, the enrolled ID of end node 1904 may be "A1B1C10001." In one or more examples, the enrolled ID may be included in the payload of the response message. At an act 2008, end node 1904 sets its ID to the enrolled ID for communications via gateway node 1902. At an act 2010, end node 1906 sends a message to enroll in gateway node 1902. In response, at an act 2012, gateway node 1902 selects or generates an enrolled ID for end node 1906. At an act 2014, gateway node 1902 sends a message to end node 1906 including its enrolled ID. In the example of FIG. 20, the enrolled ID of end node 1906 may be "A1B1C10002." In one or more examples, the enrolled ID may be included in the payload of the response message. At an act 2016, end node 1906 sets its ID to the enrolled ID for communications via gateway node 1902. At an act 2018, gateway node 1902 may distribute its routing table to end nodes 1904 and 1906.

With reference back to FIG. 19C, the list 1920 of routing table entries of routing table 1910 includes enrolled IDs of end nodes stored in association with the respective serial numbers and peripheral interfaces of the end nodes. In the example of FIG. 19C, list 1920 of routing table entries includes an entry 1922 associated with gateway node 1902, an entry 1924 associated with end node 1904, and an entry 1926 associated with end node 1906. Entry 1922 for gateway node 1902 is associated with an ID of "A1B1C10000," the serial number of "A1B1C1," and all interfaces. Entry 1924 for end node 1904 is associated with the enrolled ID of "A1B1C10001," the serial number of "A2B2C2," and the Wi-Fi interface for routing. Entry 1926 for end node 1906 is associated with the enrolled ID of "A1B1C10002," the serial number of "A3B3C3," and the T1S interface for routing.

Returning back to message flow 2000 of FIG. 20, after the distribution of the routing table in the act 2018, at an act 2020, end node 1904 prepares and sends a message to end node 1906 via gateway node 1902. In one or more examples, the destination ID may be the enrolled ID of end node 1906 ("A1B1C10002") and the source ID may be the enrolled ID of end node 1904 ("A1B1C10001"). Gateway node 1902 receives the message from end node 1904. At an act 2022, gateway node 1902 consults the routing table. In one or more examples, gateway node 1902 may perform a lookup in the routing table based at least on the destination ID in the message. In one or more examples, gateway node 1902 identifies an interface identifier based at least on the destination ID, where the interface identifier corresponds to the peripheral interface through which to send the message. At an act 2024, gateway node 1902 forwards the message to end node 1906 via the peripheral interface corresponding to the interface identifier. End node 1906 receives the message from gateway node 1902, as indicated at a message received indication 2026.

Figure 21:
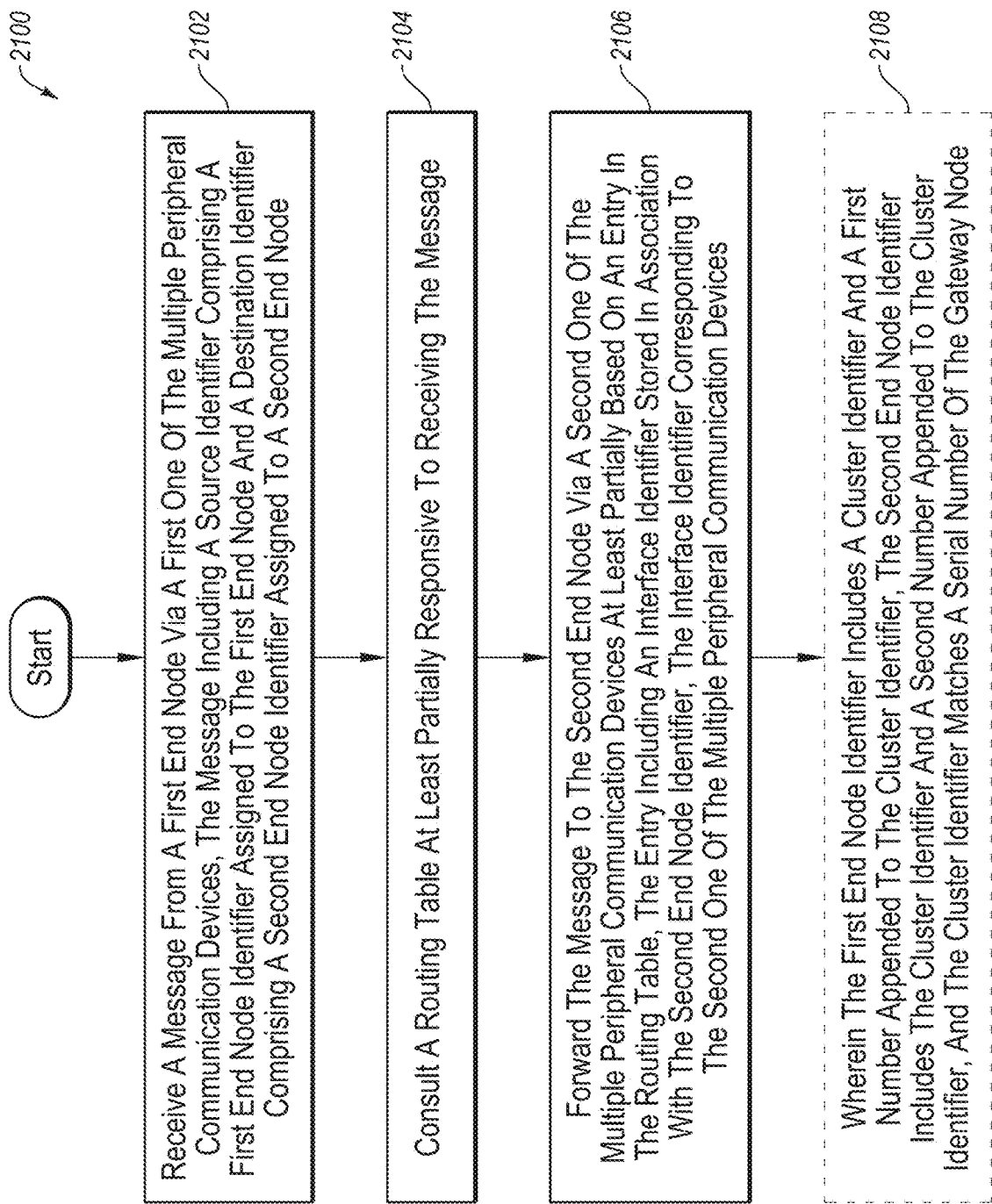
FIG. 21 is a method of routing messages between end nodes via a gateway node for nodes adapted with a connectivity framework for a unified messaging protocol, according to one or more examples.

FIG. 21 is a method 2100 of routing messages between end nodes via a gateway node for nodes adapted with a connectivity framework for a unified messaging protocol, according to one or more examples. In one or more examples, the acts or operations of method 2100 may be performed at a gateway node including multiple peripheral communication devices having different communication protocols. In one or more specific examples, method 2100 may be performed by a computing device comprising one or more processors, multiple peripheral communication devices of different communication protocol types operably connected to the one or more processors, and a memory to store processor-executable instructions that, when executed by the one or more processors, cause the one or more processors to perform operations of a gateway node according to method 2100.

At an act 2102, a message may be received from a first end node via a first one of the multiple peripheral communication devices. The message includes a source identifier comprising a first end node identifier assigned to the first end node and a destination identifier comprising a second end node identifier assigned to a second end node. At an act 2104, a routing table may be consulted at least partially responsive to receiving the message. At an act 2106, the message may be forwarded to the second end node via a second one of the multiple peripheral communication devices at least partially based on an entry in the routing table. The entry includes an interface identifier stored in association with the second end node identifier, where the interface identifier corresponds to the second one of the multiple peripheral communication devices.

In one or more examples, the message has a message format according to a predetermined messaging protocol. In one or more examples, the predetermined messaging protocol comprises a unified messaging protocol which is common to messages received and forwarded through the multiple peripheral communication devices. The message may include a header and a payload comprising data, and the header may include the source identifier and the destination identifier.

In one or more examples, at an indication 2108 of FIG. 21, the first end node identifier includes a cluster identifier and a first number appended to the cluster identifier, and the second end node identifier includes the cluster identifier and a second number appended to the cluster identifier. In one or more examples, the cluster identifier matches a serial number of the gateway node (act 2108). In one or more examples, the first end node identifier assigned to the first end node for routing messages via the gateway node is different from a serial number of the first end node, and the second end node identifier assigned to the second end node for routing messages via the gateway node is different from a serial number of the second end node.

Prior to the acts or operations of method 2100, a first enrollment message may be received from the first end node. At least partially responsive to receiving the first enrollment message, the first end node identifier may be assigned to the first end node, and a first response message including the first end node identifier may be sent to the first end node. In addition, a second enrollment message may be received from the second end node. At least partially responsive to receiving the second enrollment message, the second end node identifier may be assigned to the second end node, and a second response message including the second end node identifier may be sent to the second end node. In one or more examples, copies of the routing table may be distributed to respective ones of the first end node and the second end node.

Connectivity Framework Embedded Library. User guidance for a connectivity framework embedded library is now described. The connectivity framework features a set of libraries and tools that implement a universal messaging system. Secure connectivity in embedded system has become more and more a requirement of any project. But often, the lack of common standards between the most used peripherals has made the implementation very complex. The aim of the connectivity framework is simplifying the communications inside networks composed of different technologies and allow even the smallest MCU to communicate securely over any peripheral.

The connectivity framework is a secure networking protocol that runs in the application layer. This makes it portable to any project, any controller, and/or any peripheral. Each peripheral has its own stack and its own way of operating, but each one has a common final purpose: to receive and to send bytes of data. The connectivity framework is hooked to the low-level functions of each one of the peripherals that are ultimately responsible for transferring in or out buffers of bytes of data. Once the function that sends bytes out is linked to send what the connectivity framework will inject in those buffers, and once the function that receives bytes from that peripheral is presenting them to the connectivity framework, complete connectivity on that peripheral will be managed in full by connectivity framework. This means that the user (application) will no longer interface with the peripheral's API to send and receive messages, but it will rely completely on connectivity framework to do that. Memory and queues management, synchronizations, network addressing, and so on, may be totally managed by the connectivity framework. The user (application) may merely instruct the connectivity framework to send data to a specific node in the network, providing its identifier and the data. All the rest (e.g., opening of a secure authenticated and encrypted session, routing, decryption, timing, and so on) will be handled by the library.

A connectivity framework network may take on different forms, from a P2P to a multi mesh, and may be extended by the connectivity framework "Cloud" to travel on the Internet and to reach remote nodes. Definitions and/or nomenclature are now provided, in one or more examples of the disclosure.

Node. A device (Controller/PC/Server/Smartphone) equipped with the connectivity framework stack and uniquely identified with an ID.

ID. An ID is an identifier that each node must have to participate in a connectivity framework network. It is composed by of 11 bytes.

Serial Number (SN) (9 bytes): unique identifier, often taken from the SN of the on-board Secure Element. Sub-ID (SID) (2 bytes): unique identifier assigned to a node that joined a network. It is by default 0x00,0x00, until the node is enrolled by a gateway (that will assign a different one).

An ID is defined as ORIGINAL-ID when it is composed of the actual SN of the device and has two zeros as Sub-ID.

An ID is defined as ENROLLED-ID when it is composed of the SN of the gateway that enrolled the device in its sub-network and has a Sub-ID assigned by that gateway.

When a device wants to communicate with a Node that belongs to a sub-network it must use the ENROLLED-ID assigned by the gateway of that sub.

Channel. A channel is a logical communication channel, as defined by the underlying stack that manages a specific peripheral (e.g., on a TCP/IP stack is a Socket, on CAN/RS485/802.15.4 is a connection with a specific address, on a USB a specific end-point, etc.). Ultimately, the channel can be defined as an integer that the user assigns to a specific connection that can be distinguished in his system. For example, consider a device that has an Ethernet interface and a CAN interface: the user may assign channel-0 to socket towards IP x, channel-2 to socket towards IP y, and channel-3 to CAN end node connected on address 0x399. In other words, the channel information (this integer) is used inside the connectivity framework to distinguish on which logical channel of that peripheral the bytes of data are coming or going.

Interface. An interface is the physical peripheral device on which the node is communicating (e.g., in that specific session). In the connectivity framework interfaces may be listed in an enumerator as:

```
typedef enum
{
    APP_IF_BLE=0,
    APP_IF_WIFI,
    APP_IF_T1S,
    APP_IF_CAN,
    APP_IF_USB,
    APP_IF_ALL
} APP_INTERFACES;
```

Queue. With this term, we refer to the queue of the connectivity framework messages that the library creates and manages in RAM at run time. There is only one message queue in the connectivity framework stack that contains input (inbound) or output (outbound) data.

Session. The session or communication session is a time-delimited two-way link between two nodes over a communication channel. The session starts with a predefined message exchange aim to define a set of common keys (or "Handshake Phase") and continues with all subsequent message exchange that will use those keys to encrypt and authenticate the communication (or "Chat Phase"). A session can be closed by any of the two nodes at any time. To start communicating again, a new session needs to be re-opened with a brand-new set of session keys. The main reference to a session in the connectivity framework stack is the session ID. The identifier of a session is composed of the 11 bytes of the node ID that is the counterpart of the communication. So, for each node that is in a session, one will refer to the session with the identifier of the other. Session IDs may not be unique, as a node may communicate over different peripherals to the same recipient. Therefore, to uniquely identify a session, the interface and the channel should be specified.

End node. With this term, we define which of the two possible roles a node can play in a network. An end node is a node capable of opening sessions and receiving opening sessions requests, but it does not route messages directed to other nodes. Each message received is inspected to discover to which node is directed to: if the message is not meant for the node, it will be simply discarded.

Gateway node. With this term, we define which of the two possible roles a node can play in a network. A gateway node is a node capable of opening sessions and receiving opening sessions requests and it does route messages directed to other nodes. A gateway node enrolls other nodes in its sub-network. It accepts authenticated enrollment requests, responding back, upon success, with a new node ID that the enrolled node should use to communicate within the sub-network. This new enrollment ID will be composed of the gateway node's SN followed by a 16-bit integer (e.g., 2 bytes) assigned to that node. Each node that wants to be enrolled by a gateway needs to open a connectivity framework session to the gateway, and upon authentication, present its own request for enrollment. Within the connectivity framework session between the gateway and the enrolled node, the gateway can distribute (encrypted) a routing table that lists all the nodes in a sub-network and their IDs to reach out to them.

Routing table. A routing table is a list of nodes' specific information. Every item of this list is composed by 32 bytes that contains information about the node. The routing table is managed and distributed by a gateway node to all the members of a sub-network.

Cluster. A cluster is a sub-network defined by a gateway and its enrolled nodes.

Thumbprint. A thumbprint is a connectivity framework certificate of identity for a node (e.g., 150 bytes long). It contains information about the SN of the device, its device public key, its signer SN, the expiration date, and its signer signature.

Credentials. The credentials are a set of thumbprints that defines a complete identity of a device, from its own certificate up to the CA thumbprint, listing all intermediates CAs and signer that compose its full chain of trust.

Security layer. The security layer is represented by the simpleMAP™ Protocol. In one or more examples, this protocol uses only two messages by each node to accomplish a full authentication and key exchange using public key cryptography over Elliptic Curve. The first mutual exchanged messages contain the identity of the nodes involved in the session (Introduction Message) while the second represents the key agreement (Key Exchange Message). In one or more examples, the method may be compliant with: ECDSA-FIPS186-3 Elliptic Curve Digital Signature; ECDH-FIPS SP800-56A Elliptic Curve Diffie-Hellman; HKDF-FIPS SP800-56C Key Derivation; and AES128-FIPS 197.

Networking principles. The connectivity network may allow different kinds of network topologies to be formed and managed by its stack. The simplest is the P2P type, where each of the two peer devices have same role in the network. All other topologies require the presence of one or more gateways that are able to enroll end nodes in the network and are capable of routing messages between different channels/interfaces.

Point-to-Point (P2P). In this type of network, a single connection allows two devices to exchange data with each other. A session is opened by one of the two, and the other will join. To start a secure session with another node, the user just needs to know the original ID of the node it wants to connect to and will present its own original ID in the introduction message.

Star/Mesh networks. In these types of networks, nodes are grouped in clusters. Each cluster is defined by a gateway that enrolls its end nodes, accepting their authenticated enrollment requests and assigning to each one an enrolled ID. Through the enrolled ID that contains the gateway SN of the cluster, each node that uses that ID to introduce itself in a session towards an external node (outside its own cluster), transmits within this ID the information necessary to that node to respond and make all intermediate devices know which path to follow. This is possible, because on a network, once every end node is enrolled with its gateway and each gateway is enrolled with the other, they all share the same routing table. What changes in every copy of the routing table for each node is the channel associated to the listed entries that will contain a different channel depending on which one the routing table has been received. To point to a particular device, a node can route the message on the channel indicated on the routing table.

Figure 22:
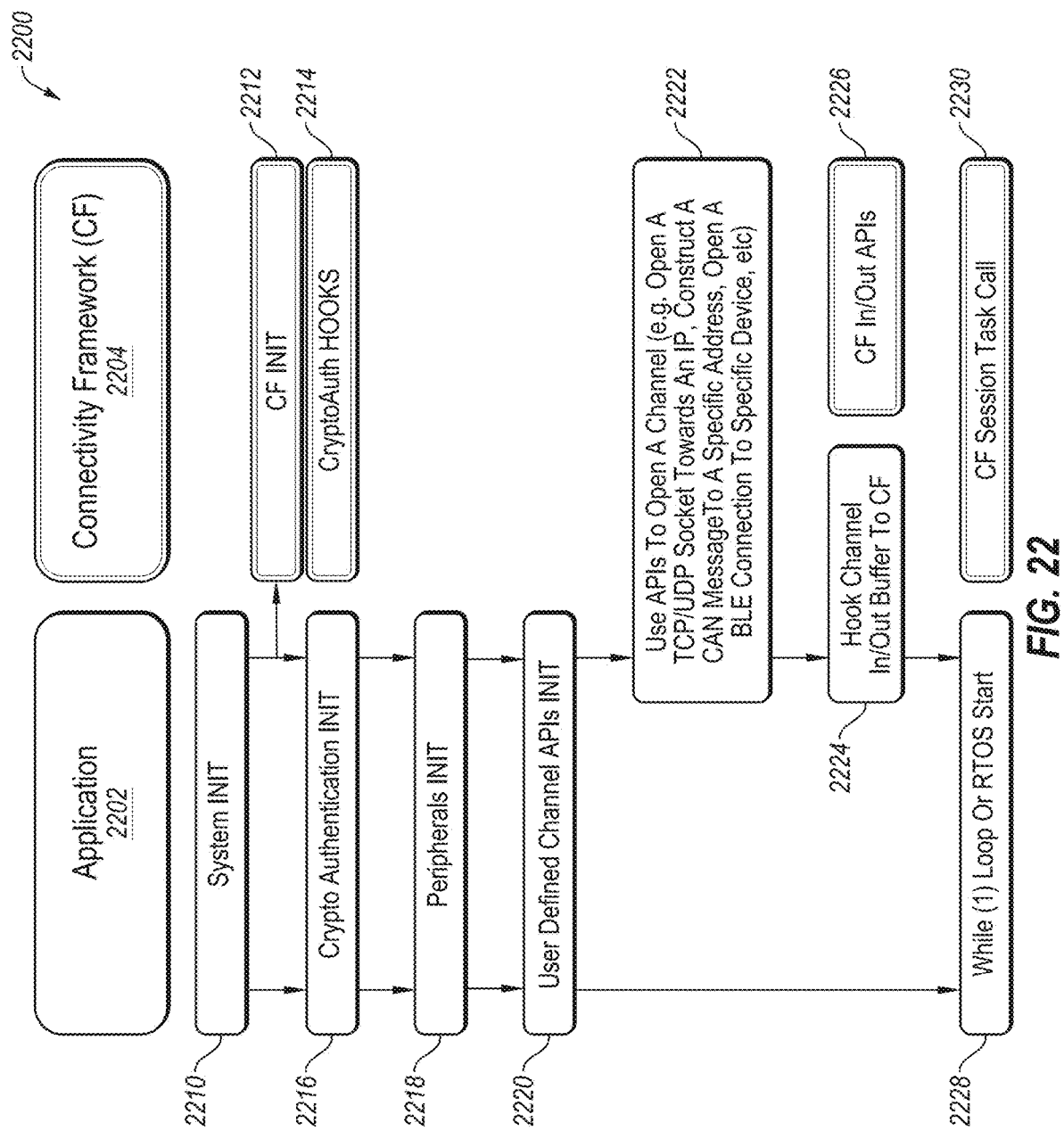
FIG. 22 is a quick overview of a system start flow for an embedded system that utilizes a connectivity framework, according to one or more examples.

FIG. 22 is a quick overview of a system start flow 2200 for an embedded system that utilizes a connectivity framework 2204, according to one or more examples. A typical application architecture for the embedded system that uses connectivity framework 2204 as its communication stack with an application 2202 is described. Once the system is initialized at an act 2210, the connectivity framework 2204 may also be initialized at an act 2212. During this phase, at an act 2214, the user should indicate to the connectivity framework library where to find the credentials of the device identity and set up a callback function to receive data and status messages from the stack. Other initializations may be performed for all the crypto-authentications functions, at an act 2216, that the library needs to perform externally, with whatever resources are available on a given system. In this phase, the user should map each required function with a proper implementation.

After this, the user code should initialize all peripherals, at an act 2218, and define its own APIs, at an act 2220, and APIs that will be used to open communication channels, at an act 2222. Within this phase, the input and output buffers of the channels should be linked with the connectivity framework library, at acts 2224 and 2226, giving the library the ability to acquire data and prepare responses to be sent out. Then, when the application actually starts, at an act 2228, inside the main loop or in a task periodically run by the system, the user may insert a periodic call to CF_SESSIONS_TASK API, at an act 2230, that will manage the entire communications, handling everything needed at lower levels. When the application is running, the user code can open a channel and use the connectivity framework API to open sessions to nodes. Inside the callback function, it is possible to monitor the various sessions status and receive data, routing tables, acknowledges, and so on in the clear.

Available library files. The embedded connectivity framework library may include the following files: CFlib<vv>.a (vv=2 digit version); cf.h; and cf_config.c. The ".a" file is a precompiled C library that should be chosen based on the connectivity framework core that it will run. It should be included as a library into the project. "cf.h" is the header file that is included in any C source file that uses the connectivity framework. "cf_config.c" is a C source file that is included in the project and modified at the user's convenience in the first part (named "USER CONFIG") to configure the library.

Library configuration. Once the library and the files have been included in the project, one may configure the desired behavior of the library by modifying the first section of "cf_config.c" (named "USER CONFIG").

Memory model. Options-Dynamic or Static. This option defines if you want to use a static or dynamic memory model for the structures and variables of the connectivity framework library. Static memory will instruct the library to define global variables of the required size and use static memory. Dynamic, instead, will instruct the library to allocate memory on demand when it is required and free it when finished.

Message size. Options-Full or Reduced. This defines the max message length in bytes (for the pure payload). Full: maximum 1024 bytes per message; or Reduced: maximum 432 bytes per message. The information about maximum message size is delivered to the counterpart of the session through the Introduction message.

Credentials location. Options-Flash or External Device. Each of these settings, when defined, expects the user to make available at the referenced pointers, the credentials bytes. Flash: const uint8_t credentials[600]; External device: uint8_t*ext_dev_inter_cred. In case of Flash, the credentials are expected to be defined in the cf_config.c file. When an external device holds the credentials, the user is expected to retrieve those bytes in memory and make it available at ext_dev_inter_cred pointer.

Session validation. If CF_SESSION_VALIDATE is defined, the library will ask permission to the user about completing a session handshake with a specific device. If this macro is defined, inside the callback the user will receive the whole trust chain of an Introduction message and can decide whether to allow the connection or not.

Max array values. Macros should be defined to set the limits of various arrays, in order to balance memory usage and performances.

The connectivity framework 100 msec tick. A macro called CF_DEF_100 MS_TICK should be defined, containing the number of system ticks (number of times that a timer callback is fired or a task tick) needed to count 100 msec. This comes in the bundle with the CF_tick_increment API and the uint32_t CF_TICKS_FROM_START variable. The CF_tick_increment API should be called periodically by the application to update the CF_TICKS_FROM_START variable that holds the value of ticks since the system start, and it is used by the connectivity framework to measure elapsed time to calculate timeouts.

Messages timeout. These macros are used to define the timeouts that the connectivity framework will use to consider a message found in the queue still valid. CF_DEF_MSG_INCOMPLETE_MAX_PENDING_TICKs defines the max number of ticks that a message can remain in the queue in an incomplete state. CF_DEF_MSG_COMPLETE_MAX_PENDING_TICKs defines the max number of ticks that a complete message can remain in the queue un-processed.

Callback. Callback is the main method that the connectivity framework uses to notify the user code (application) of what is happening at the connectivity framework. If macro CF_DEF_USER_CALLBACK_ACTIVE is defined, the connectivity framework expects that the user will define and register in its code the cf_user_callback. A list of possible callback types are as follows: user data arrived on a session and passed to user in decrypted form; the connectivity framework received a data acknowledge; a session is about to be opened and needs to be validated; a secure firmware update request has been received; a secure firmware update block has been received; a session changed its status; a message queue is ready to accept new data; the connectivity framework received a new routing table.

Secure firmware update. A macro named CF_DEF_INCLUDE_SFU should be defined to include the secure firmware update code in the connectivity framework. In case this macro is defined, the connectivity framework expects the user to define a Serial Number (buffer of nine bytes) defined as CF_SECURE_FIRMWARE_VALID_SN containing the reference to the only SN from which to accept a firmware update.

Device types. One of the following two macros should be defined to explicitly set the role of the device: CF_DEF_DEVICE_TYPE_ENDNODE (for the role as an end node) or CF_DEF_DEVICE_TYPE_GATEWAY (for the role as a gateway node). There are four possible device types:

define DEVICE_TYPE_WAN
define DEVICE_TYPE_GATEWAY
define DEVICE_TYPE_ENDNODE
define DEVICE_TYPE_GATEWAYW Even if an embedded device can initially be only a gateway or an end node, there are other two types that a generic device can assume: (1) WAN—it is a type of the connectivity framework Cloud; (2) GATEWAYW: it is a type of gateway that has a connection with a WAN network (attached to the Cloud). Depending on the existence of this connection, at run time a gateway device can change its type from GATEWAY to GATEWAYW and vice versa. This information is used by the connectivity framework stack to route messages that are meant for an ID that is not contained in the local routing table. This information is included in the Introduction message.

Credentials. The following constant should be defined with the bytes of data containing the thumbprints of the trust chain covering the identity of the device: const uint8_t credentials[600]={ . . . }.

Connectivity framework APIs. To simplify the programmer's experience for the first usage of this library, the connectivity framework APIs have been divided in two groups. The first group of basic APIs lists the API that a user should implement on a first project. Those provide a basic functionality and allow the implementation of simple networks or P2P connections. The second group of APIs, defined as advanced APIs, are the APIs that are needed to implement gateways with multiple interfaces and channels or in general to manage more complex networks.

Basic APIs including setup APIs, session management APIs, and channel queue APIs.

Setup APIs include CF_LIBRARY_INIT, CF_Set_Introduction_Iface, CF_tick_increment, and CF_getorinsertnew_channel.

CF_LIBRARY_INIT initializes the library, setting up all the structures and memory. Should be called as soon as the system has been initialized and all peripherals are ready.

CF_Set_Introduction_Iface. Input Params: iface: one interface value from APP_INTERFACES enum. Sets an internal global variable that represents the next interface that will be used to send introduction messages.

CF_tick_increment. Increments the ticks. Should be called periodically and needs other global settings in order to count elapsed time in 100 mseconds units.

CF_getorinsertnew_channel. Input Params: iface: one interface value from APP_INTERFACES enum; options: pointer to a buffer of 6 bytes to store info on this channel; tcpsocket: integer to represent a socket in the TCP stack; Return Value: the channel number assigned by the connectivity framework. Inserts a new or gets an existing channel, that carries information as its interface, options or TCP socket. In case the channel already exists, its number is returned.

Session management APIs include CF_SESSION_TASK, CF_start_session_to_node, and CF_close_session_to_node.

CF_SESSION_TASK. This is the API that manages all the state machines that create and maintain all the sessions, processing all messages in the queue and creating proper responses to each connectivity framework event and provides feedback to the user through the connectivity framework callback. It should be called periodically by the application at a maximum frequency of 1 kHz. For lower frequencies, the user should consider a balance between the desired level of performance and power/processing resources consumption.

CF_start_session_to_node. Input Params: id: pointer to an 11B buffer with ID of the destination; iface: one interface value from APP_INTERFACES enum; channel: the channel on which to start a session; options: pointer to a buffer of 6 bytes to store info on this channel; and tcpsocket: integer to represent a socket in the TCP stack. This function starts a new session towards a specified ID on the specified interface and channel.

CF_close_session_to_node. Input Params: id: pointer to an 11B buffer with ID of the destination; iface: one interface value from APP_INTERFACES enum; channel: the channel on which to start a session; options: pointer to a buffer of 6 bytes to store info on this channel; and tcpsocket: integer to represent a socket in the TCP stack. This function closes an existing session towards a specified ID on the specified interface and channel.

Channel Queue APIs include CF_get_channel_of_available_outbound, CF_message_queue_insert_inbound_data, and CF_message_queue_get_outbound_data.

CF_get_channel_of_available_outbound. Input Params: iface: one interface value from APP_INTERFACES enum. Gets the channel number on which a ready-to-be-transmitted message on the specified interface is present in the queue. If no messages are ready to be transmitted on the specified interface, the function returns 0xFF.

CF_message_queue_insert_inbound_data. Input Params: iface: one interface value from APP_INTERFACES enum; Channel: the channel on which inbound data have been received; p_data: pointer to a buffer of data to be inserted in the queue; and l_data: size of data. Return value: 0 if successful, −1 if an error occurred. This is the API that should be called upon the reception of bytes on any channel. Specifying on which interface and channel they have been received, will allow the connectivity framework to set correctly the message information in the queue.

CF_message_queue_get_outbound_data. Input Params: iface: one interface value from APP_INTERFACES enum; Channel: the channel for which we want to retrieve outbound data; p_data: pointer to a buffer we want to fill with available data; and l_data: max size of data to be retrieved. Return Value: size of available data copied in the p_data buffer. This API retrieves a maximum number of bytes that are available on a channel/interface to be transmitted. The return value indicates how many bytes have been copied in the p_data buffer.

Data APIs include CF_user_code_data_message and CF_user_code_data_message_ack.

CF_user_code_data_message. Input Params: idifacechannel: pointer to 13B buffer containing ID, iface and channel; p_data: pointer to a buffer we want to send; and l_data: size of data to be sent. Return Value: 0 if successful, −1 if an error occurred. This function inserts in the queue a data message for a specified recipient. If a session with the intended recipient is not open yet, it will start a new session and send the data when the session is ready.

CF_user_code_data_message_ack. Input Params: idifacechannel: pointer to 13B buffer containing ID, iface, and channel; p_data: pointer to a buffer of data to send; l_data: size of data to be sent. Return Value: 0 if successful, −1 if an error occurred. This function inserts in the queue a data message for a specified recipient, containing the request for an acknowledgement message to be returned upon reception from the destination. If a session with the intended recipient is not open yet, it will start a new session and send the data when the session is ready.

Advanced APIs include CF_Set_Device_Type, CF_get_channel_tcp, CF_get_tcp_of_channel, CF_get_channel_options, CF_get_channel_cts, CF_set_channel_cts, CF_send_subscription_message_on_session, CF_send_subscription_message_for_gateways_in_RT, and CF_send_enrollment_to_gateway.

CF_Set_Device_Type. Input Params: devicetype: one interface value from APP_INTERFACES enum. Changes the device type. Useful for example when the system at some point connect to a connectivity framework Cloud, becoming a GATEWAY WAN device. This should be communicated to the rest of the network. Setting the device type allows the connectivity framework to include the information on the routing table.

CF_get_channel_tcp. Input Params: tcpsocket: the tcp socket associated with the channel. Return Value: channel. Retrieves the channel associated with the tcp socket specified.

CF_get_tcp_of_channel. Input Params: channel: the channel associated with the tcp socket. Return Value: tcp socket reference. Retrieves the tcp socket associated with the channel specified.

CF_get_channel_options. Input Params: iface: one interface value from APP_INTERFACES enum; channel: the channel for which we want to retrieve options; options: pointer to a buffer to fill with options data. Return Value: size of available data copied in the p_data buffer. This function is used to retrieve the six (6) bytes of buffer called "options" that the user can store together with other channel information in the connectivity framework. The user is free to store here any data, e.g., information about the address or port of the physical channel.

CF_get_channel_cts. Input Params: channel: the channel to get the clear-to-send value from. Return Value: clear-to-send value. This function returns a byte of data indicating the status of the clear-to-send, previously set by CF_set_channel_cts.

CF_set_channel_cts. Input Params: channel: the channel to set the clear-to-send value to; value: a value indicating the status of the clear-to-send to set. This function set the status of the clear-to-send value of the specified channel.

CF_send_subscription_message_on_session. Input Params id: pointer to an 11B buffer with ID of the destination; iface: one interface value from APP_INTERFACES enum; channel: the channel on which to send the subscription message; subscriptionid: pointer to a 9B buffer containing the SN to subscribe to. Return Value: 0 if successful, −1 if an error occurred. This function is used only by a GATEWAYW device type that needs to subscribe its corresponding MQTT client on the Cloud to an additional SN.

CF_send_subscription_message_for_gateways_in_RT. Input Params: id: pointer to an 11B buffer with ID of the Cloud server; iface: one interface value from APP_INTERFACES enum; channel: the channel on which we have the server session opened. Return Value: 0 if successful, −1 if an error occurred. This function is used only by a GATEWAYW device type that needs to subscribe all gateways in its routing table to the Cloud.

CF_send_enrollment_to_gateway. Input Params: id: pointer to an 11B buffer with ID of the gateway; iface: one interface value from APP_INTERFACES enum; channel: the channel on which we have the gateway session opened. Return Value: 0 if successful, −1 if an error occurred. This function can be called by any device type that would like to enroll in a gateway. Upon a successful acceptance of the request sent, the gateway will respond with its routing table.

As described previously, the connectivity framework provides a messaging system that allows for address distribution, network formation, routing, clusters, mesh networking, and cloud connectivity, and more.

Figure 23A:
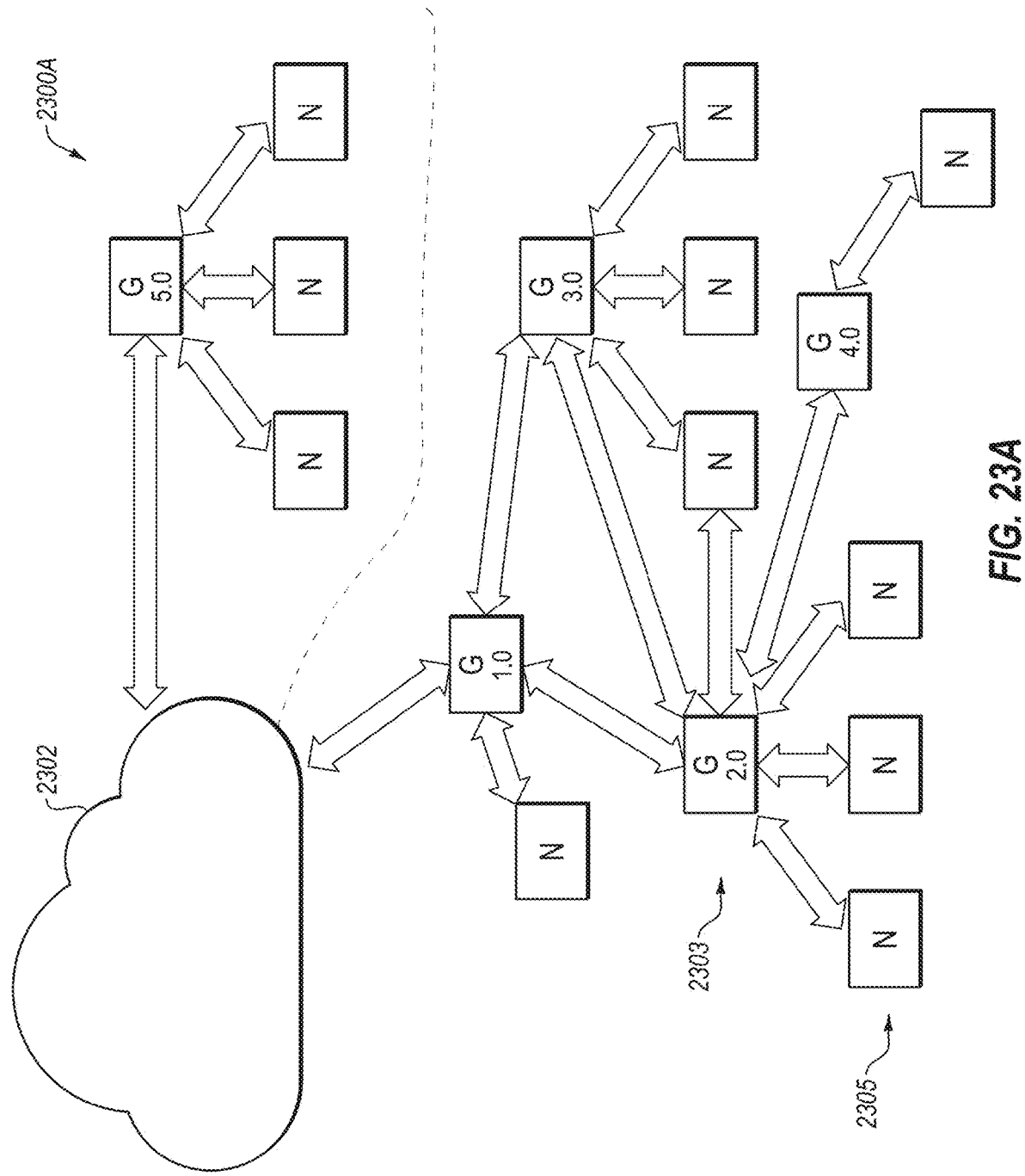
FIG. 23A is a network diagram depicting an example mesh network that may be formed with gateway nodes and end nodes, according to one or more examples.

FIG. 23A is a network diagram depicting an example mesh network 2300A that may be formed with gateway nodes 2303 and end nodes 2305, according to one or more examples. Gateway nodes 2303 include a gateway node 1.0, a gateway node 2.0, a gateway node 3.0, a gateway node 4.0, and a gateway node 5.0. In one or more examples, some gateway nodes 2303 (e.g., gateway node 1.0) may connect to one or more remote gateway nodes (e.g., gateway node 5.0) via a cloud service provider 2302.

Figure 23B:
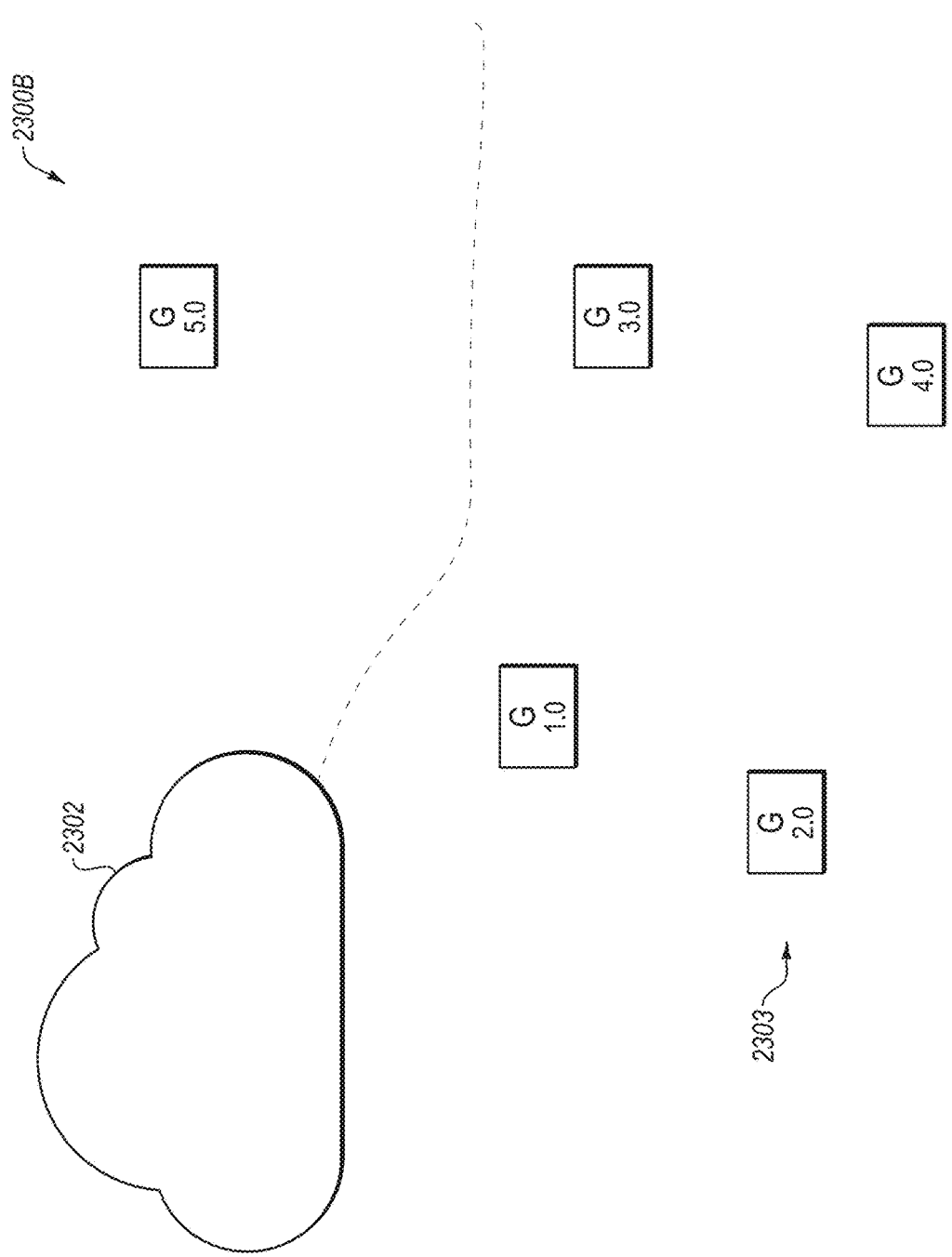
FIGS. 23B, 23C, and 23D are respective network diagrams depicting establishment of the mesh network of FIG. 23A, according to one or more examples.
Figure 23C:
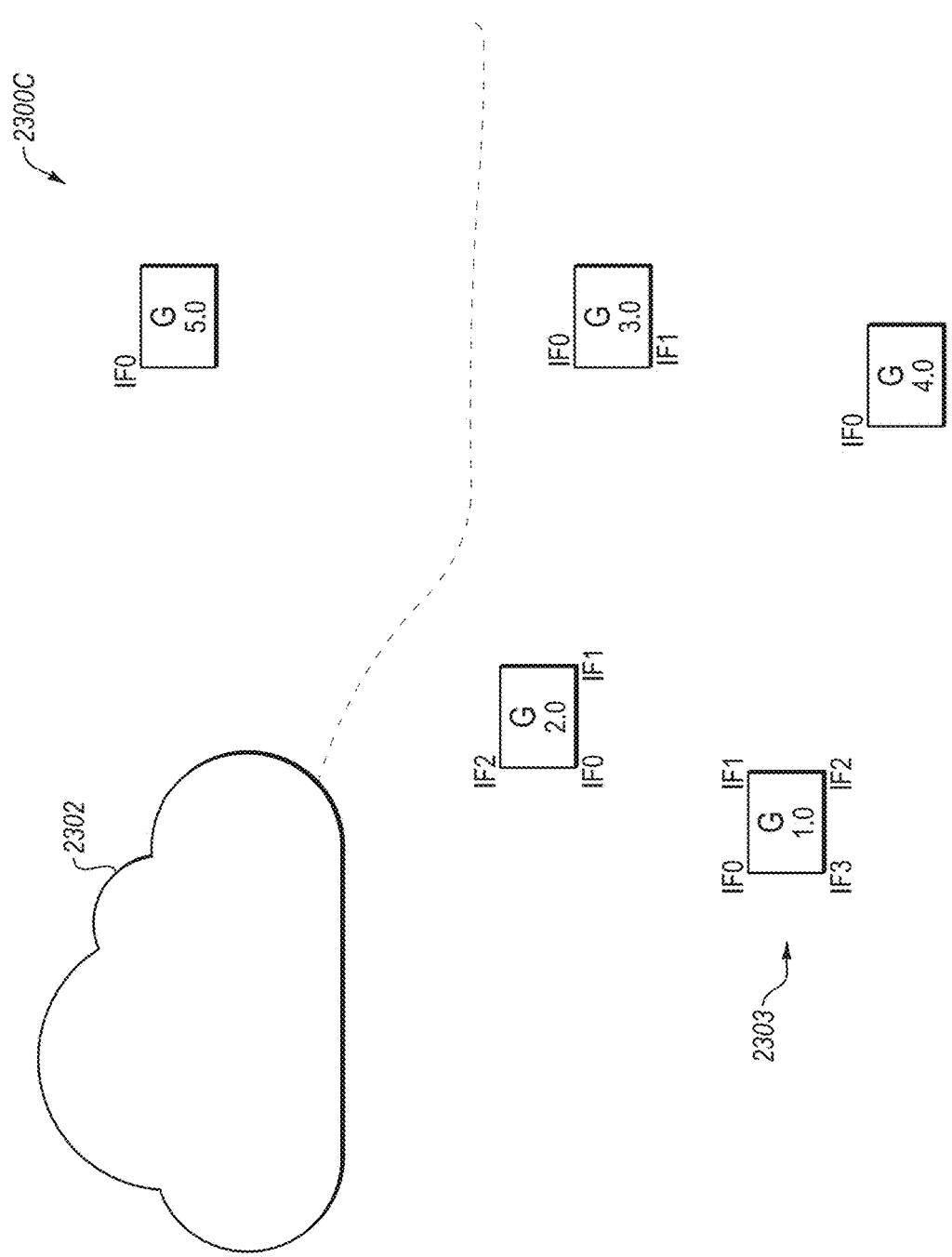
Figure 23D:
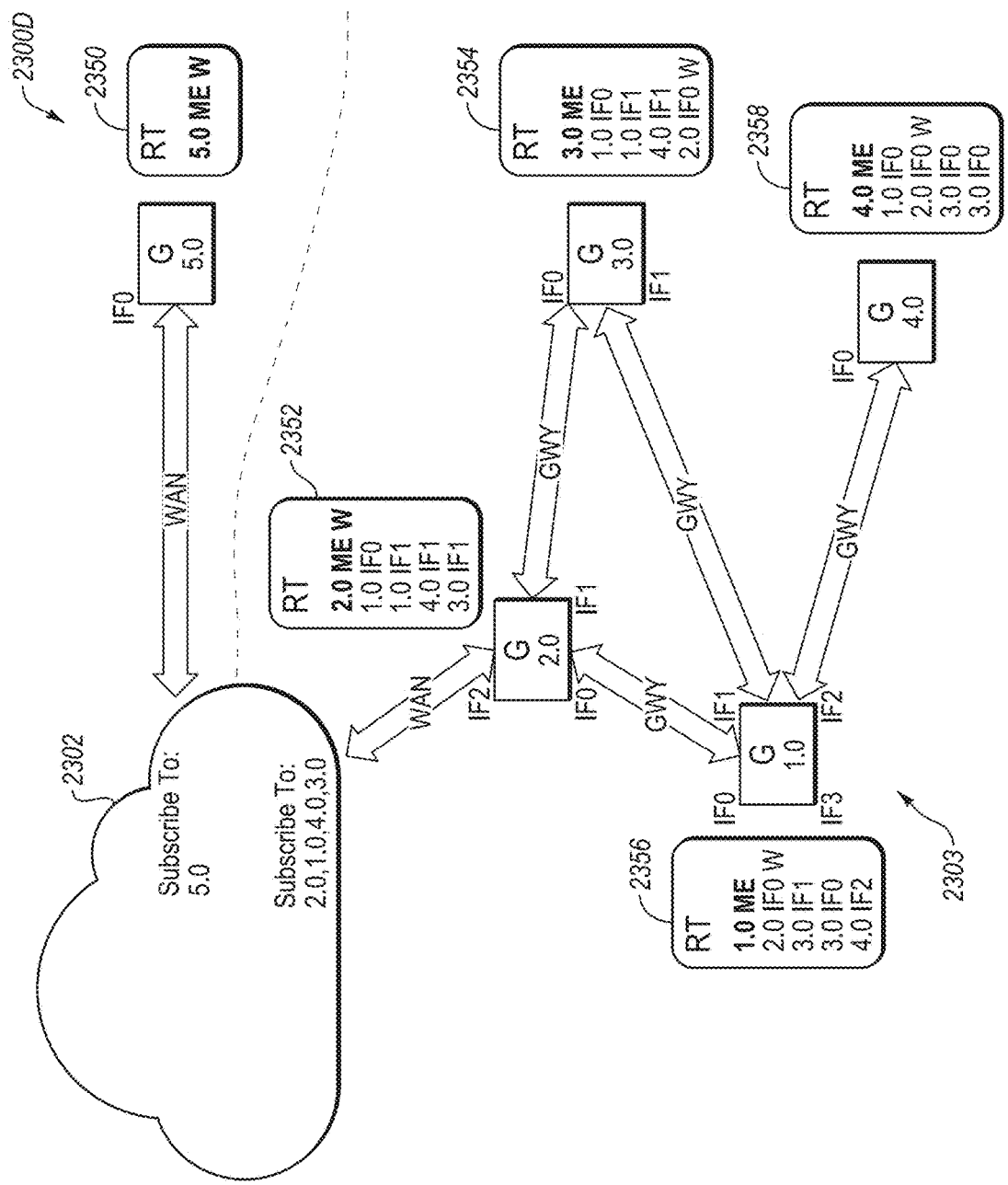

FIGS. 23B, 23C, and 23D are respective network diagrams depicting establishment of mesh network 2300A of FIG. 23A, according to one or more examples. The establishment of mesh network 2300A of FIG. 23A is depicted in sequence from FIGS. 23B to 23D. In a partial network 2300B of FIG. 23B, network formation begins with gateway nodes 1.0, 2.0, 3.0, and 4.0, and gateway node 5.0 which is remote from the others. In a partial network 2300C of FIG. 23C, each one gateway nodes 1.0, 2.0, 3.0, 4.0, and 5.0 is depicted to include its ID and its interfaces. In FIG. 23C, gateway node 1.0 includes interfaces IF0, IF1, IF2, and IF3; gateway node 2.0 includes interfaces IF0, IF1, and IF2; gateway node 3.0 includes interfaces IF0 and IF1; gateway node 4.0 includes an interface IF0; and gateway node 5.0 includes an interface IF0.

In a mesh network 2300D of FIG. 23D, the mesh network is substantially formed. In FIG. 23E, a table 2300E is provided which indicates actions associated with formation of mesh network 2300D. With reference to FIG. 23D, GWY channels are established between gateway nodes. For example, a GWY channel is established between gateway node 1.0 and gateway node 2.0; between gateway node 1.0 and gateway node 3.0; between gateway node 1.0 and gateway node 4.0; and between gateway node 2.0 and gateway node 3.0. A WAN channel is established between gateway node 2.0 and cloud service provider 2302; and between gateway node 5.0 and cloud service provider 2302.

Also, in FIG. 23D, gateway node 1.0 includes a routing table 2356 having entries including 1.0 associated with ME; 2.0 associated with IF0 W (i.e., the WAN connection); 3.0 associated with IF1; 3.0 associated with IF0; and 4.0 associated with IF2. Gateway node 2.0 includes a routing table 2352 having entries including 2.0 associated with ME; 1.0 associated with IF0; 1.0 associated with IF1; 4.0 associated with IF0; and 3.0 associated with IF1. Gateway node 3.0 includes a routing table 2354 having entries including 3.0 associated with ME; 1.0 associated with IF0; 1.0 associated with IF1; 4.0 associated with IF1; and 2.0 associated with IF0 W (i.e., the WAN connection). Gateway node 4.0 includes a routing table 2358 having entries including 4.0 associated with ME; 1.0 associated with IF0; 2.0 associated with IF0 W (i.e., the WAN connection); 3.0 associated with IF0; and 3.0 associated with IF0. Gateway 5.0 includes a routing table 2350 having entries including 5.0 associated with ME; and 5.1 associated with IF1.

In one or more examples, cloud service provider 2302 is a connectivity framework-enabled cloud or cloud service. Here, network messaging may leverage a publish-subscribe protocol associated with cloud service provider 2302 according to Message Queuing Telemetry Transport (MQTT). Here, node identifiers or addresses of messages may be presented as topics (or topic names) to publish. In one or more examples, the messages published are for receipt by a subscriber (e.g., a gateway node) that subscribes to associated identifiers or addresses of its connected end nodes. In one or more examples, the architectures and techniques shown and described later in relation to FIGS. 24, 25, 26, 27, 29A-29B, 30, 31, 32, and 33 may be utilized.

In FIG. 23D, gateway node 5.0 causes a subscription to "5.0" to be made to cloud service provider 2302, to receive (e.g., remotely communicated) messages via cloud service provider 2302. In addition, gateway node 2.0 causes a subscription to "2.0," "1.0," "4.0," and "3.0" to be made cloud service provider 2302, to receive (e.g., remotely communicated) messages via cloud service provider 2302.

Figure 23F:
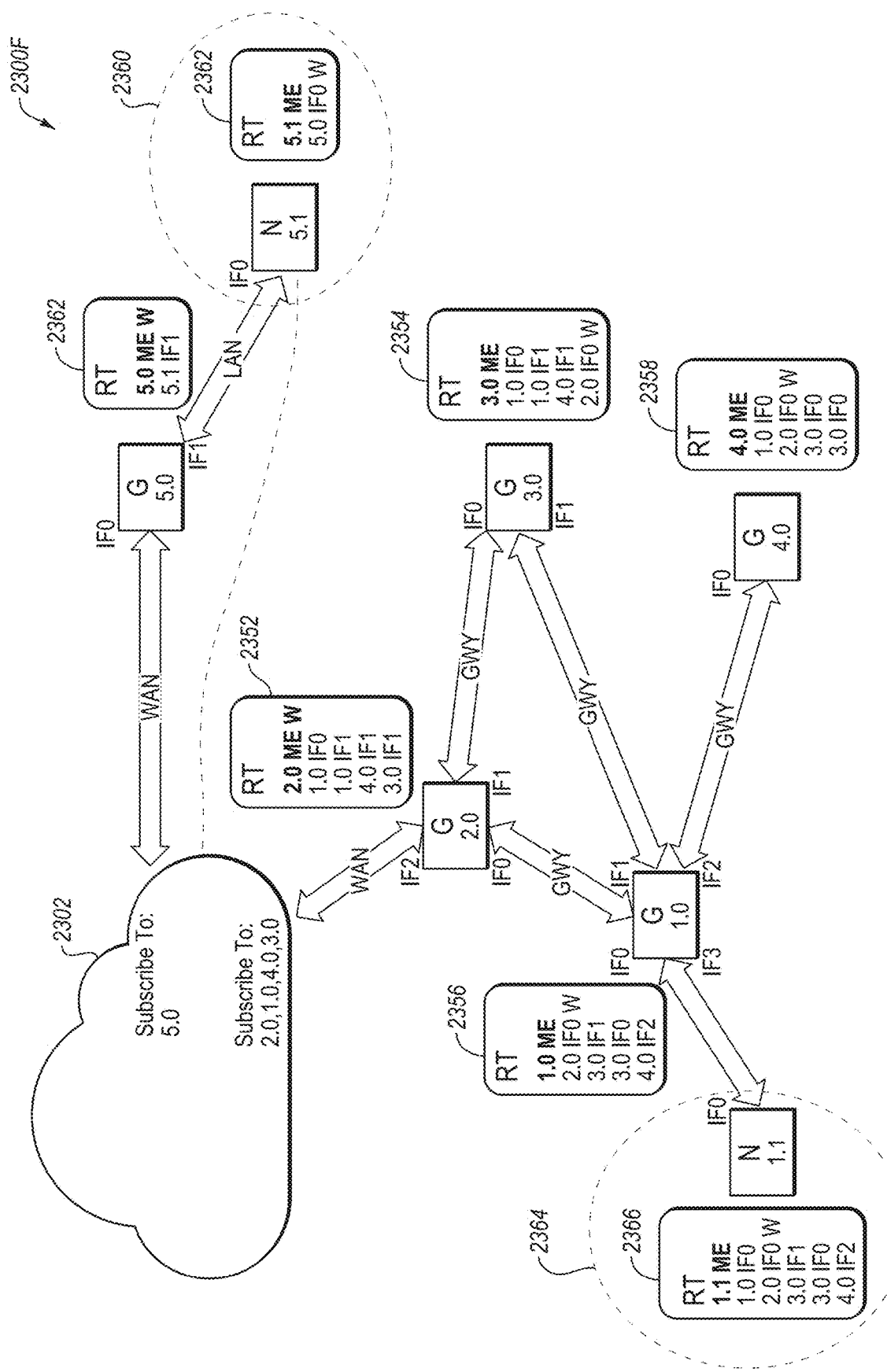
FIG. 23F is a network diagram of a mesh network depicting two end nodes joining the mesh network, according to one or more examples.

FIG. 23F is a network diagram of a mesh network 2300F depicting, at two location areas 2364 and 2360, two end nodes 1.1 and 5.1 joining to the mesh network, according to one or more examples. Here, a LAN channel is established between gateway node 1.0 and an end node 1.1; and between gateway node 5.0 and end node 5.1. End node 1.2 includes a routing table 2366 having entries including 1.1 associated with ME; 1.0 associated with IF0; 2.0 associated with IF0 W (i.e., the WAN connection); 3.0 associated with IF1; 3.0 associated with IF0; and 4.0 associated with IF2. End node 5.1 includes a routing table 2362 having entries including 5.1 associated with ME; and 5.0 associated with IF0 W (i.e., the WAN connection).

A message flow of a message during the example joining to the mesh network 2300F includes the following. End node 5.1 sends a message M including a destination ID corresponding to end node 1.1. The message M reaches gateway node 5.0 at IF1 via end node 5.1 at IF0. Gateway node 5.0 has a WAN channel so it will route the message M through IF0. Gateway node 5.0, using the WAN channel to a Message Queuing Telemetry Transport (MQTT) client of cloud service provider 2302, will publish the message M on topic 1.0. Gateway node 2.0 with the WAN connection will receive the message through IF2. Gateway node 2.0 has two (2) routes for messages directed to gateway node 1.0; it will select the first route (if connection "sanity" is properly managed, both routes are valid; conventionally, however, the first route will be selected). Gateway node 2.0 routes the message M through IF0. Gateway node 1.0 routes the message M through IF3. The message M reaches end node 1.1. When end node 1.1 sends a message back to end node 5.1, it knows that, for gateways not listed in the routing table, those need to pass on an available WAN. In this case, its gateway node 2.0 associated with IF0 W (the WAN channel). Thus, it will send the message through that interface that will reach gateway node 1.0 at IF3. In the same way, the message will make its journey up to the WAN, then be published on topic 5.0, then reaching gateway node 5.0 at IF0, and then reaching end node 5.1.

Figure 24:
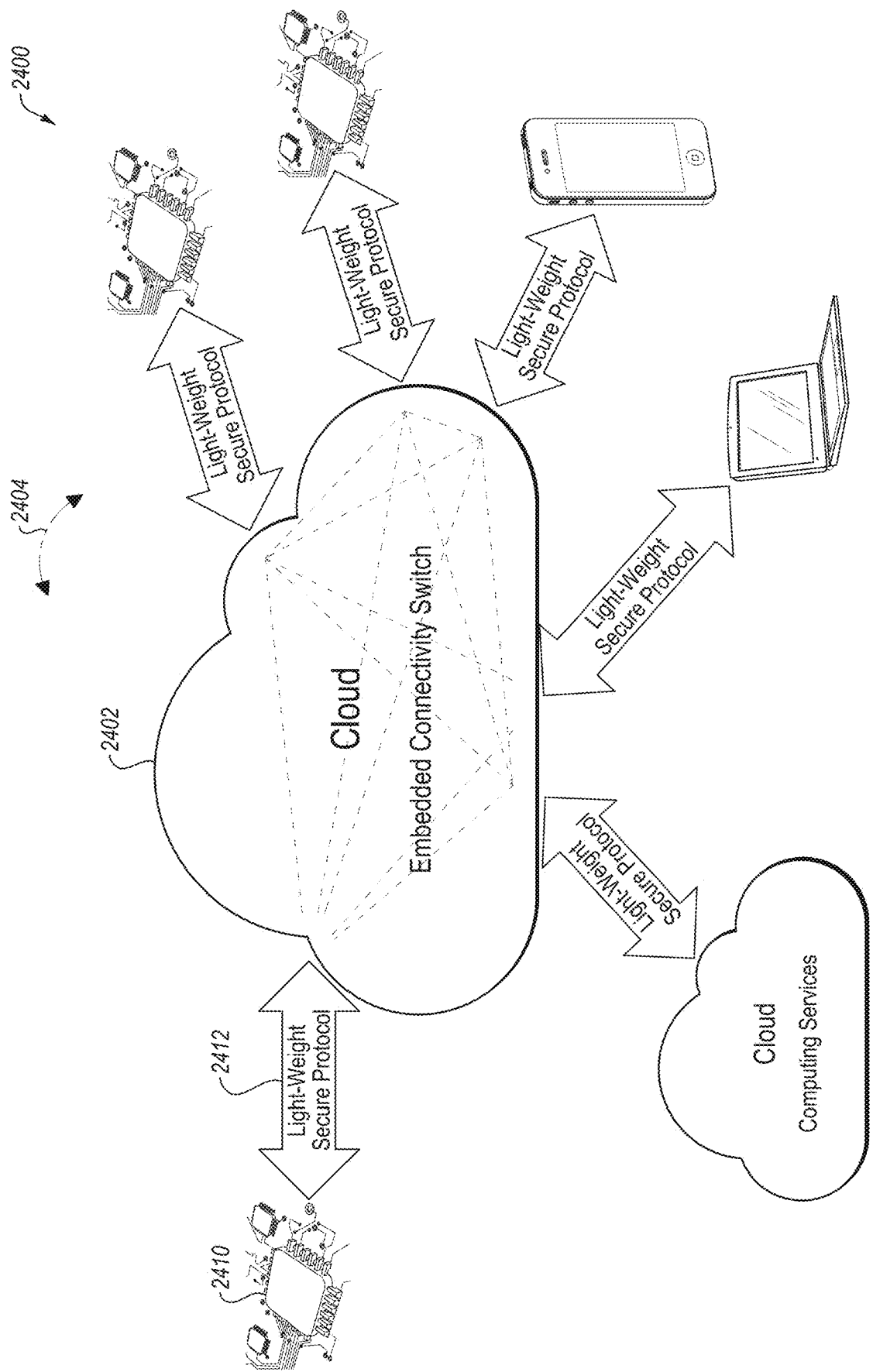
FIG. 24 is an illustrative representation of a cloud networking architecture including a connectivity framework-enabled cloud adapted to provide connectivity for multiple computing devices, according to one or more examples.

FIG. 24 is an illustrative representation of a cloud networking architecture 2400 including a connectivity framework-enabled cloud 2402 (or cloud computing service) adapted to provide connectivity for multiple computing devices 2404, according to one or more examples. Computing devices 2404 may be or include some of the same devices described in relation to FIG. 3. With use of a connectivity framework, respective computing devices 2404 (e.g., a computing device 2410) may communicate messages to other computing devices using a common messaging protocol, which may be a lightweight, secure networking protocol 2412. In one or more examples, such messaging is facilitated amongst computing devices 2404 via connectivity framework-enabled cloud 2402. In one or more examples, one or more gateway nodes may connect computing devices 2404 to connectivity framework-enabled cloud 2402 for connectivity.

Thus, connectivity framework messages may be communicated between computing devices via one or more networks utilizing the cloud. In one or more examples, connectivity framework messages may be communicated between computing devices via one or more networks, via the cloud, utilizing a standard messaging protocol, such as an MQTT. In one or more examples, connectivity framework messages are communicated using a message format that is compact and contains a header relatively easy to analyze by an application (e.g., an application running on the cloud, without limitation). In one or more examples, an application in the cloud may extract a destination identifier of a message and use it as the topic name to publish the message at a messaging protocol broker (e.g., a standard MQTT broker).

Thus, in one or more examples, connectivity framework messaging utilizes network addresses as topics in MQTT. A front end of the connectivity framework-enabled cloud operates to extract the destination ID and use it as a topic, transforming de-facto the MQTT protocol into a transport protocol instead of an application protocol. With this approach, the connectivity framework remains agnostic and highly portable. In one or more examples, another different Internet protocol or mechanism may be used to serve the same purpose, to provide yet another way to transport connectivity framework packets.

Accordingly, in one or more examples, the connectivity framework messaging utilizes the standard messaging protocol (e.g., MQTT, without limitation) at the transport layer instead of its ordinary use at the application layer. While MQTT is used commonly to dispatch application data, in the connectivity framework MQTT may be utilized to dispatch packets of the stack at the transport layer and not the application layer. Here, MQTT may be considered to operate as a "stack-packets dispatcher" for connectivity framework messaging.

In one or more examples, the network architecture and operation allow routing of the same message through the cloud to reach most any remote node. In one or more examples, the network architecture and operation allow each node to avoid implementing the messaging protocol (e.g., the MQTT protocol, without limitation) itself on board, thereby reducing the memory required for the application. In one or more examples, the network architecture and operation provide the ability for the customer to run the cloud application from any service provider, even on a private cloud or an on-premises server.

Figure 25:
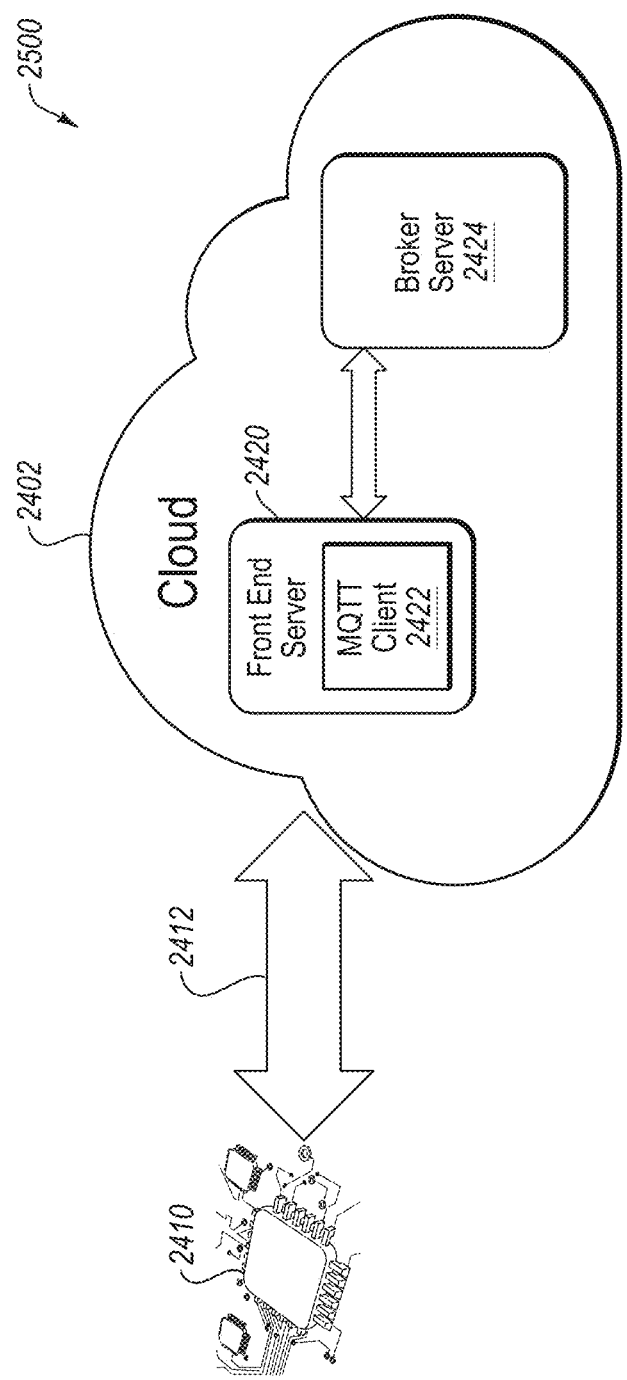
FIG. 25 is an illustrative representation of a basic cloud architecture of the connectivity framework-enabled cloud of FIG. 24, according to one or more examples.

FIG. 25 is an illustrative representation of a cloud architecture 2500 of connectivity framework-enabled cloud 2402 of FIG. 24, according to one or more examples. In FIG. 25, connectivity framework-enabled cloud 2402 is shown to include a front-end server 2420 and a broker server 2424 of the cloud, in one or more examples. Front-end server 2420 of connectivity framework-enabled cloud 2402 may include a client for a standard messaging protocol, such as an MQTT protocol, referred to as an MQTT client 2422. MQTT client 2422 may interface with broker server 2424 of connectivity framework-enabled cloud 2402. In one or more examples, front-end server 2420 may be referred to as a connectivity framework cloud front-end.

In one or more examples, a gateway node is able to open a WAN channel towards connectivity framework-enabled cloud 2402 on behalf of end nodes, such as computing device 2410. In one or more examples, a WAN channel may be a TCP socket connecting to front-end server 2420 of connectivity framework-enabled cloud 2402. In one or more examples, the purpose of the WAN channel is to route all of the messages directed to an ID that belongs to a cluster but does not appear in the routing table of the gateway node. In one or more examples, front-end server 2420 is an application (e.g., a relatively small application) in the cloud that accepts authenticated connections and opens messaging protocol broker client subscriptions (e.g., MQTT client subscriptions) to specific topics or topic names. Topics are the IDs of the gateway nodes that are reachable through the gateway that opens the channel. Front-end server 2420 is able to route all messages published on the subscribed topics to the gateway node, and vice versa, to publish the messages coming from the gateway on the topics equal to the destination IDs.

In one or more examples, when a node (e.g., a gateway node) has a TCP/IP connection to reach out to a connectivity framework cloud instance (see, e.g., FIG. 33), it will start a new secure session establishment with the cloud. The front-end in the cloud is adapted to process and respond to connectivity framework messages, so it will receive and respond until the establishment of a secure channel. Once this is achieved, the front-end will automatically create an MQTT client and subscribe to the broker on the topic with the node's ID (e.g., the first 9 bytes of its ID). The front-end is open to every node and to responding as a TCP socket server to any inquiry, but it will keep open the socket connection only if a secure session is established correctly; otherwise, it drops the connection. For example, consider that within three (3) seconds after a socket connection has been opened, a node is capable of being authenticated and establishing a secure session. At that point, the front-end keeps the channel (socket) opened and creates an MQTT client to subscribe with the node ID. Thereafter, the front-end expects to receive over this channel valid connectivity framework messages (e.g., a specific header and payload format). The front-end will pass through almost any message. The message encapsulated in the higher protocol (e.g., the MQTT Publish Message) will be posted and end up on the subscriber end, where it will be decapsulated and return to its connectivity framework message format (e.g., unmodified through its journey). Only the connectivity framework message with a subscriber type will be intercepted by the front-end that, once authenticated, will process it to thereby create another MQTT client that will subscribe to a specific topic contained in the message. Usually, those messages come from another gateway in the same network as the one attached to the cloud, that needs to be specified on the cloud as destination reachable on that very same socket.

Figure 26:
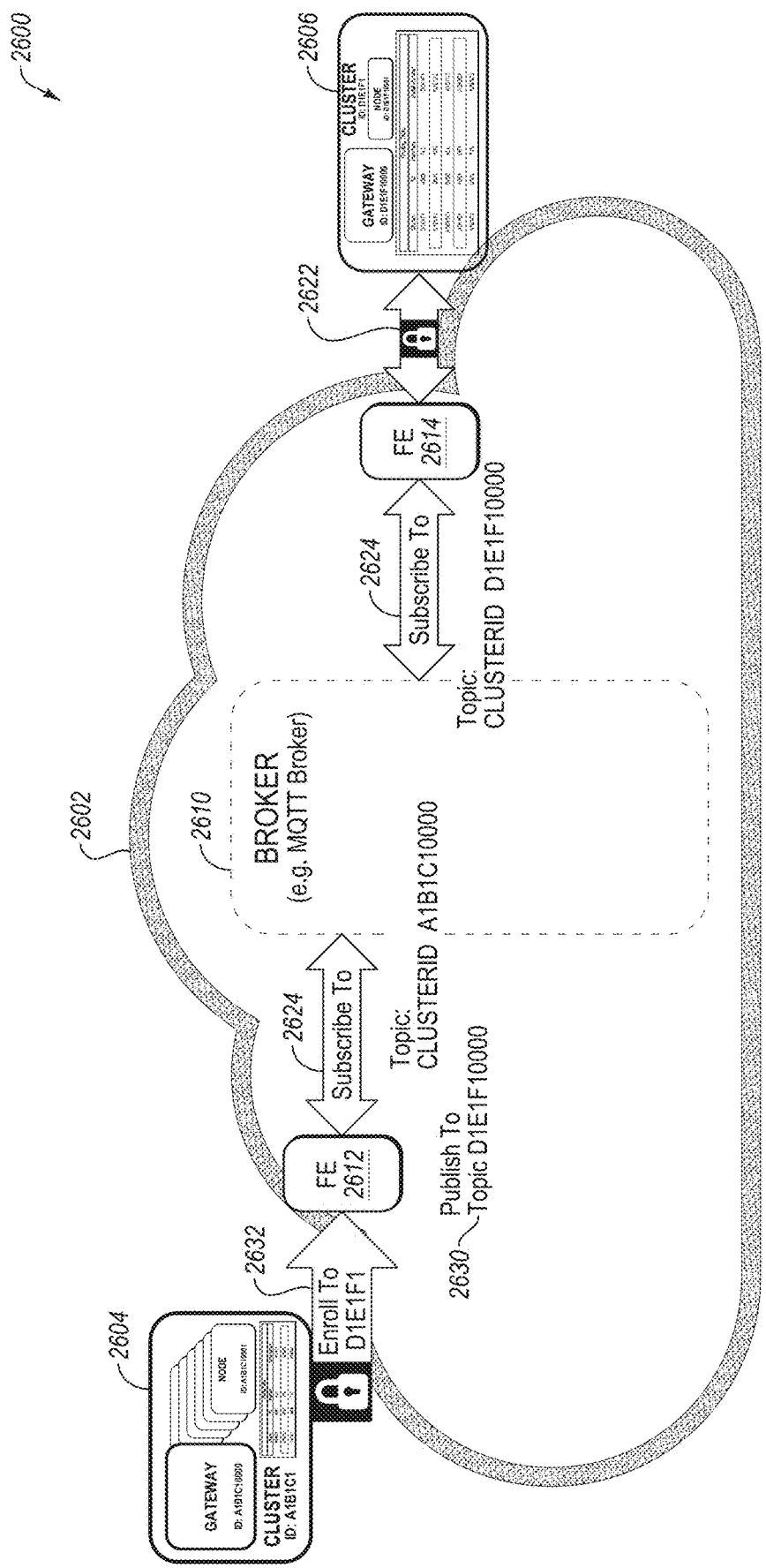
FIG. 26 is an illustrative representation of a cloud architecture for connecting two clusters associated with two gateway nodes, respectively, to a connectivity framework-enabled cloud, according to one or more examples.
Figure 27:
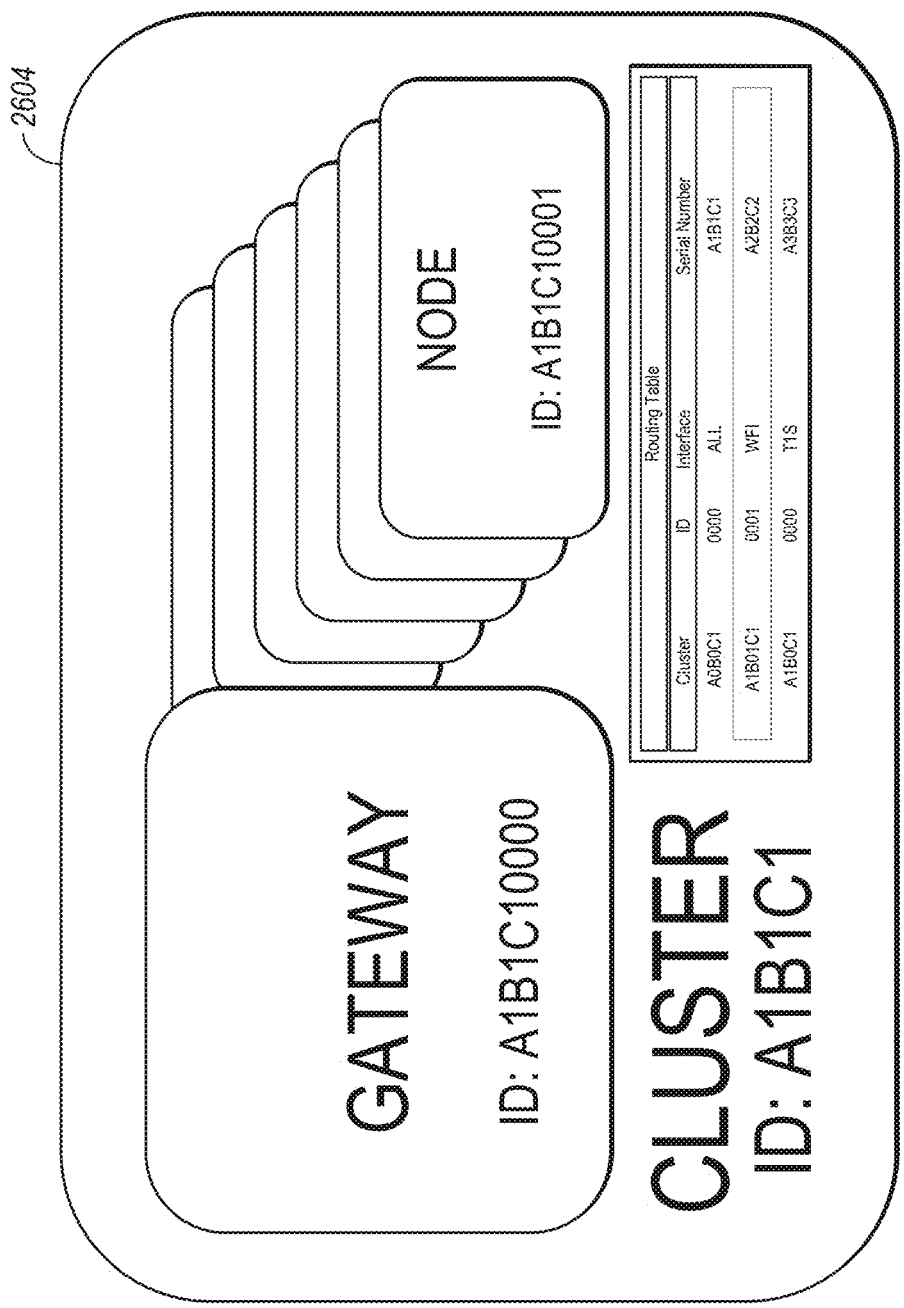
FIG. 27 depicts information associated with a first gateway node of FIG. 26, according to one or more examples.
Figure 28:
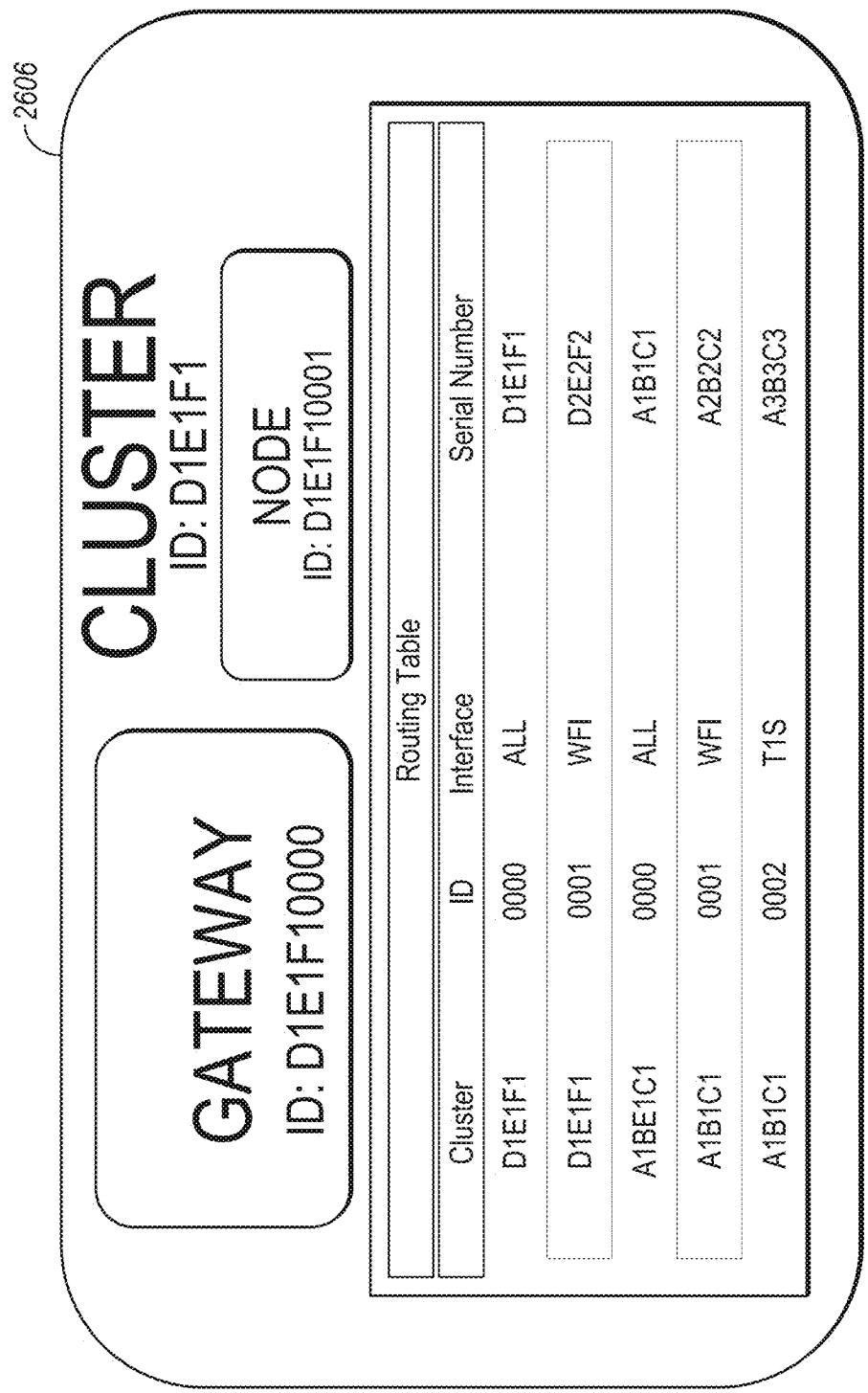
FIG. 28 depicts information associated with a second gateway node of FIG. 26, according to one or more examples.

FIG. 26 is an illustrative representation of a cloud architecture 2600 for connecting two clusters associated with two gateway nodes, respectively, to a connectivity framework-enabled cloud 2602 (or cloud computing service) according to one or more examples. The two gateway nodes depicted in cloud architecture 2600 of FIG. 26 include a gateway node 2604 and a gateway node 2606. In FIG. 27, information associated with gateway node 2604 is provided. The information of FIG. 27 includes routing table information which is the same as that shown and described earlier in relation to FIG. 19C. In brief, the cluster ID associated with gateway node 2604 is "A1B1C1" and the ID of the gateway is "A1B1C10000." In FIG. 28, information associated with gateway node 2606 is provided. In brief, the cluster ID associated with gateway node 2606 is "D1E1F1" and the ID of the gateway is "D1E1F10000."

With reference back to FIG. 26, connectivity framework-enabled cloud 2602 is to provide communication between devices via a messaging protocol broker of the cloud, according to one or more examples. Connectivity framework-enabled cloud 2602 of FIG. 26 includes a front-end server 2612 to communicate with a broker server 2610 (or MQTT broker) for processing. Front-end server 2612, which may include an MQTT client (e.g., MQTT client 2422 of FIG. 25), may be for use with gateway node 2604. Connectivity framework-enabled cloud 2602 also includes a front-end server 2614 to communicate with broker server 2610 for processing. Front-end server 2614, which may also include an MQTT client (e.g., MQTT client 2622 of FIG. 25), may be for use with gateway node 2606. In one or more examples, front-end server 2614 may communicate with the same broker server as front-end server 2612 (i.e., broker server 2610) or a different broker server.

In FIG. 26, in an operation 2632, gateway node 2604 associated with the cluster ID of "A1B1C1" may send an enrollment message to front-end server 2612. For example, the enrollment message may indicate to enroll to "D1E1F1" associated with gateway node 2606. Front-end server 2612 may perform operations to enroll gateway node 2604. In an operation 2624, front-end server 2612 may prepare and send a subscribe message to broker server 2610 in response. The subscribe message indicates to subscribe to a topic that matches the cluster ID, "A1B1C1," or "A1B1C10000" associated with gateway node 2604. In this way, gateway node 2604 will receive messages that are published to the topic that matches the cluster ID for forwarding the messages to its connected end nodes. In one or more examples, any suitable type of message may be used to trigger the preparing and sending of the subscribe message to broker server 2610.

In an operation 2622, gateway node 2606 associated with the cluster ID of "D1E1F1" may send an enrollment message to front-end server 2614. For example, the enrollment message may indicate to enroll to "A1B1C1" associated with gateway node 2604. Front-end server 2614 may perform operations to enroll gateway node 2606. In an operation 2624, front-end server 2614 may prepare and send a subscribe message to broker server 2610 in response. The subscribe message indicates to subscribe to a topic that matches the cluster ID, "D1E1F1," or "D1E1F10000" associated with gateway node 2606. In this way, gateway node 2606 will receive messages that are published to the topic that matches the cluster ID for forwarding the messages to its connected end nodes. In one or more examples, any suitable type of message may be used to trigger the preparing and sending of the subscribe message to broker server 2610.

Subsequently, a message may be communicated from one of the end nodes connected to gateway node 2604 intended for a destination device connected to gateway node 2606. Front-end server 2612 may receive the message and, in an operation 2630, may prepare and send a publish message to broker server 2610. The publish message indicates to publish to a topic that matches the cluster ID, "D1E1F1," or "D1E1F10000" associated with gateway node 2606. In response, broker server 2610 may forward the message to gateway node 2606 (e.g., through front-end server 2614) for receipt by the destination device.

Figure 29A:
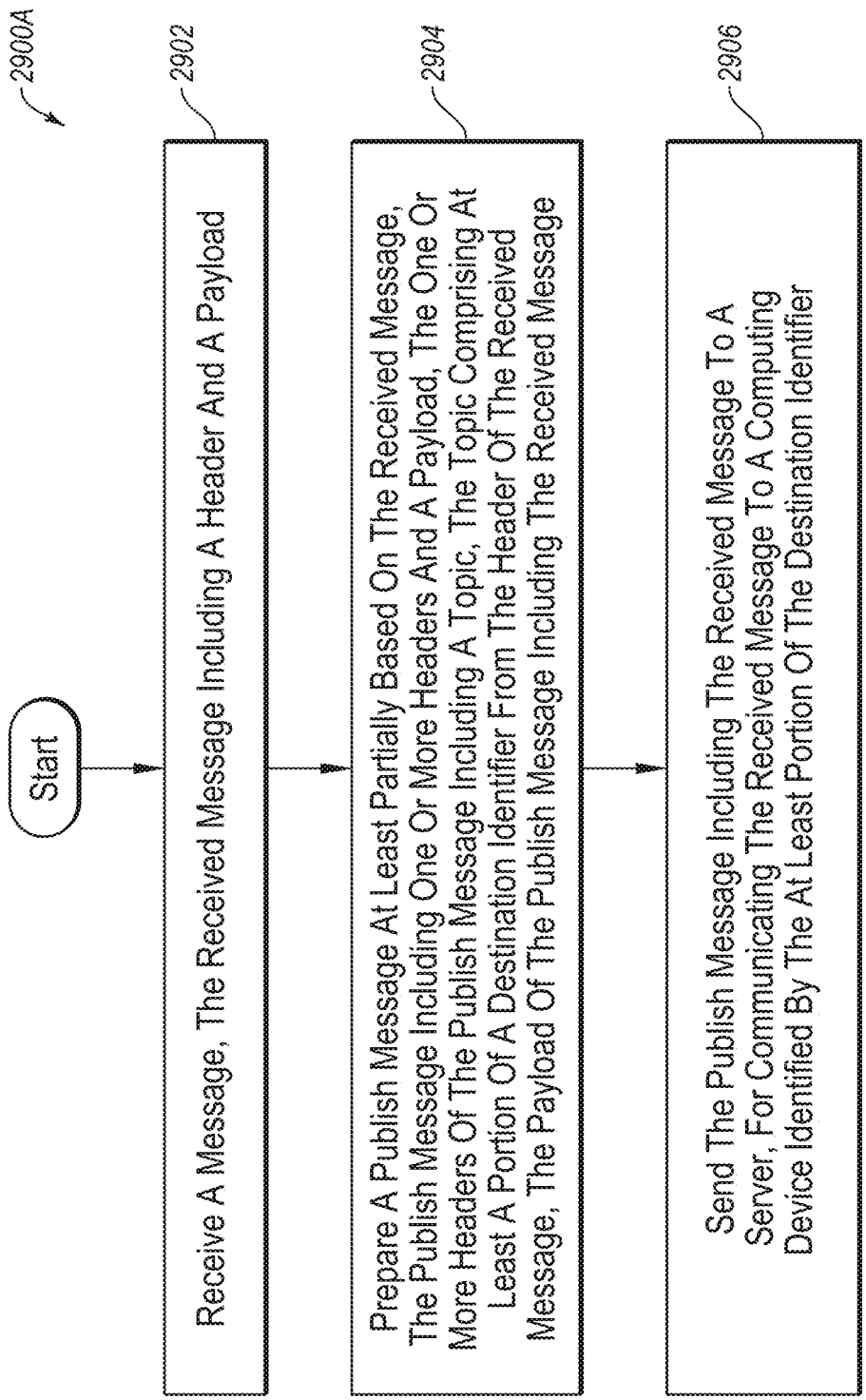
FIG. 29A is a method of processing messages for cloud-based connectivity for computing devices, according to one or more examples.

FIG. 29A is a method 2900A of processing messages for cloud-based connectivity for computing devices, according to one or more examples. In one or more examples, method 2900A may be performed at a front-end server of a cloud computing service, where the cloud computing service includes a server adapted with a publish-subscribe messaging protocol.

In method 2900A of FIG. 29A, at an act 2902, a message is received. The received message includes a header and a payload. At an act 2904, a publish message is prepared at least partially based on the received message. The publish message includes one or more headers and a payload. The one or more headers of the publish message include a topic, and the topic comprises at least a portion of a destination identifier from the header of the received message. The payload of the publish message includes the received message. In one or more examples, in the act 2904, the publish message is prepared in accordance with an MQTT message format.

At an act 2906, the publish message including the received message is sent to a server, for communicating the received message to a computing device identified by the at least portion of the destination identifier. In one or more examples, the method may be performed at a front-end server of a cloud computing service, where the cloud computing service includes the server adapted with a publish-subscribe messaging protocol. Here, the received message may be communicated to the computing device identified by the at least portion of the destination identifier responsive to a subscription to the topic comprising the at least portion of the destination identifier.

In one or more examples, preparing the publish message in the act 2902 comprises inserting a copy of the at least portion of the destination identifier into the one or more headers of the publish message as the topic. In one or more examples, preparing the publish message in the act 2902 comprises inserting a publish type indicator in the one or more headers as a packet type.

In one or more examples, the topic comprises the destination identifier and the computing device comprises an end node identified by the destination identifier. In one or more other examples, the topic comprises a portion of the destination identifier, the computing device comprises a gateway node identified by the portion of the destination identifier, and an end node connected to the gateway node is identified by the destination identifier.

Figure 29B:
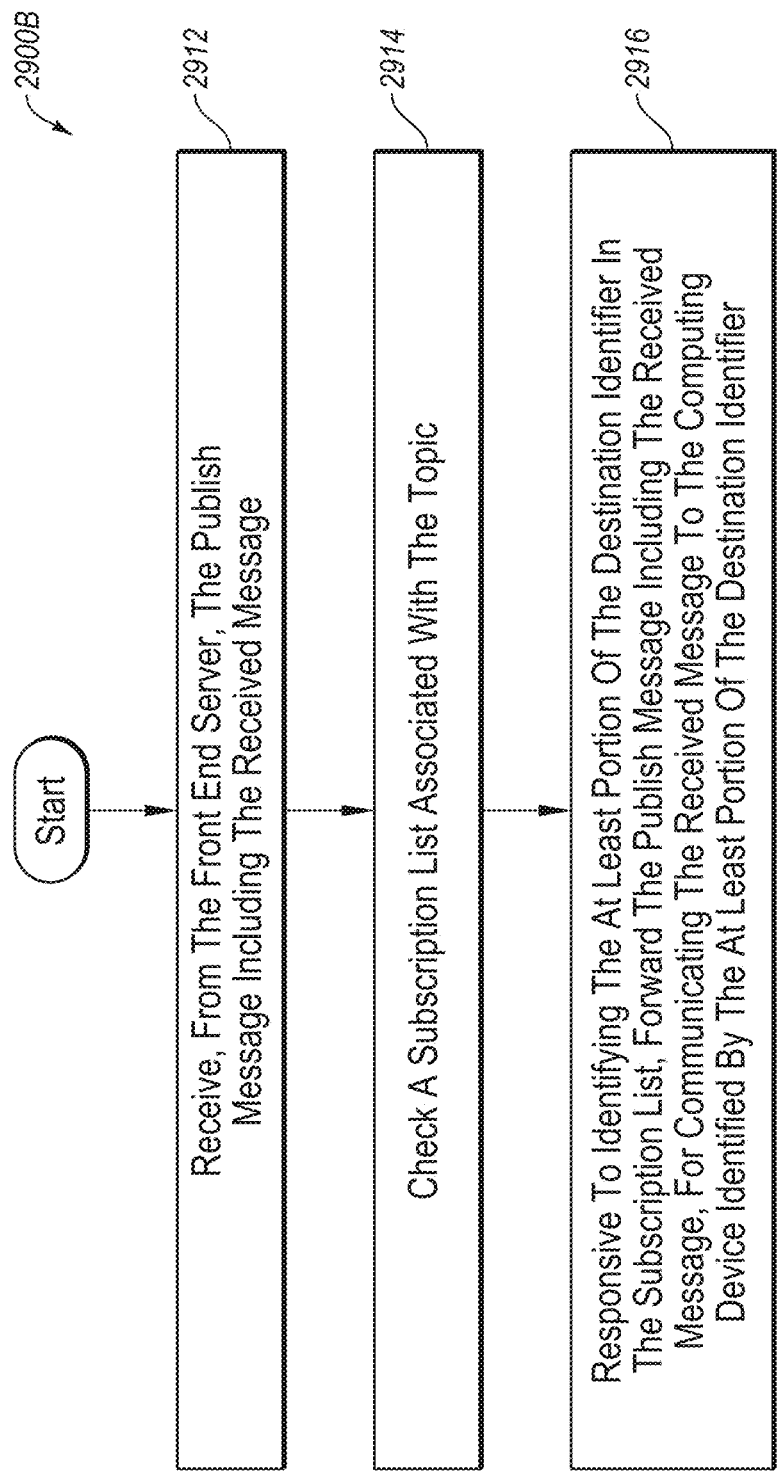
FIG. 29B is a method of processing messages for cloud-based connectivity for computing devices, according to one or more examples.

FIG. 29B is a method 2900B of processing messages for cloud-based connectivity for computing devices, according to one or more examples. In one or more examples, method 2900B may be performed at the server (e.g., a broker server) of the cloud computing service, where the server is adapted with the publish-subscribe messaging protocol. Method 2900B of FIG. 29B may continue processing of the publish message (e.g., received from the front-end server of the cloud computing service) from method 2900A of FIG. 29A.

In method 2900A of FIG. 29A, at an act 2912, the publish message is received from the front-end server. The publish message includes the received message in its payload. At an act 2914, a subscription list associated with the topic is checked. At an act 2916, responsive to identifying the at least portion of the destination identifier in the subscription list, the publish message is forwarded for communicating the received message to the computing device identified by the at least portion of the destination identifier. In one or more examples, at another front-end server of the cloud computing service, the forwarded publish message including the received message is received, so that the received message can be forwarded to the computing device identified by the at least portion of the destination identifier.

Figure 30:
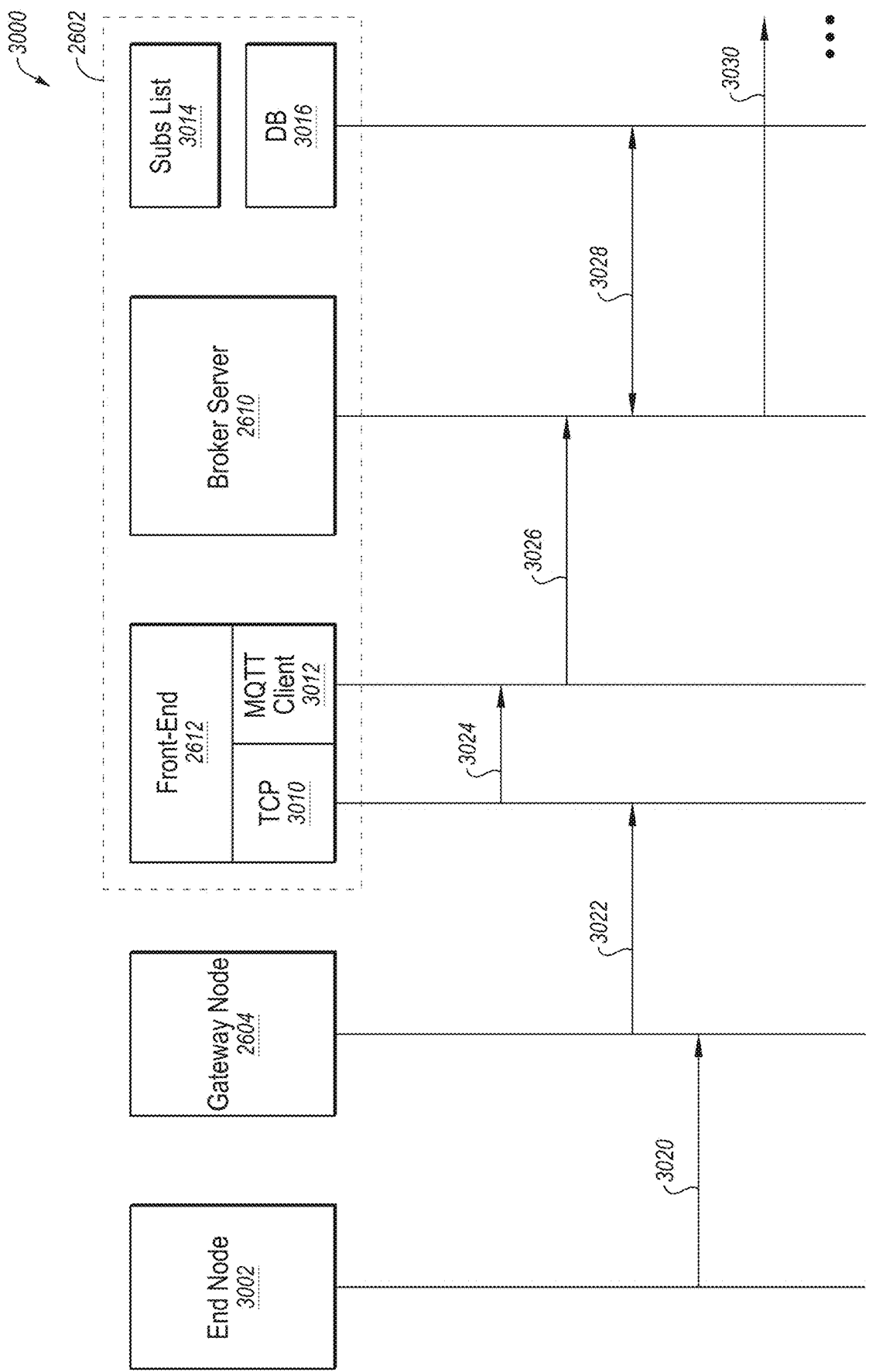
FIG. 30 is a message flow diagram of a message flow for processing messages for cloud-based connectivity for computing devices, according to one or more examples.

FIG. 30 is a message flow diagram of a message flow 3000 for processing messages for cloud-based connectivity for computing devices, according to one or more examples. In one or more examples of FIG. 30, front-end server 2612 includes a TCP component 3010 and an MQTT client 3012. In addition, connectivity framework-enabled cloud 2602 includes a database 3016 including a subscription list 3014 of subscriptions associated with multiple topics. In one or more alternative examples of FIG. 30, connectivity framework-enabled cloud 2602 may provide or offer a different type of service other than a cloud computing service.

At an act 3020 of FIG. 30, an end node 3002 sends a message to gateway node 2604 for communicating the message to a destination device identified by a destination identifier. In one or more examples, the message is formatted with a message format according to a unified messaging protocol. In one or more specific examples, the message having the message format of the unified messaging protocol may include a header and a payload according to the message formatting described in relation to FIGS. 7A, 7B, 7C, 7D, and/or 7E. With reference ahead to FIG. 31, a message format 3100 of such a message 3102 including a header 3104 and a payload 3106 is shown.

With reference back to FIG. 30, at an act 3022, gateway node 2604 forwards the message to connectivity framework-enabled cloud 2602. TCP component 3010 of front-end server 2612 receives and processes the message. At an act 3024, TCP component 3010 of front-end server 2612 forwards the message to MQTT client 3012 of front-end server 2612. MQTT client 3012 prepares a publish message at least partially based on the received message. The publish message includes one or more headers and a payload. The one or more headers of the publish message include a topic, where the topic comprises at least a portion of a destination identifier from the header of the received message. The payload of the publish message includes the received message. In one or more examples, the publish message is prepared in accordance with an MQTT message format.

With reference ahead to FIG. 32, a message format 3200 of such a publish message 3202 including a header 3204 and a payload 3206 is depicted. Publish message 3202 includes a publish type indicator 3210 ("publish flag") in header 3204 as a packet type. Payload 3206 of publish message 3202 also includes message 3102 (see also FIG. 31) that was received to be communicated to the destination device. Publish message 3202 also includes a copy 3212 of the destination identifier in header 3204 as the topic. Such may be the case, for example, when the destination device (e.g., the end node) to receive the message (i.e., message 3102) is identified by the destination identifier. In one or more other examples, publish message 3202 includes copy 3212 of (only) a portion of the destination identifier in header 3204. Such may be the case, for example, when a receiving gateway node is identified by the portion of the destination identifier, and the destination device (e.g., the end node) to receive the message (i.e., message 3102) is connected to the receiving gateway node and identified by the (full) destination identifier.

With reference back to FIG. 30, at an act 3026, MQTT client 3012 forwards the publish message (e.g., publish message 3202 of FIG. 32) to broker server 2610 of connectivity framework-enabled cloud 2602. Broker server 2610 receives the publish message from MQTT client 3012. The publish message includes the received message in its payload. At an act 3028, subscription list 3014 associated with the topic is checked. At an act 3030, responsive to identifying the at least portion of the destination identifier in the subscription list, the publish message is forwarded for communicating the received message to the computing device identified by the at least portion of the destination identifier. In one or more examples, at another front-end server of the connectivity framework-enabled cloud 2602, the forwarded publish message including the received message is received and processed, so that the received message may be forwarded to the computing device identified by the at least portion of the destination identifier.

Figure 33:
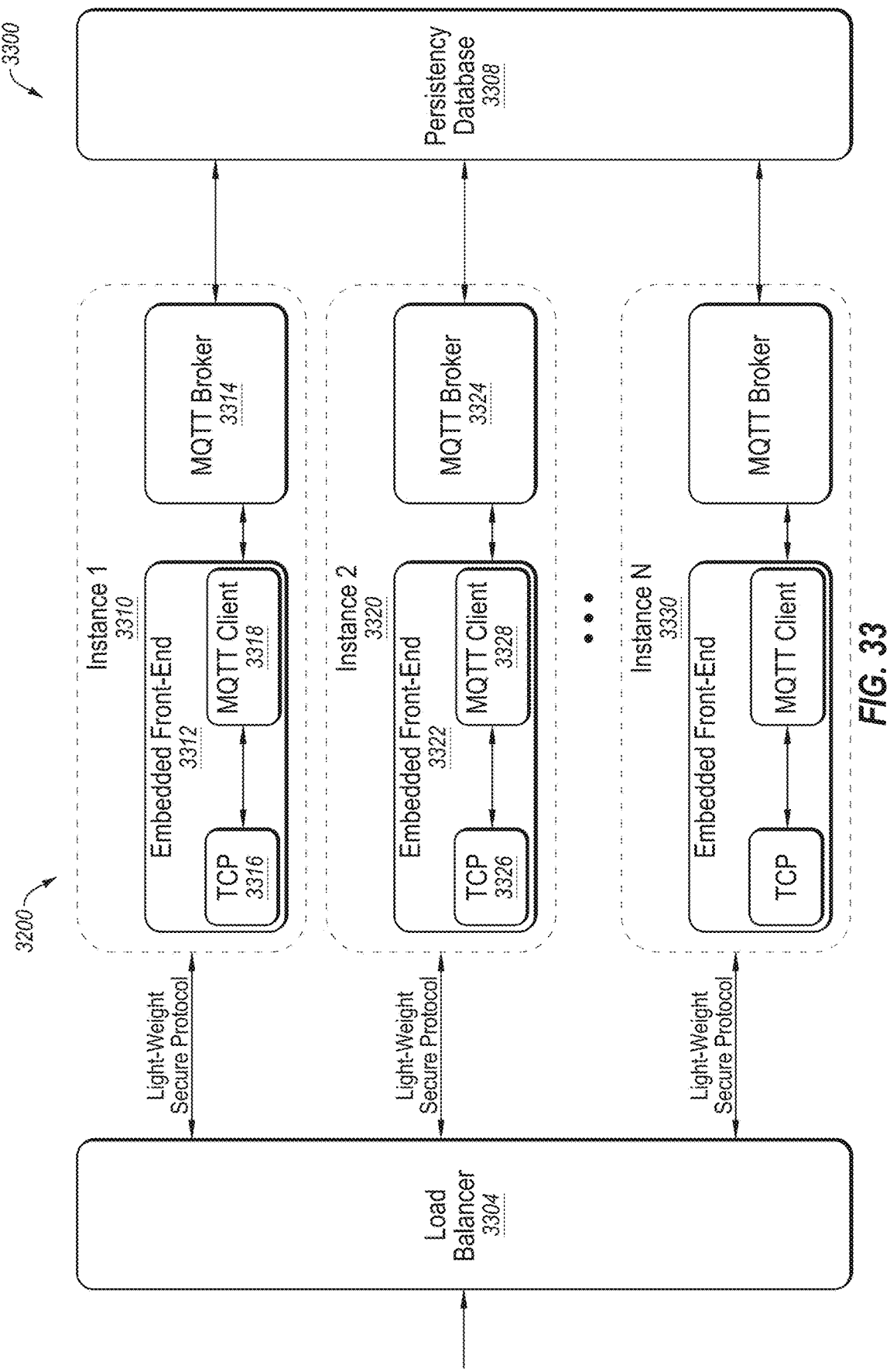
FIG. 33 is a block diagram of a cloud software architecture of a connectivity framework-enabled cloud, according to one or more examples.

FIG. 33 is a block diagram of a cloud software architecture 3300 of a connectivity framework-enabled cloud, according to one or more examples. In FIG. 33, cloud software architecture 3300 is shown to include a load balancer 3304, multiple instances 3306 of connectivity framework-enabled broker services, and a database 3308. In one or more examples, load balancer 3304 is to more evenly balance and distribute processing associated with incoming messages. In one or more examples, respective ones of multiple instances 3306 of the connectivity framework-enabled broker services may be instantiated on-demand and/or de-instantiated when unused or underused.

In one or more examples, multiple instances 3306 of connectivity framework-enabled broker services include a connectivity framework-enabled broker service 3310 ("Instance 1"), a connectivity framework-enabled broker service 3320 ("Instance 2"), and so on, to a connectivity framework-enabled broker service 3330 ("Instance N"). In FIG. 33, respective ones of the connectivity framework-enabled broker services include a front-end server and a broker server (MQTT broker), where the front-end server includes a TCP component and an MQTT client. For example, connectivity framework-enabled broker service 3310 includes a load balancer 3304 and an MQTT broker 3314, where the front-end server 3312 includes a TCP component 3316 and an MQTT client 3318; and connectivity framework-enabled broker service 3320 includes a front-end server 3322 and an MQTT broker 3324, where the front-end server 3322 includes a TCP component 3326 and an MQTT client 3328. In one or more examples, the connectivity framework-enabled broker service using a front-end server (e.g., TCP component plus MQTT client) is an add-on feature to enable the cloud to be connectivity framework enabled.

As described previously, a gateway node is able to open a channel (e.g., a WAN channel) towards the cloud on behalf of end nodes. In one or more examples, the channel may be a TCP socket connecting to a front-end server (e.g., front-end server 3312 including TCP component) of the cloud. Each connectivity framework-enabled broker service includes a front-end server, which may be associated with one or more different gateway nodes. In one or more examples, the purpose of the channel is to route all of the messages directed to an ID that belongs to a cluster but does not appear in the routing table of the gateway node. In one or more examples, front-end server 2420 is an application (e.g., a relatively small application) in the cloud that accepts (e.g., authenticated) connections and opens messaging protocol broker client subscriptions (e.g., MQTT client subscriptions) to specific topics or topic names. Again, topics are the IDs of the gateway nodes that are reachable through the gateway that opens the channel. The front-end server is able to route all messages published on the subscribed topics to the gateway node, and vice versa, to publish the messages coming from the gateway on the topics equal to the destination IDs.

Many new and useful features and resulting advantages have been described, and these will be appreciated to the extent utilized in the specific design configuration that is chosen, which will depend, as a non-limiting example, on specific operating conditions.

In one or more examples, the connectivity framework may operate with a variety of different peripheral interfaces, including UART, I2C, SPI, CAN, USB, Ethernet, T1S, Wi-Fi, Bluetooth, IEEE 802.15.4, and others.

In one or more examples, the connectivity framework provides a "stack above-all-other-stacks" (e.g., at the application layer) for high portability and minimal changes to existing structures. In addition, the connectivity framework utilizes a message queue (or pool), a mechanism to use memory on-demand to fill-in a queue common to all peripherals and technologies at the same time. Even further, the connectivity framework uniquely provides a session data structure and a message structure, together with a short command set.

In one or more examples, the connectivity framework may be relatively small in size (e.g., 30 kB, without limitation). In one or more examples, the connectivity framework is a low-cost and low-power connectivity framework (e.g., for low-end, low-throughput embedded peripherals). Smaller memory and resource requirements lower the overall cost of the hardware. In one or more examples, the development cost is also reduced by the adoption of a single stack for all peripherals, which simplifies the code and testing of the same. In one or more examples, the cost of the cloud can be reduced and kept under control due to easy migration of the system.

In one or more examples, the connectivity framework may leverage processing in the application layer, without need for modification of low-level drivers, thereby making the connectivity framework highly portable.

In one or more examples, a connectivity framework may be sized to fit on small microcontroller units (MCUs), but can also be developed in C, Java, and Javascript, and porting exists on PC, Linux Server, and Android.

In one or more examples, the connectivity framework may be integrated with its own cryptography library (e.g., an interface for a secure element or cryptography chip (e.g., ECC608) and microcontroller unit hardware accelerator).

In one or more examples, the connectivity framework may be suitable for use with Internet of Things (IoT), industrial, home and building automation, medical, aerospace and defense, automotive, and computing.

In one or more examples, a connectivity framework may be utilized in any connected system (from P2P, star, or mesh network topology, without limitation) which simplifies communications over different connectivity technologies.

In one or more examples, end-to-end encryption may allow a customer to own (completely) his/her certificate chain, authority, encryption algorithms and keys for all the connections, including the ones passing through the cloud. In one or more examples, the approach substantially guarantees complete privacy of data on the network. In one or more examples, the security protocol based on simpleMAP allows the creation of connectivity session secured according to the NIST standards with a minimal memory and resources usage.

In one or more examples, the connectivity framework may reduce or eliminate the need to be locked into a particular service provider. The protocol may be easily interfaced to a standard MQTT broker through a (e.g., small) front-end application on the cloud. Thus, there is no requirement to use a specific SDK for cloud connectivity, allowing for an easy migration from one cloud service provider to another cloud service provider, or perhaps even to a private, on-premises server.

In one or more examples of connectivity framework messaging, MQTT may be leveraged as a transport layer protocol (as compared with an application layer protocol). Also, connectivity framework messaging may utilize a front-end of a connectivity framework cloud, as a scalable application in cloud space that relieves the microcontroller unit from heavy work and large space for managing Internet protocols (e.g., using MQTT).

In one or more examples, connectivity framework messaging may include addressing and routing capabilities based on a type of MAC address extension. One may compare IDs of the connectivity framework with those of TCP/IP, as if the MAC address (e.g., in a format of "XX:XX:XX:XX:XX:XX") extended with other numbers were used as a correspondent of an IP address. Such addressing helps to simply all services for routing/DHCP/meshing/pinging/and so on, with a few well-established commands and/or services (e.g., an enrollment command, a routing table broadcast, etc.).

FIG. 34 is a block diagram of circuitry 3400 that, in some examples, may be used to implement various functions, operations, acts, processes, and/or methods disclosed herein. In one or more examples, the circuitry 3400 may be included (in part, or in whole) in a computing device described herein. The circuitry 3400 includes one or more processors 3402 (sometimes referred to herein as "processors 3402") operably coupled to one or more data storage devices (sometimes referred to herein as "storage 3404"). The storage 3404 includes machine-executable code 3408 stored thereon and the processors 3402 include a logic circuitry 3406. The machine-executable code 3408 includes information describing functional elements that may be implemented by (e.g., performed by) the logic circuitry 3406. The logic circuitry 3406 is adapted to implement (e.g., perform) the functional elements described by the machine-executable code 3408. The circuitry 3400, when executing the functional elements described by the machine-executable code 3408, should be considered as special purpose hardware for carrying out functional elements disclosed herein. In some examples, the processors 3402 may perform the functional elements described by the machine-executable code 3408 sequentially, concurrently (e.g., on one or more different hardware platforms), or in one or more parallel process streams.

When implemented by logic circuitry 3406 of the processors 3402, the machine-executable code 3408 adapts the processors 3402 to perform operations of examples disclosed herein. For example, the machine-executable code 3408 may be to adapt the processors 3402 to perform at least a portion or a totality of the methods or processes described herein.

The processors 3402 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer executes functional elements corresponding to the machine-executable code 3408 (e.g., software code, firmware code, hardware descriptions) related to examples of the present disclosure. It is noted that a general-purpose processor (may also be referred to herein as a host processor or simply a host) may be a microprocessor, but in the alternative, the processors 3402 may include any conventional processor, controller, microcontroller, or state machine. The processors 3402 may also be implemented as a combination of computing devices, such as a combination of a DSP and a microprocessor, a plurality of microprocessors, one or more microprocessors in conjunction with a DSP core, or any other such configuration.

In some examples, the storage 3404 includes volatile data storage (e.g., random-access memory (RAM)), non-volatile data storage (e.g., Flash memory, a hard disc drive, a solid-state drive, erasable programmable read-only memory (EPROM), etc.). In some examples, the processors 3402 and the storage 3404 may be implemented into a single device (e.g., a semiconductor device product, a system on chip (SOC), etc.). In some examples, the processors 3402 and the storage 3404 may be implemented into separate devices.

In some examples, the machine-executable code 3408 may include computer-readable instructions (e.g., software code, firmware code). By way of non-limiting example, the computer-readable instructions may be stored by the storage 3404, accessed directly by the processors 3402, and executed by the processors 3402 using at least the logic circuitry 3406. Also, by way of non-limiting example, the computer-readable instructions may be stored on the storage 3404, transferred to a memory device (not shown) for execution, and executed by the processors 3402 using at least the logic circuitry 3406. Accordingly, in some examples, the logic circuitry 3406 includes electrically configurable logic circuitry 3406.

In some examples the machine-executable code 3408 may describe hardware (e.g., circuitry) to be implemented in the logic circuitry 3406 to perform the functional elements. This hardware may be described at any of a variety of levels of abstraction, from low-level transistor layouts to high-level description languages. At a high level of abstraction, a hardware description language (HDL) such as an IEEE Standard hardware description language (HDL) may be used. By way of non-limiting examples, VERILOG™, SYSTEMVERILOG™ or very large-scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuitries (e.g., gates, flip-flops, registers, without limitation) of the logic circuitry 3406 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some examples, the machine-executable code 3408 may include an HDL, an RTL, a GL description, a mask level description, other hardware description, or any combination thereof.

In examples where the machine-executable code 3408 includes a hardware description (at any level of abstraction), a system (not shown, but including the storage 3404) may be to implement the hardware description described by the machine-executable code 3408. By way of non-limiting example, the processors 3402 may include a programmable logic device (e.g., an FPGA or a PLC) and the logic circuitry 3406 may be electrically controlled to implement circuitry corresponding to the hardware description into the logic circuitry 3406. Also, by way of non-limiting example, the logic circuitry 3406 may include hard-wired logic manufactured by a manufacturing system (not shown, but including the storage 3404) according to the hardware description of the machine-executable code 3408.

Regardless of whether the machine-executable code 3408 includes computer-readable instructions or a hardware description, the logic circuitry 3406 is adapted to perform the functional elements described by the machine-executable code 3408 when implementing the functional elements of the machine-executable code 3408. It is noted that although a hardware description may not directly describe functional elements, a hardware description indirectly describes functional elements that the hardware elements described by the hardware description are capable of performing.

As used in the present disclosure, the terms "module" or "component" may refer to specific hardware implementations to perform the actions of the module or component and/or software objects or software routines that may be stored on and/or executed by general purpose hardware (e.g., computer-readable media, processing devices, etc.) of the computing system. In some examples, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to,"

the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc.," or "one or more of A, B, and C, etc.," is used, in general such a construction is intended to include A alone, B alone, C alone, A and B together, A and C together, B and C together, or A, B, and C together, etc.

Any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

A non-exhaustive, non-limiting list of examples follows. Not each of the examples listed below is explicitly and individually indicated as being combinable with all others of the examples listed below and examples discussed above. It is intended, however, that these examples are combinable with all other examples unless it would be apparent to one of ordinary skill in the art that the examples are not combinable.

Example 1: An apparatus comprising: a computing device comprising one or more processors, multiple peripheral communication devices of different communication protocol types operably connected to the one or more processors, and a memory to store processor-executable instructions that, when executed by the one or more processors, cause the one or more processors to perform operations of a gateway node, the operations comprising: receiving a message from a first end node via a first one of the multiple peripheral communication devices, the message including a source identifier comprising a first end node identifier assigned to the first end node and a destination identifier comprising a second end node identifier assigned to a second end node; consulting a routing table at least partially responsive to receiving the message; and forwarding the message to the second end node via a second one of the multiple peripheral communication devices at least partially based on an entry in the routing table, the entry including an interface identifier stored in association with the second end node identifier, the interface identifier corresponding to the second one of the multiple peripheral communication devices.

Example 2: The apparatus according to Example 1, wherein the first end node identifier includes a cluster identifier and a first number appended to the cluster identifier, the second end node identifier includes the cluster identifier and a second number appended to the cluster identifier, and the cluster identifier matches a serial number of the gateway node.

Example 3: The apparatus according to Examples 1 and 2, wherein the first end node identifier for routing messages via the gateway node is different from a serial number of the first end node, and the second end node identifier for routing messages via the gateway node is different from a serial number of the second end node.

Example 4: The apparatus according to any of Examples 1 to 3, wherein the processor-executable instructions are to cause the one or more processors of the computing device to perform the operations comprising: receiving a first enrollment message from the first end node; at least partially responsive to receiving the first enrollment message: assigning the first end node identifier to the first end node; and sending a first response message to the first end node, the first response message including the first end node identifier; receiving a second enrollment message from the second end node; at least partially responsive to receiving the second enrollment message: assigning the second end node identifier to the second end node; and sending a second response message to the second end node, the second response message including the second end node identifier.

Example 5: The apparatus according to any of Examples 1 to 4, wherein the processor-executable instructions are to cause the one or more processors of the computing device to perform the operations comprising: distributing copies of the routing table to respective ones of the first end node and the second end node.

Example 6: The apparatus according to any of Examples 1 to 5, wherein the processor-executable instructions are to cause the one or more processors of the computing device to perform the operations including receiving the message by: reading one or more data portions from an output buffer of the first one of the multiple peripheral communication devices and storing the one or more data portions in a message queue, until a message comprising the one or more data portions is received via the first one of the multiple peripheral communication devices and stored in the message queue, wherein the message has a message format according to a predetermined messaging protocol, the message includes a header and a payload, and the header includes the source identifier and the destination identifier.

Example 7: The apparatus according to any of Examples 1 to 6, wherein the processor-executable instructions are to cause the one or more processors of the computing device to perform the operations including forwarding the message by: writing one or more data portions of the message from the message queue to an input buffer of the second one of the multiple peripheral communication devices, until the message is transmitted via the second one of the multiple peripheral communication devices.

Example 8: The apparatus according to any of Examples 1 to 7, wherein the predetermined messaging protocol comprises a unified messaging protocol which is common to messages received and forwarded through the multiple peripheral communication devices.

Example 9: The apparatus according to any of Examples 1 to 8, wherein the message queue comprises a common message queue to store the messages received and forwarded through the multiple peripheral communication devices.

Example 10: The apparatus according to any of Examples 1 to 9, wherein the multiple peripheral communication devices of the gateway node include three or more of a Universal Asynchronous Receiver-Transmitter (UART) device, an Inter-Integrated Circuit (I2C) device, a Serial Peripheral Interface (SPI) device, a Controller Area Network (CAN) device, a T1S device, a Bluetooth or Bluetooth Low Energy (BLE) device, an IEEE 802.15.4 or low-rate wireless personal area network (LR-WPAN) device, a Wi-Fi device, an Ethernet device, and a Universal Serial Bus (USB) device.

Example 11: A non-transitory processor-readable medium to store processor-executable instructions that, when executed by one or more processors of a computing device including multiple peripheral communication devices of different communication protocol types, cause the one or more processors to perform operations of a gateway node, the operations comprising: receiving a message from a first end node via a first one of the multiple peripheral communication devices, the message including a source identifier comprising a first end node identifier assigned to the first end node and a destination identifier comprising a second end node identifier assigned to a second end node; consulting a routing table at least partially responsive to receiving the message; and forwarding the message to the second end node via a second one of the multiple peripheral communication devices at least partially based on an entry in the routing table, the entry including an interface identifier stored in association with the second end node identifier, the interface identifier corresponding to the second one of the multiple peripheral communication devices.

Example 12: The non-transitory processor-readable medium according to Example 11, wherein the first end node identifier includes a cluster identifier and a first number appended to the cluster identifier, the second end node identifier includes the cluster identifier and a second number appended to the cluster identifier, and the cluster identifier matches a serial number of the gateway node.

Example 13: The non-transitory processor-readable medium according to Examples 11 and 12, wherein the processor-executable instructions are to cause the one or more processors of the computing device to perform the operations comprising: receiving a first enrollment message from the first end node; at least partially responsive to receiving the first enrollment message: assigning the first end node identifier to the first end node; and sending a first response message to the first end node, the first response message including the first end node identifier; receiving a second enrollment message from the second end node; at least partially responsive to receiving the second enrollment message: assigning the second end node identifier to the second end node; and sending a second response message to the second end node, the second response message including the second end node identifier.

Example 14: The non-transitory processor-readable medium according to any of Examples 11 to 13, wherein the processor-executable instructions are to cause the one or more processors of the computing device to perform the operations comprising: distributing copies of the routing table to respective ones of the first end node and the second end node.

Example 15: The non-transitory processor-readable medium according to any of Examples 11 to 14, wherein the processor-executable instructions are to cause the one or more processors of the computing device to perform the operations including receiving the message by: reading one or more data portions from an output buffer of the first one of the multiple peripheral communication devices and storing the one or more data portions in a message queue, until a message comprising the one or more data portions is received via the first one of the multiple peripheral communication devices and stored in the message queue, wherein the message has a message format according to a predetermined messaging protocol, the message includes a header and a payload, and the header includes the source identifier and the destination identifier.

Example 16: The non-transitory processor-readable medium according to any of Examples 11 to 15, wherein the processor-executable instructions are to cause the one or more processors of the computing device to perform the operations including forwarding the message by: writing one or more data portions of the message from the message queue to an input buffer of the second one of the multiple peripheral communication devices, until the message is sent via the second one of the multiple peripheral communication devices.

Example 17: The non-transitory processor-readable medium according to any of Examples 11 to 16, wherein the predetermined messaging protocol comprises a unified messaging protocol which is common to messages received and forwarded through the multiple peripheral communication devices of the gateway node.

Example 18: The non-transitory processor-readable medium according to any of Examples 11 to 17, wherein the processor-executable instructions are to cause the one or more processors of the computing device to perform the operations with respect to the multiple peripheral communication devices comprising three or more of a Universal Asynchronous Receiver-Transmitter (UART) device, an Inter-Integrated Circuit (I2C) device, a Serial Peripheral Interface (SPI) device, a Controller Area Network (CAN) device, a T1S device, a Bluetooth or Bluetooth Low Energy (BLE) device, an IEEE 802.15.4 or low-rate wireless personal area network (LR-WPAN) device, a Wi-Fi device, an Ethernet device, and a Universal Serial Bus (USB) device.

Example 19: A non-transitory processor-readable medium to store processor-executable instructions that, when executed by one or more processors of a computing device including multiple peripheral communication devices of different communication protocol types, cause the one or more processors to perform operations of a first end node, the operations comprising: sending a message to a second end node via a gateway node by: preparing the message having a message format according to a predetermined messaging protocol, the message including a header and a payload, the header including a source identifier comprising a first end node identifier assigned to the first end node and a destination identifier comprising a second end node identifier assigned to the second end node; storing the message in a message queue; and writing one or more data portions of the message from the message queue to an indicated one of the multiple peripheral communication devices, until the message is transmitted via the indicated peripheral communication device, wherein the first end node identifier includes a cluster identifier and a first number appended to the cluster identifier, the second end node identifier includes the cluster identifier and a second number appended to the cluster identifier, and the cluster identifier matches a serial number of the gateway node.

Example 20: The non-transitory processor-readable medium according to Example 19, wherein the predetermined messaging protocol comprises a unified messaging protocol which is common to messages transmitted via the multiple peripheral communication devices.

Example 21: The non-transitory processor-readable medium according to Examples 19 and 20, wherein the message queue comprises a common message queue to store the messages transmitted via the multiple peripheral communication devices.

Example 22: The non-transitory processor-readable medium according to any of Examples 19 to 21, wherein the processor-executable instructions are to cause the one or more processors of the computing device to perform the operations comprising: receiving and processing function calls to at least some functions of the set of functions of the processor-executable instructions, the set of functions associated with a set of application programming interfaces (APIs) exposed to an application of the computing device that invokes the function calls; and sending the message to the second end node via the gateway node at least partially responsive to receiving a function call to a function to send a message, the function call indicating input parameters to identify data to send, the destination identifier, and an interface identifier of the indicated peripheral communication device through which to transmit the message.

Example 23: The non-transitory processor-readable medium according to any of Examples 19 to 22, wherein the processor-executable instructions are to cause the one or more processors of the computing device to perform the operations with respect to the multiple peripheral communication devices comprising three or more of a Universal Asynchronous Receiver-Transmitter (UART) device, an Inter-Integrated Circuit (I2C) device, a Serial Peripheral Interface (SPI) device, a Controller Area Network (CAN) device, a T1S device, a Bluetooth or Bluetooth Low Energy (BLE) device, an IEEE 802.15.4 or low-rate wireless personal area network (LR-WPAN) device, a Wi-Fi device, an Ethernet device, and a Universal Serial Bus (USB) device.

What is claimed is:

1. An apparatus comprising:
 a computing device comprising one or more processors, multiple peripheral communication devices of different communication protocol types operably connected to the one or more processors, and a memory to store processor-executable instructions, the processor-executable instructions including an application and an application layer protocol stack to interface with the application, the application layer protocol stack to perform message communication processing between the application and respective input/output (I/O) buffers of the multiple peripheral communication devices, the processor-executable instructions such that, when executed by the one or more processors, cause the one or more processors to perform operations of a gateway node, the operations comprising:
  receiving, in a message queue of the application, a message from a first end node via a first one of the multiple peripheral communication devices, the receiving of the message including the application layer protocol stack reading the message from a first I/O buffer of the first one of the multiple peripheral communication devices for storage in the message queue, the message including a source identifier comprising a first end node identifier assigned to the first end node and a destination identifier comprising a second end node identifier assigned to a second end node;
  consulting a routing table at least partially responsive to receiving the message; and
  storing the message in the message queue of the application for forwarding the message, at least partially based on an entry in the routing table, to the second end node via a second one of the multiple peripheral communication devices, the forwarding of the message including the application layer protocol stack writing the message from the message queue to a second I/O buffer of the second one of the multiple peripheral communication devices, the entry including an interface identifier stored in association with the second end node identifier, the interface identifier corresponding to the second one of the multiple peripheral communication devices.

2. The apparatus of claim 1, wherein the first end node identifier includes a cluster identifier and a first number appended to the cluster identifier, the second end node identifier includes the cluster identifier and a second number appended to the cluster identifier, and the cluster identifier matches a serial number of the gateway node.

3. The apparatus of claim 2, wherein the first end node identifier for routing messages via the gateway node is different from a serial number of the first end node, and the second end node identifier for routing messages via the gateway node is different from a serial number of the second end node.

4. The apparatus of claim 2, wherein the processor-executable instructions are to cause the one or more processors of the computing device to perform the operations comprising:
 receiving a first enrollment message from the first end node;
 at least partially responsive to receiving the first enrollment message:
  assigning the first end node identifier to the first end node; and
  sending a first response message to the first end node, the first response message including the first end node identifier;
 receiving a second enrollment message from the second end node;
 at least partially responsive to receiving the second enrollment message:
  assigning the second end node identifier to the second end node; and
  sending a second response message to the second end node, the second response message including the second end node identifier.

5. The apparatus of claim 2, wherein the processor-executable instructions are to cause the one or more processors of the computing device to perform the operations comprising:
 distributing copies of the routing table to respective ones of the first end node and the second end node.

6. The apparatus of claim 1, wherein the processor-executable instructions are to cause the one or more processors of the computing device to perform the operations including receiving the message by:
  reading, by the application layer protocol stack, one or more first data portions from the first I/O buffer of the first one of the multiple peripheral communication devices and storing, by the application layer protocol stack, the one or more first data portions in the message queue, until the message comprising the one or more first data portions is received via the first one of the multiple peripheral communication devices and stored in the message queue,
  wherein the message has a message format according to a predetermined messaging protocol, the message includes a header and a payload, and the header includes the source identifier and the destination identifier.

7. The apparatus of claim 6, wherein the processor-executable instructions are to cause the one or more processors of the computing device to perform the operations including forwarding the message by:
  writing, by the application layer protocol stack, one or more second data portions of the message from the message queue to the second I/O buffer of the second one of the multiple peripheral communication devices, until the message is transmitted via the second one of the multiple peripheral communication devices.

8. The apparatus of claim 1, wherein the message has a message format according to a unified messaging protocol which is common to messages received and forwarded through the multiple peripheral communication devices, the message including a header and a payload, the header including the source identifier and the destination identifier.

9. The apparatus of claim 8, wherein the message queue comprises a common message queue to store the messages received and forwarded through the multiple peripheral communication devices.

10. The apparatus of claim 1, wherein the multiple peripheral communication devices of the gateway node include three or more of a Universal Asynchronous Receiver-Transmitter (UART) device, an Inter-Integrated Circuit (I2C) device, a Serial Peripheral Interface (SPI) device, a Controller Area Network (CAN) device, a TIS device, a Bluetooth or Bluetooth Low Energy (BLE) device, and an IEEE 802.15.4 or low-rate wireless personal area network (LR-WPAN) device, and the multiple peripheral communication devices of the gateway node further include one or more of a Wi-Fi device, an Ethernet device, and a Universal Serial Bus (USB) device.

11. A non-transitory processor-readable medium to store processor-executable instructions that, when executed by one or more processors of a computing device including multiple peripheral communication devices of different communication protocol types, cause the one or more processors to perform operations of a gateway node, the processor-executable instructions including an application and an application layer protocol stack to interface with the application, the application layer protocol stack to perform message communication processing between the application and respective input/output (I/O) buffers of the multiple peripheral communication devices, the operations comprising:
  receiving, in a message queue of the application, a message from a first end node via a first one of the multiple peripheral communication devices, the receiving of the message including the application layer protocol stack reading the message from a first I/O buffer of the first one of the multiple peripheral communication devices for storage in the message queue, the message including a source identifier comprising a first end node identifier assigned to the first end node and a destination identifier comprising a second end node identifier assigned to a second end node;
  consulting a routing table at least partially responsive to receiving the message; and
  storing the message in the message queue of the application for forwarding the message, at least partially based on an entry in the routing table, to the second end node via a second one of the multiple peripheral communication devices, the forwarding of the message including the application layer protocol stack writing the message from the message queue to a second I/O buffer of the second one of the multiple peripheral communication devices, the entry including an interface identifier stored in association with the second end node identifier, the interface identifier corresponding to the second one of the multiple peripheral communication devices.

12. The non-transitory processor-readable medium of claim 11, wherein the first end node identifier includes a cluster identifier and a first number appended to the cluster identifier, the second end node identifier includes the cluster identifier and a second number appended to the cluster identifier, and the cluster identifier matches a serial number of the gateway node.

13. The non-transitory processor-readable medium of claim 12, wherein the processor-executable instructions are to cause the one or more processors of the computing device to perform the operations comprising:
  receiving a first enrollment message from the first end node;
  at least partially responsive to receiving the first enrollment message:
    assigning the first end node identifier to the first end node; and
    sending a first response message to the first end node, the first response message including the first end node identifier;
  receiving a second enrollment message from the second end node;
  at least partially responsive to receiving the second enrollment message:
    assigning the second end node identifier to the second end node; and
    sending a second response message to the second end node, the second response message including the second end node identifier.

14. The non-transitory processor-readable medium of claim 12, wherein the processor-executable instructions are to cause the one or more processors of the computing device to perform the operations comprising:
  distributing copies of the routing table to respective ones of the first end node and the second end node.

15. The non-transitory processor-readable medium of claim 12, wherein the processor-executable instructions are to cause the one or more processors of the computing device to perform the operations including receiving the message by:
  reading, by the application layer protocol stack, one or more first data portions from the first I/O buffer of the first one of the multiple peripheral communication devices and storing, by the application layer protocol stack, the one or more first data portions in the message queue, until the message comprising the one or more first data portions is received via the first one of the multiple peripheral communication devices and stored in the message queue, wherein the message has a message format according to a predetermined messaging protocol, the message includes a header and a payload, and the header includes the source identifier and the destination identifier.

16. The non-transitory processor-readable medium of claim 15, wherein the processor-executable instructions are to cause the one or more processors of the computing device to perform the operations including forwarding the message by:

writing, by the application layer protocol stack, one or more second data portions of the message from the message queue to the second I/O buffer of the second one of the multiple peripheral communication devices, until the message is sent via the second one of the multiple peripheral communication devices.

17. The non-transitory processor-readable medium of claim 11, wherein the message has a message format according to a unified messaging protocol which is common to messages received and forwarded through the multiple peripheral communication devices of the gateway node, the message including a header and a payload, the header including the source identifier and the destination identifier.

18. The non-transitory processor-readable medium of claim 11, wherein the processor-executable instructions are to cause the one or more processors of the computing device to perform the operations with respect to the multiple peripheral communication devices including three or more of a Universal Asynchronous Receiver-Transmitter (UART) device, an Inter-Integrated Circuit (I2C) device, a Serial Peripheral Interface (SPI) device, a Controller Area Network (CAN) device, a TIS device, a Bluetooth or Bluetooth Low Energy (BLE) device, and an IEEE 802.15.4 or low-rate wireless personal area network (LR-WPAN) device, and with respect to the multiple peripheral communication devices further including one or more of a Wi-Fi device, an Ethernet device, and a Universal Serial Bus (USB) device.

* * * * *